(12) United States Patent
Watanabe et al.

(10) Patent No.: US 6,298,019 B1
(45) Date of Patent: Oct. 2, 2001

(54) OPTICAL DISK APPARATUS

(75) Inventors: Katsuya Watanabe, Osaka-fu;
Mitsurou Moriya, Nara-ken; Shin-ichi Yamada, Osaka-fu; Yasuaki Edahiro, Osaka-fu; Takeharu Yamamoto, Osaka-fu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/430,040

(22) Filed: Oct. 29, 1999

Related U.S. Application Data

(62) Division of application No. 08/688,294, filed on Jul. 29, 1996, now Pat. No. 6,011,762.

(30) Foreign Application Priority Data

Jul. 27, 1995 (JP) .................................................. 7-191680
Apr. 3, 1996 (JP) .................................................. 8-081245

(51) Int. Cl.[7] .................................................. G11B 7/00
(52) U.S. Cl. .................................................. 369/44.27; 369/44.34; 369/47.27; 369/47.55; 369/53.23
(58) Field of Search .................................................. 369/44.25, 44.27, 369/53, 44.28, 47, 32, 44.29, 44.34, 44.35

(56) References Cited

U.S. PATENT DOCUMENTS

| | | |
|---|---|---|
| 5,671,203 | 9/1997 | Ra . |
| 5,684,773 | 11/1997 | Hayashi . |
| 5,710,749 | 1/1998 | Tsukai et al. . |
| 5,724,325 | 3/1998 | Jeong . |
| 5,751,675 | * 5/1998 | Tsutsui et al. ..................... 369/44.34 |
| 5,754,507 | 5/1998 | Nishikata . |
| 5,757,743 | 5/1998 | Decusatis et al. . |

FOREIGN PATENT DOCUMENTS 7-129968    5/1995   (JP) .

* cited by examiner

*Primary Examiner*—Nabil Hindi
(74) *Attorney, Agent, or Firm*—Wenderoth, Lind & Ponack, L.L.P.

(57) ABSTRACT

An optical disk apparatus comprises a focusing means for focusing a light beam on a recording medium having first and second information faces; means for moving a focal point of the light beam in a direction substantially perpendicular to the information faces of the recording medium; means for detecting a reflected light from the recording medium; means for detecting a focus condition of the light beam on the basis of an output signal from the reflected light detecting means; a focus control means for driving the focal point moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the focal point moving means.

15 Claims, 28 Drawing Sheets

CD (1.2mm THICK DISK)

DVD (0.6mm THICK DISK)

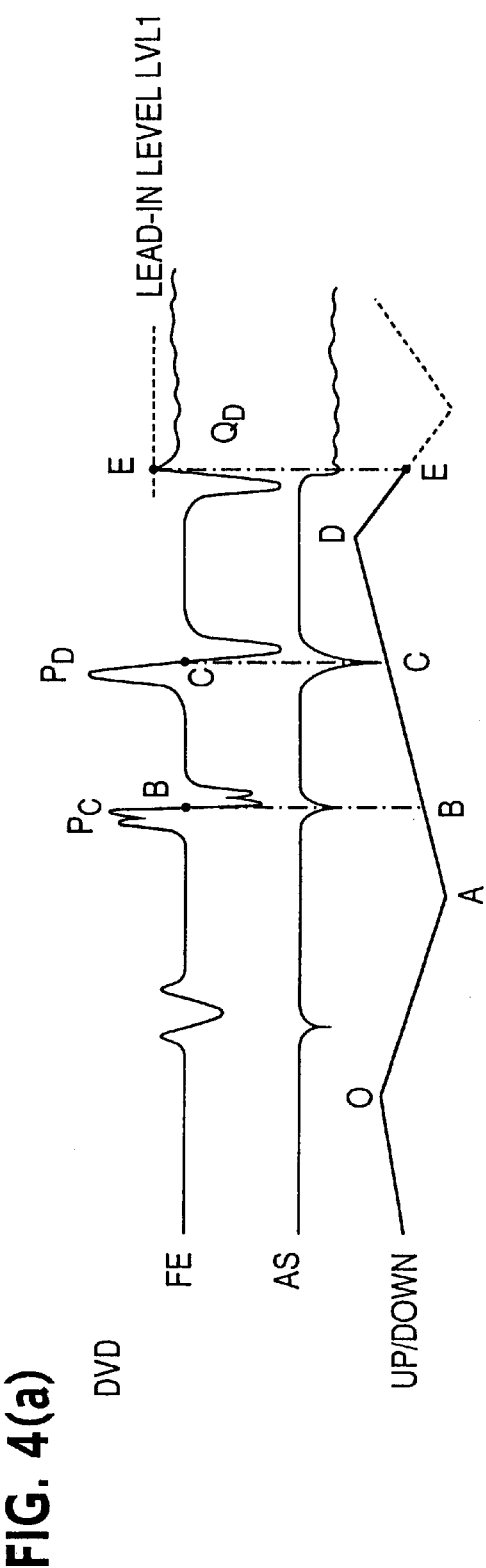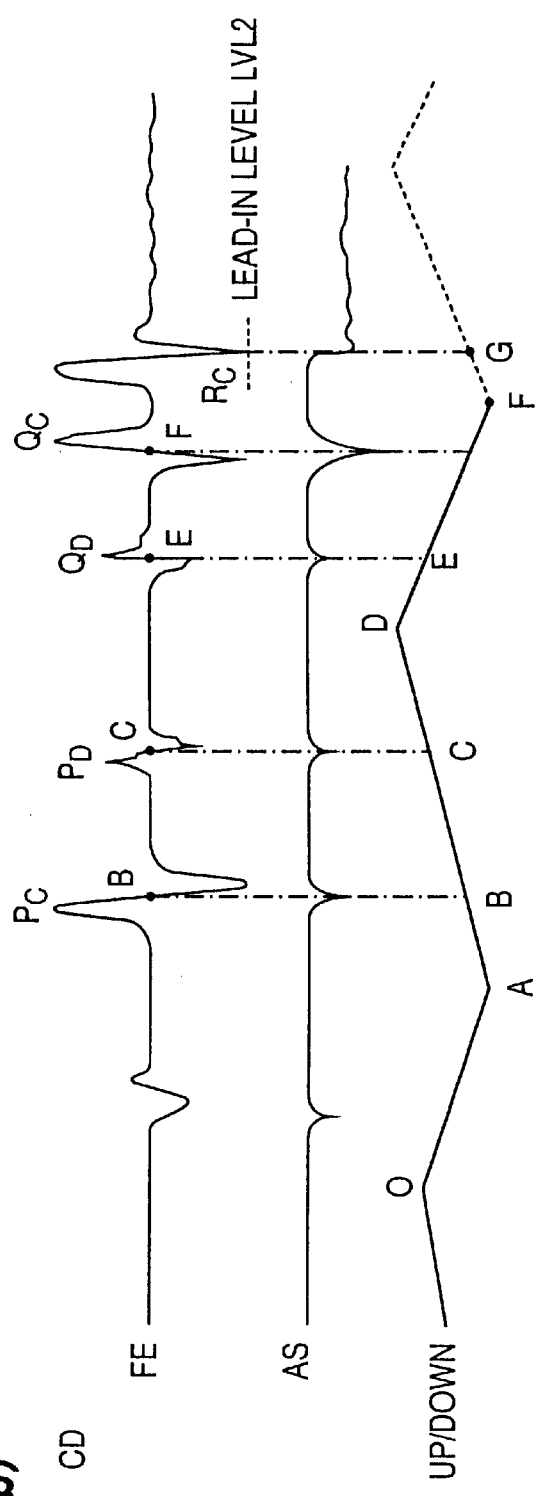

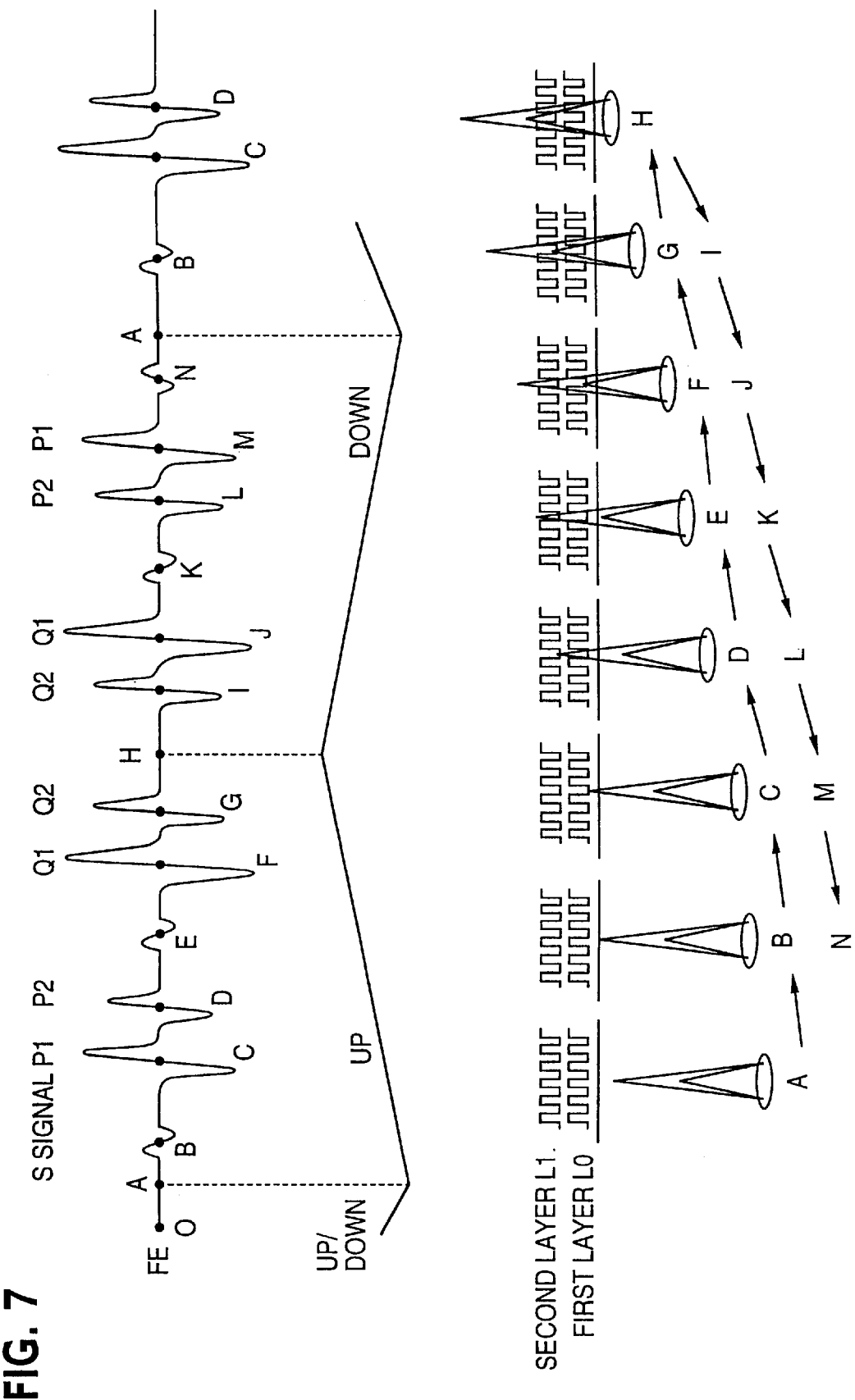

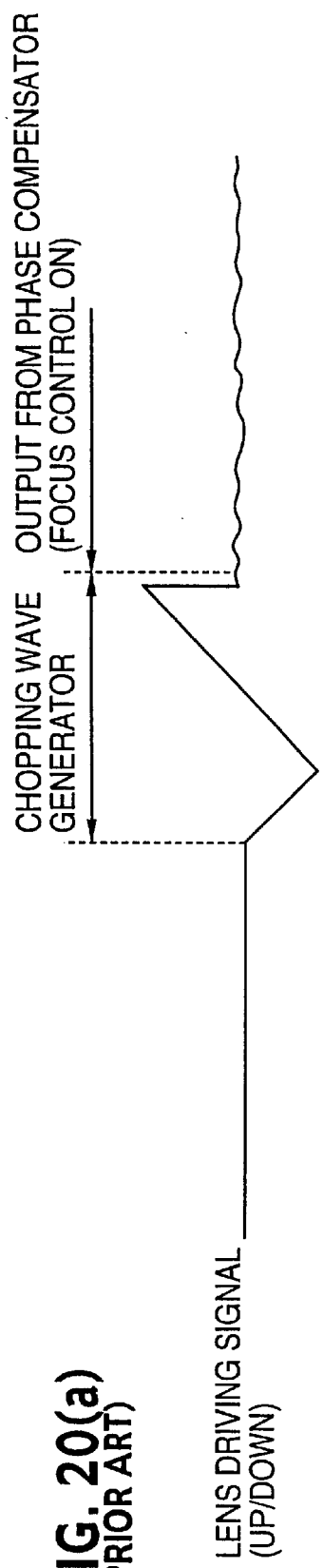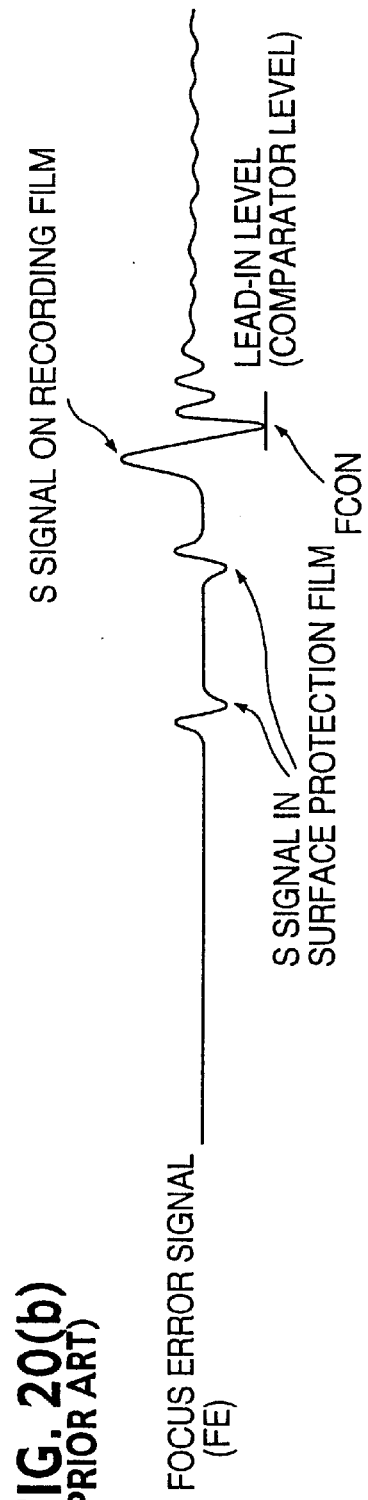
FIG. 20(a) (PRIOR ART)
FIG. 20(b) (PRIOR ART)

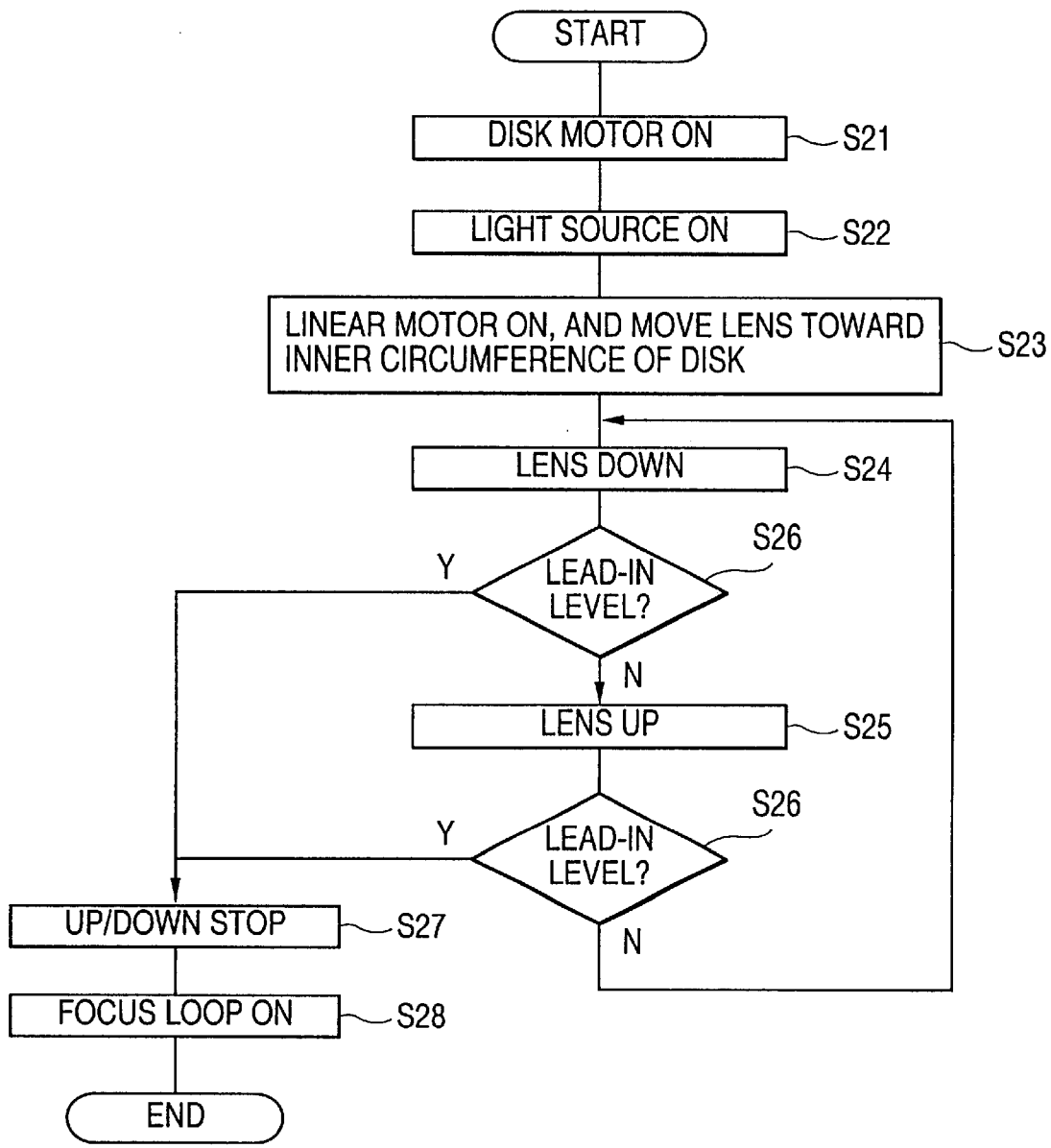

OPTICAL DISK APPARATUS

This is a divisional application of Ser. No. 08/688,294, filed Jul. 29, 1996, U.S. Pat. No. 6,011,762.

FIELD OF THE INVENTION

The present invention relates to an optical disk apparatus that optically records signals in a recording medium and reproduces the recorded signals using a laser beam emitted from a light source, such as a laser. More specifically, the invention relates to an optical disk apparatus equipped with a focus control system for controlling focusing of the light beam irradiating the recording medium so that the light beam is focused on a prescribed position of the recording medium.

BACKGROUND OF THE INVENTION

There is an optical disk apparatus in which a light beam emitted from a light source, such as a semiconductor laser, is focused on a disk type recording medium rotating at a prescribed speed, and signals are recorded in, or reproduced from, the recording medium, as described in Japanese Published Patent Application No. Hei. 7-129968. The disk type recording medium has a spiral or concentric tracks. The width of the tracks is about 0.6 $\mu$m, and the pitch of the tracks is about 1.5 $\mu$m. In order to record signals on the tracks or reproduce signals recorded on the tracks, a focusing of the light beam irradiating the recording medium is controlled so that the light beam is focused on a prescribed position of the recording medium.

FIG. 19 is a block diagram illustrating an example of an optical disk apparatus including a focus control system.

The apparatus shown in FIG. 19 comprises a light source 1, such as a semiconductor laser, that emits a light beam 8 toward a disk 7 (recording medium), a coupling lens 2, a polarization beam splitter 3, a polarizing plate 4, a focusing lens 5, and a disk motor 6 for rotating the disk 7 at a prescribed speed. A light beam 8 emitted from the light source 1 is collimated by the coupling lens 2, and reflected by the polarization beam splitter 3 to the polarizing plate 4. The light beam then travels through the polarizing plate 4 and the focusing lens 5, and is focused on the disk 7 rotated by the disk motor 6.

This apparatus further comprises a condenser lens 9 and a split mirror 10 as elements receiving a light beam reflected at the disk 7. The reflected light beam travels through the focusing lens 5, polarizing plate 4, the polarization beam splitter 3, and the condenser lens 9, and is then split into two beams 11 and 15 by the split lens 10. The light beams 11 and 15 are applied to a focus control system and a tracking control system, respectively.

The focus control system comprises a two-element photodetector 12, a preamplifiers 13A and 13B, a differential amplifier 14, a phase compensator 18, a linear motor 19, a switch 33, a driving circuit 35, a focus control element (focus actuator) 36, a logic circuit 40, a comparator 41, and a chopping wave generator 42. The two-element photodetector 12 has two light responsive parts A and B. Output signals from the light responsive parts A and B are amplified by the preamplifiers 13A and 13B, respectively, and are inputted to the differential amplifier 14. A knife edge detection is realized by the condenser lens 9 and the split mirror 10, and a signal output from the differential amplifier 14 is a focus error signal (hereinafter referred to as FE signal).

The phase of the FE signal in the focus control system is compensated by the phase compensator 18, and the switch 33 opens or closes a loop of the focus control system. When the focus control system is closed by the switch 33, the FE signal output from the phase compensator 18 is sent to the driving circuit 35 through the switch 33. The driving circuit 35 amplifies the FE signal and sends the FE signal to the focus control element 36. In this structure, when the focus control system is in the closed state, the focus control element 30 is driven so that the light beam is always focused on a prescribed position of the disk 7. Further, an output signal from the chopping wave generator 42 is also input to the switch 33. The FE signal is also input to the logic circuit 40 through the comparator 41. The logic circuit 40 controls the opening and closing operation of the switch 33.

The linear motor 19 moves the focusing lens 5, the focus control element 36, the polarization beam splitter 3 and the like in the direction transverse to the tracks on the disk 7. The linear motor 19 is operated when the focal point of the light beam is moved to a prescribed track.

On the other hand, the light beam 15 from the split mirror 10 is input to the two-element photodectector 16 in the tracking servo system. The photodetector 16 has two light responsive parts C and D, and a difference between output signals from the respective light responsive parts C and D becomes a track error signal. The light beam on the disk 7 in controlled by this track error signal to correctly scan the tracks on the disk 7. Since the present invention does not relate to the tracking control, a detailed description of the tracking control is omitted here.

In the optical disk apparatus with the focus control system shown in FIG. 19, the focus control is performed as described below.

Initially, the disk 7 is rotated by the disk motor 6. When a prescribed rotating speed is reached, the switch 33 selects the chopping wave generator 42, and the focus control element 36 is operated in response to a signal output from the chopping wave generator 42, whereby the focusing lens 5 is moved up and down, i.e., in the direction perpendicular to the recording face of the disk 7. Thereby, the focal point of the light beam on the disk 7 moves up and down. At this time, an S-shaped FE signal (hereinafter referred to as S signal), which appears when the focal point of the light beam passes through the recording face, is detected by the comparator 41. By the detection of the S signal, the logic circuit 40 knows whether the focal point of the light beam is positioned in the vicinity of the recording face or not. When the focal point is positioned in the vicinity of the recording face, the logic circuit 40 controls the switch 33 to select the phase compensator 18. In this way, the focus servo loop is closed, and the focus control (focus lead-in) is performed so that the light beam is focused on a prescribed target position.

The focus lead-in will be described with reference to FIGS. 20(a), 20(b), 21, and 22. FIGS. 20(a) and 20(b) illustrate a waveform of a focusing lens driving signal and a waveform of an FE signal having S signals, respectively, at the focus lead-in. FIG. 21 illustrates a waveform for explaining the relationship between the focus lead-in level and S signals that appear in the FE signal at a protection film at the surface of the disk 7 and at the recording film when the focusing lens 5 comes close to and goes away from the disk 7. FIG. 22 is a flow chart showing a fundamental focus leadin procedure in the focus control system.

As shown in FIG. 22, when the reading and reproducing apparatus is turned on, the disk motor 6 is turned on and the disk 7 is rotated (step S21). When the disk 7 reaches a prescribed rotating speed, the light source 1 is turned on, and the semiconductor laser emits light (step S22).

Subsequently, the linear motor 19 is driven to move the focusing lens 5 toward the inner circumference of the disk 7 (step S23). The above-mentioned initial operation is followed by the focus lead-in operation.

In the focus lead-in operation, initially, the focusing lens 5 is moved down away from the disk 7, in response to an output signal from the chopping wave generator 42 (step S24). Thereafter, the focusing lens 5 is moved up toward the disk 7 (step S25). While repeating the up and down movement of the focusing lens 5, it is detected that the S signal reaches a prescribed lead-in level (step S26). After the prescribed lead-in level is reached, the logic circuit 40 controls the switch 33 to select the phase compensator 18, and the up and down movement the focusing lens 5 is stopped (step S27). Then, the focus control system is turned on (step S28), the focus lead-in is ended, and the focus control is started.

The detection level (lead-in level) of the comparator 41 for the focus lead-in is normalized by the amplitudes of the S signals which are output due to the reflection at the recording film of the disk 7 and the reflection at the protection film. That is, as shown in FIG. 21, the focus lead-in level is set within a linear interval that is larger than the peak of the S signal at the protection film and between the peak of the S signal at the recording film and the zero level.

When the prior art focus lead-in process is applied to large capacity optical disks having two or more information faces as shown in FIGS. 6(a) and 6(b), for example, a digital video disk (hereinafter referred to as a DVD), S signals appear at every passing of the focal point of the light beam through each information face, so that S signals as many as the information faces appear when the focusing lens is moved up and down during the focus lead-in operation. For example, in a dual-layer DVD, as shown in FIG. 7, in addition to small S signals at the protection film, two periodic S signals appear on each respective information face. Therefore, in the prior art focus control system, when the S signal at the surface protection film is detected by mistake, the focus control turns on at that part and the focus lead-in ends in a failure. Likewise, when the focus control turns on at the two S signals on the information face, it cannot be detected on which one of the two information faces that the focus lead-in is performed. Therefore, it is very difficult to reproduce information by selecting one of the two information faces certainly and performing focus control and tracking control on the selected information face.

Further, in order to realize a compatibility between a DVD and a CD, an optical head shown in FIG. 1 includes a hologram element 106 that produces two focuses 107a and 107b. In this case, when the disk loaded in the apparatus has a single information face like a CD, an S signal appears at each focal point, so that it is difficult to decide at which one of the two focuses that the focus lead-in should be performed. When the disk loaded in the apparatus is a DVD having two information faces, at least six S signals appear in the FE signal at each UP or DOWN of the focusing lens 105 as shown in FIG. 7. Further, when the surface deflection of the disk is large, the S signals interfere with each other and become nonlinear. In this case, it is almost impossible to learn the lead-in level by measuring the amplitudes of the S signals and detect the information face on which the focus lead-in should be performed.

Furthermore, when the disk loaded in the apparatus is a disk having two or more information faces, the eccentricity, the focus offset value, the tracking off-set value, the focus gain value, the tracking gain value, and the focus error during the detection vary for each information face. Therefore, even though these correction values are appropriately set for one information face, when the light beam is moved to another information face for reproduction or recording of information, considerable focus error and track error occur on that information face, whereby the focus control and the tracking control become unstable. Further, in the detection of the of tracks, the focus error becomes significant because the light beam crosses the grooves, so that stable detection cannot be performed.

Furthermore, the prior art optical disk apparatus is not suited for a CD, a single-layer DVD, a dual-layer DVD, and a disk of write once read many type, such as a CD-R or a DVD-R. When such a disk is loaded in the apparatus, the apparatus indicates an error or the disk is compulsorily ejected from the apparatus.

SUMMARY OF THE INVENTION

An object of the present invention is to provide an optical disk apparatus that can perform a high-speed and stable focus lead-in operation even when a dual-layer disk or a multiple-layer disk is loaded in the apparatus or when an optical head for irradiating the disk with a light beam has two focuses corresponding to disks having different base material thicknessess.

Another object of the present invention is to provide a highly reliable optical disk apparatus that can move a focus of a light beam between layers of the disk stably at a high speed, that can secure sufficient performances of focusing, tracking, and track seeking for each layer, and that is suited for a large capacity dual-layer or multiple-layer disk.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for moving the focal point of the light beam from the first information face to the second information face; a timing signal generating means for generating a timing signal that operates the focus control means on the basis of an output signal from the focus condition detecting means; and a decelerating means for decelerating the moving speed of the focal point of the light beam in response to a signal from the timing signal generating means.

In this apparatus, in the focus control holding state, the accelerating signal and the decelerating signal, having opposite polarities, are applied to the light beam moving means, whereby the light beam is moved between two information faces. Further, the light beam's reaching a target information face or going a little over the information face is detected by an output from the light beam focusing condition detecting means, whereby the focus control means is operated. Therefore, in a dual-layered disk or a multiple-layer disk, the focus jumping from one information face to another information face can be performed at a high speed, with high reliability.

According to a second aspect of the present invention, an optical disk apparatus comprises a focusing means for focusing a light beam on a recording medium having first and second information faces; a moving means for moving a focal point of the light beam, focused by the focusing means, in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face the second information face by driving the moving means.

The focus jumping means comprises an accelerating means for generating an accelerating signal for moving the focal point of the light beam from one of the first and second information faces of the recording medium to the other information face; and a decelerating means for decelerating the moving speed of the focal point of the light beam.

In this apparatus, when the recording medium is set horizontally, a product of a peak value and a time interval of the accelerating signal when the focal point of the light beam is moved from the lower information face to the upper information face is larger than a product of a peak value and a time interval of the accelerating signal when the focal point of the light beam is moved from the upper information face to the lower information face. Therefore, a stability of the focus jumping is secured.

According to a third aspect of the present invention, in the above-mentioned optical disk apparatus, when the recording medium is set horizontally, the peak value of the accelerating signal, when the focal point of the light beam is moved from the lower information face to the upper information face, is larger than the peak value of the accelerating signal when the focal point of the light beam is moved from the upper information face to the lower information face, and the time interval of the accelerating signal is the same for both movements. Therefore, a stability of the focus jumping is secured.

According to a fourth aspect of the present invention, in the above-mentioned optical disk apparatus, when the recording medium is set horizontally, the time interval of the accelerating signal, when the focal point of the light beam is moved from the lower information face to the upper information face, is longer than the time interval of the accelerating signal when the focal point of the light beam is moved from the upper information face to the lower information face, and the peak value of the accelerating signal is the same for both movements. Therefore, a stability of the focus jumping is secured.

According to a fifth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflecting light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for generating an accelerating signal for moving the focal point for the light beam from one of the first and second information faces of the recording medium to the other information face; and a decelerating means for generating a decelerating signal for decelerating the moving speed of the focal point of the light beam.

In this apparatus, when the recording medium is set horizontally, a product of a peak value and a time interval of the decelerating signal, when the focal point of the light beam is moved from the lower information face to the upper information face, is smaller than a product of a peak value and a time interval of the decelerating signal when the focal point of the light beam is moved from the upper information face to the lower information face. Therefore, a stability of the focus jumping is secured.

According to a sixth aspect of the present invention, in the above-mentioned apparatus, when the recording medium is set horizontally, the peak value of the decelerating signal, when the focal point of the light beam is moved from the lower information face to the upper information face, is smaller than the peak value of the decelerating signal when the focal point of the light beam is moved from the upper information face to the lower information face, and the time interval of the decelerating signal is the same for both movements. Therefore, a stability of the focus jumping is secured.

According to a seventh aspect of the present invention, in the above-mentioned apparatus, when the recording medium is set horizontally, the time interval of the decelerating signal, when the focal point of the light beam is moved from the lower information face to upper information face, is shorter than the time interval of the decelerating signal when the focal point of the light beam is moved from the upper information face to the lower information face, and the peak value of the decelerating signal is the same for both movements. Therefore, a stability of the focus jumping is secured.

According to an eighth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for generating an accelerating signal for moving the focal point of the light beam from one of the first and second information faces of the recording medium to the other information face; and a decelerating means for decelerating the moving speed of the focal point of the light beam.

In this apparatus, a product of a peak value and a time interval of the accelerating signal for moving the focal point of the light beam from the lower information face to the upper information face, when the recording medium is set horizontally, is larger than a product of a peak value and a time interval of the accelerating signal when the recording medium is set vertically. Therefore, a stability of the focus jumping is secured.

According to a ninth aspect of the present invention, in the above-mentioned apparatus, the peak value of the accelerating signal for moving the focal point of the light beam from the lower information face to the upper information face, when the recording medium is set horizontally, is larger than the peak value of the accelerating signal when the recording medium is set vertically, and the time interval of the accelerating signal is the same for both cases. Therefore, a stability of the focus jumping is secured.

According to a tenth aspect of the present invention, in the above-mentioned apparatus, the time interval of the accelerating signal for moving the focal point of the light beam from the lower information face to the upper information face, when the recording medium is set horizontally, is longer than the time interval of the accelerating signal when the recording medium is set vertically, and the peak value of the accelerating signal is the same for both cases. Therefore, a stability of the focus jumping is secured.

According to an eleventh aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for generating an accelerating signal for moving the focal point of the light beam from one of the first and second information faces of the recording medium to the other information face; and a decelerating means for generating a decelerating signal for decelerating the moving speed of the focal point of the light beam.

In this apparatus, a product of a peak value and a time interval of the decelerating signal for moving the focal point of the light beam from the lower information face to the upper information face, when the recording medium is set horizontally, is smaller than a product of a peak value and a time interval of the decelerating signal when the recording medium is set vertically. Therefore, a stability of the focus jumping is secured.

According to an twelfth aspect of the present invention, in the above-mentioned apparatus, the peak value of the decelerating signal for moving the focal point of the light beam from the lower information face to the upper information face, when the recording medium is set horizontally, is smaller than the peak value of the decelerating signal when the recording medium is set vertically, and the time interval of the decelerating signal is the same for both cases. Therefore, a stability of the focus jumping is secured.

According to a thirteenth aspect of the present invention, in the above-mentioned apparatus, the time interval of the decelerating signal for moving the focal point of the light beam from the lower information face to the upper information face, when the recording medium is set horizontally, is shorter than the time interval of the decelerating signal when the recording medium is set vertically, and the peak value of the decelerating signal is the same for both cases. Therefore, a stability of the focus jumping is secured.

According to a fourteenth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for generating an accelerating signal for moving the focal point of the light beam from one of the first and second information faces of the recording medium to the other information face; and a decelerating means for decelerating the moving speed of the focal point of the light beam.

In this apparatus, a product of a peak value and a time interval of the accelerating signal for moving the focal point of the light beam from the upper information face to the lower information face, when the recording medium is set horizontally, is smaller than a product of a peak value and a time interval of the accelerating signal when the recording medium is set vertically. Therefore, a stability of the focus jumping is secured.

According to a fifteenth aspect of the present invention, in the above-mentioned apparatus, the peak value of the accelerating signal for moving the focal point of the light beam from the upper information face to the lower information face, when the recording medium is set horizontally, is smaller than the peak value of the accelerating signal when the recording medium is set vertically, and the time interval of the accelerating signal is the same for both cases. Therefore, a stability of the focus jumping is secured.

According to a sixteenth aspect of the present invention, in the above-mentioned apparatus, the time interval of the accelerating signal for moving the focal point of the light beam from the upper information face to the lower information face, when the recording medium is set horizontally, is shorter than the time interval of the accelerating signal when the recording medium is set vertically, and the peak value of the accelerating signal is the same for both cases. Therefore, a stability of the focus jumping is secured.

According to a seventeenth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus condition detecting means for detecting a focus condition of the light beam irradiating the information faces on the basis of an output signal from the light detecting means; a focus control means for driving the moving means on the basis of an output signal from the focus condition detecting means, and controlling the light beam so that the focus condition of the light beam becomes a prescribed focus condition; and a focus jumping means for moving the focal point of the light beam from the first information face to the second information face by driving the moving means.

The focus jumping means comprises an accelerating means for generating an accelerating signal for moving the focal point of the light beam from one of the first and second information faces of the recording medium to the other information face; and a decelerating means for generating a decelerating signal for decelerating the moving speed of the focal point of the light beam.

In this apparatus, a product of a peak value and a time interval of the decelerating signal for moving the focal point of the light beam from the upper information face to the lower information face, when the recording medium is set horizontally, is larger than a product of a peak value and a time interval of the decelerating signal when the recording medium is set vertically. Therefore, a stability of the focus jumping is secured.

According to an eighteenth aspect of the present invention, in the above-mentioned apparatus, the peak value of the decelerating signal for moving the focal point of the light beam from the upper information face to the lower information face, when the recording medium is set horizontally, is larger than the peak value of the decelerating signal when the recording medium is set vertically, and the time interval of the decelerating signal is the same for both cases. Therefore, a stability of the focus jumping is secured.

According to a nineteenth aspect of the present invention, the above-mentioned apparatus, the time interval of the decelerating signal for moving the focal point of the light beam from the upper information face to the lower information face, when the recording medium is set horizontally, is longer than the time interval of the decelerating signal when the recording medium is set vertically, and the peak value of the decelerating signal is the same for both cases. Therefore, a stability of the focus jumping is secured.

According to a twentieth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus control means for detecting a focus condition of the light beam irradiating the information faces on the basis of an output signal from the light detecting means, driving the moving means on the basis of the detection signal, and controlling the light beam so that the focus condition of the light beam becomes a prescribed focus condition; a focus jumping means for moving the focal point of the light beam from the first information face to the second information face by driving the moving means; and a reflected light amount storage means for storing signals, corresponding to the amount of reflected light, which are detected by the light detecting means when the focal point of the light beam is passed through the first and second information faces by driving the moving means so that the light beam goes away from or close to the recording medium. In this apparatus, when a focus jumping is performed by the focus jumping means, a gain of the focus control means is changed according to the values stored in the reflected light amount storage means. Therefore, even when the amount of reflected light from each information face of a dual-layer disk or a multiple-layer disk varies and thereby an S amplitude of an FE (focus error) signal varies, or even when the S amplitude of the FE signal or the like varies between different disks, apparatuses, or heads, the focus jumping can be performed stably against these variations.

According to a twenty-first aspect of the present invention, in the above-mentioned apparatus, when the focus jumping is performed by the focus jumping means, a focus control lead-in level is set according to the values stored in the reflected light amount storage means. Therefore, when the lead-in level at the focus jumping is calculated and set individually, more stable focus lead-in is realized.

According to a twenty-second aspect of the present invention, in the above-mentioned apparatus, a focus control lead-in level for the focus jumping is set according to an output signal from the focus control means a gain of which is changed according to the values stored in the reflected light amount storage means. Therefore, the focus jumping can be performed stably against variations in the amount of reflected light from information faces of a dual-layer disk or a multiple-layer disk, or variations in the amplitude of the S signal between different disks, apparatuses, or heads.

According to a twenty-third aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a focus control means for detecting a focus condition of the light beam irradiating the information faces on the basis of an output signal from the light detecting means, driving the moving means on the basis of the detection signal, and controlling the light beam so that the focus condition of the light beam becomes a prescribed focus condition; a focus jumping means for moving the focal point of the light beam from the first information face to the second information face by driving the moving means; and a focus condition detecting signal storage means for storing focus condition detecting signals which are obtained when the focal point of the light beam is passed through the first and second information faces by driving the moving means so that the light beam goes away from or close to the recording medium.

In this apparatus, when a focus jumping is performed by the focus jumping means, a gain of the focus control means is changed according to the values stored in the focus condition detecting signal storage means. Therefore, even when the amount of reflected light from each information face of a dual-layer disk or a multiple-layer disk varies and thereby an S amplitude of an FE (focus error) signal varies, or even when the S amplitude of the FE signal or the like varies between different disks, apparatuses, or heads, the focus jumping can be performed stably against these variations.

According to a twenty-fourth aspect of the present invention, in the above-mentioned apparatus, when the focus jumping is performed by the focus jumping means, a focus control lead-in level is set according to the values stored in the focus condition detecting signal storage means. Therefore, when the lead-in level at the focus jumping is calculated and set individually, more stable focus lead-in is realized.

According to a twenty-fifth aspect of the present invention, in the above-mentioned apparatus, a focus control lead-in level for the focus jumping is set according to an output signal from the focus control means, and a gain of which is changed according to the values stored in the focus condition detecting signal storage means. Therefore, the focus jumping can be performed stably against variations in the amount of reflected light from information faces of a dual-layer disk or a multiple-layer disk, or variations in the amplitude of the S signal between different disks, apparatuses, or heads.

According to a twenty-sixth aspect of the present invention, an optical disk apparatus comprises a focusing means for focusing a light beam on a recording medium having first and second information faces; a moving means for moving a focal point of the light beam focused by the focusing means in a direction substantially perpendicular to the information faces of the recording medium; a light detecting means for detecting a reflected light of the focused light beam from the recording medium; a reflected light amount detecting means for detecting a signal corresponding to the reflected light amount obtained by the light detecting means; a focus condition detecting means for detecting a focus condition of the light beam irradiating the information faces, according to an output signal from the light detecting means; division means for dividing a signal from the focus condition detecting means by a signal from the reflected light amount detecting means; and a focus jumping means for moving the focal point of the light beam from the first information face to the second information face by driving the moving means on the basis of a signal from the division means.

Therefore, even though the reflectivity of the recording medium (disk) significantly varies between the first and second information faces or between the Inner circumference, the center, and the outer circumference of the disk, a lead-in level of a target Information face can be accurately detected.

According to a twenty-seventh aspect of the present invention, an optical disk apparatus comprises a focusing means for focusing a light beam on a recording medium; a moving means for moving a focal point of the light beam focused by the focusing means, in a direction substantially perpendicular to a information face of the recording medium; a light detecting means having at least two light responsive parts, for detecting a reflected light from the recording medium; a focus condition detecting means for detecting a focus condition of the light beam irradiating the information face, on the basis of a difference of signals output from the two light responsive regions of the light detecting means; a focus control means for driving the moving means on the basis of an output signal from the focus condition detecting means, and controlling the light beam so that the focus condition of the light beam becomes a prescribed focus condition; and a seeking means for moving the light beam in a direction perpendicular to tracks on the recording medium and seeking a desired track.

In this apparatus, when a desired track is sought by the seeking means, the focus condition detecting means detects peak levels of signals output from the two light responsive regions of the light detecting means, and detects a focus condition of the light beam irradiating the information face from a difference of the detected peak level signals. Therefore, unwanted defocus caused by track cross is reduced, whereby unwanted count error or focus skipping during the seeking are avoided. As a result, a stable seeking performance is secured.

According to a twenty-eighth aspect of the present invention, an optical disk apparatus for reproducing information recorded on a recording medium having two information faces, by irradiating the recording medium with a focused light beam, comprises a moving means for moving a focal point of the light beam irradiating the recording medium so that the focal point crosses a track on the recording medium; a tracking control means for detecting a positional error between the focal point of the light beam and the track on the recording medium, driving the moving means according to the track error signal, and controlling the light beam so that the focal point is positioned on the track; a focus jumping means for jumping the focal point of the light beam to a target information face, which is one of the first information face and the second information face, and seeking the target information face; a decentration signal storage means for storing decentration signals corresponding to decentrations of tracks on the first information face and the second information face when the jumping and seeking are performed by the focus jumping means; an adding means for adding the decentration signals stored in the decentration signal storage means to an output signal from the tracking control means; and a system control means for controlling the system so that a decentration signal, which is read out of the decentration signal storage means and corresponds to the target information face, is added to the tracking control means, when the jumping and seeking are performed by the focus jumping means. Therefore, the decentration followability is improved, and a tracking control system having a good response to the decentration can be constructed.

According to a twenty-ninth aspect of the present invention, an optical disk apparatus for reproducing information recorded on a recording medium having two information faces, by irradiating the recording medium with a focused light beam, comprises a moving means for moving a focal point of the light beam irradiating the recording medium so that the focal point crosses a track on the recording medium; a tracking control means for detecting a positional error between the focal point of the light beam and the track on the recording medium, driving the moving means according to the track error signal, and controlling the light beam so that the focal point is positioned on the track; a focus jumping means for jumping the focal point of the light beam to a target information face, which is one of the first information face and the second information face, and seeking the target information face; a gain tracking storage means for storing desired loop gains of the tracking control means for the first information face and the second information face, when the jumping and seeking are performed by the focus jumping means; a multiplication means for multiplying the track gain signals stored in the tracking gain storage means by an output signal from the tracking control means; and a system control means for controlling the system so that a tracking gain signal, which is read out of the tracking gain storage means and corresponds to the target information face, is multiplied by the output signal from the tracking control means, when the jumping and seeking are performed by the focus jumping means. Therefore, for either information face, a stable tracking control system can be constructed.

According to a thirtieth aspect of the present invention, an optical disk apparatus for reproducing information recorded on a recording medium having two information faces, by irradiating the recording medium with a focused light beam, comprises a moving means for moving a focal point of the light beam irradiating the recording medium so that the focal point crosses a track on the recording medium; a light detecting means for detecting a reflected light from the recording medium; a focus control means for detecting a focus condition of the light beam irradiating the information faces on the basis of an output signal from the light detecting means, driving the moving means on the basis of the detection signal, and controlling the light beam so that the focus condition of the light beam becomes a prescribed focus condition; a focus jumping means for jumping the focal point of the light beam to a target information face, which is one of the first information face and the second information face, and seeking the target information face; a focus gain storage means for storing desired loop gains of the focus control means for the first information face and the second information face, when the jumping and seeking are performed by the focus jumping means; a multiplication means for multiplying the focus gain signals stored in the focus gain storage means by an output signal from the focus control means; and a system control means for controlling the system so that a focus gain signal, which is read out of the focus gain storage means and corresponds to the target information face, is multiplied by the output signal from the focus control means, when the jumping and seeking are performed by the focus jumping means. Therefore, for either information face, a stable tracking control system can be constructed.

According to a thirty-first aspect of the present invention, an optical disk apparatus for reproducing information recorded on a recording medium having two information faces, by irradiating the recording medium with a focused light beam, comprises a moving means for moving a focal point of the light beam irradiating the recording medium so that the focal point crosses a track on the recording medium; a light detecting means for detecting a reflected light from the recording medium; a focus control means for detecting a focus condition of the light beam irradiating the information faces on the basis of an output signal from the light detecting means, driving the moving means on the basis of the detection signal, and controlling the light beam so that the focus condition of the light beam becomes a prescribed focus condition; a focus jumping means for jumping the focal point of the light beam to a target information face, which is one of the first information face and the second information face, a focus position storage means for storing desired target positions of the focus control means on the first information face and the second information face when the jumping and seeking are performed by the focus jumping means; and a system control means for controlling the system so that the target position of the focus control means is changed to a focus position signal that is read out of the focus position storage means and corresponds to the target information face, when the jumping and seeking are performed by the focus jumping means. Therefore, for either information face, a stable tracking control system can be constructed.

According to a thirty-second aspect of the present invention, an optical disk apparatus for reproducing information recorded on a recording medium having two information faces, by irradiating the recording medium with a focused light beam, comprises a moving means for moving a focal point of the light beam irradiating the recording medium so that the focal point crosses a track on the recording medium; a tracking control means for detecting a positional error between the focal point of the light beam and the track on the recording medium, driving the moving means according to the track error signal, and controlling the light beam so that the focal point is positioned on the track; a focus jumping means for jumping the focal point of the light beam to a target information face, which is one of the first information face and the second information face, and seeking the target information face; a tracking position storage means for storing desired target positions of the tracking control means on the first information face and the second information face, when the jumping and seeking are performed by the focus jumping means; and a system control means for controlling the system so that the target position of the tracking control means is changed to a tracking position signal which is read out of the tracking position storage means and corresponds to the target information face, when the jumping and seeking are performed by the focus jumping means. Therefore, for either information face, a stable tracking control system can be constructed.

According to a thirty-third aspect of the present invention, an optical disk apparatus comprises a focusing means for focusing a light beam on a recording medium having first and second information faces; a moving means for moving a focal point of the light beam focused by the focusing means in a direction substantially perpendicular to a track on the recording medium; a light detecting means for detecting a reflected light from the recording medium at a plurality of light responsive parts; a phase difference track error detecting means for generating a phase difference track error signal corresponding to the positional relationship between the focal point of the light beam and the track on each information face, on the basis of the phase relationship of signals output from the respective light responsive parts of the light detecting means; a tracking control means for driving the moving means according to an output signal from the phase difference track error detecting means, and controlling the light beam on the information face so that the focal point of the light beam seeks the track correctly; a focus jumping means for jumping the focal point of the light beam to a target information face, which is one of the first information face and the second information face, and seeking the target information face; a phase offset storage means for storing delays or leads of signals output from the respective light responsive parts of the light detecting means, the delays or leads providing desired values for output signals from the phase difference track error detecting means on the first information face and the second information face, when the jumping and seeking are performed by the focus jumping means; and a system control means for controlling the system so that the delays or leads of the signals from the respective light responsive parts of the light detecting means are changed to a phase offset signal, that is read out from the phase offset storage means and corresponds to the target information face when the jumping and seeking are performed by the focus jumping means. Therefore, the offset of the tracking control means can be always eliminated, whereby a stable tracking control system can be constructed.

BRIEF DESCRIPTION OF THE DRAWINGS

FIG. 2 is a block diagram illustrating a part of the apparatus shown in FIG. 1, relating to focus control and focus lead-in;

FIGS. 4(a) and 4(b) show waveforms of FE signals, UP/DOWN signals, and AS signals of a CD and a DVD having different base material thicknesses, respectively;

FIG. 7 shows waveforms of a lens driving signal and an FE signal, and the position of the focusing lens, for explaining a focus lead-in operation according to the present invention;

FIGS. 20(a) and 20(b) show waveforms for explaining a focus lead-in operation according to the prior art;

FIG. 22 is a flow chart for explaining the focus lead-in operation according to the prior art;

DETAILED DESCRIPTION OF THE PRESENT INVENTION

1. Structure of Optical Recording and Reproducing Apparatus

Figure 1:
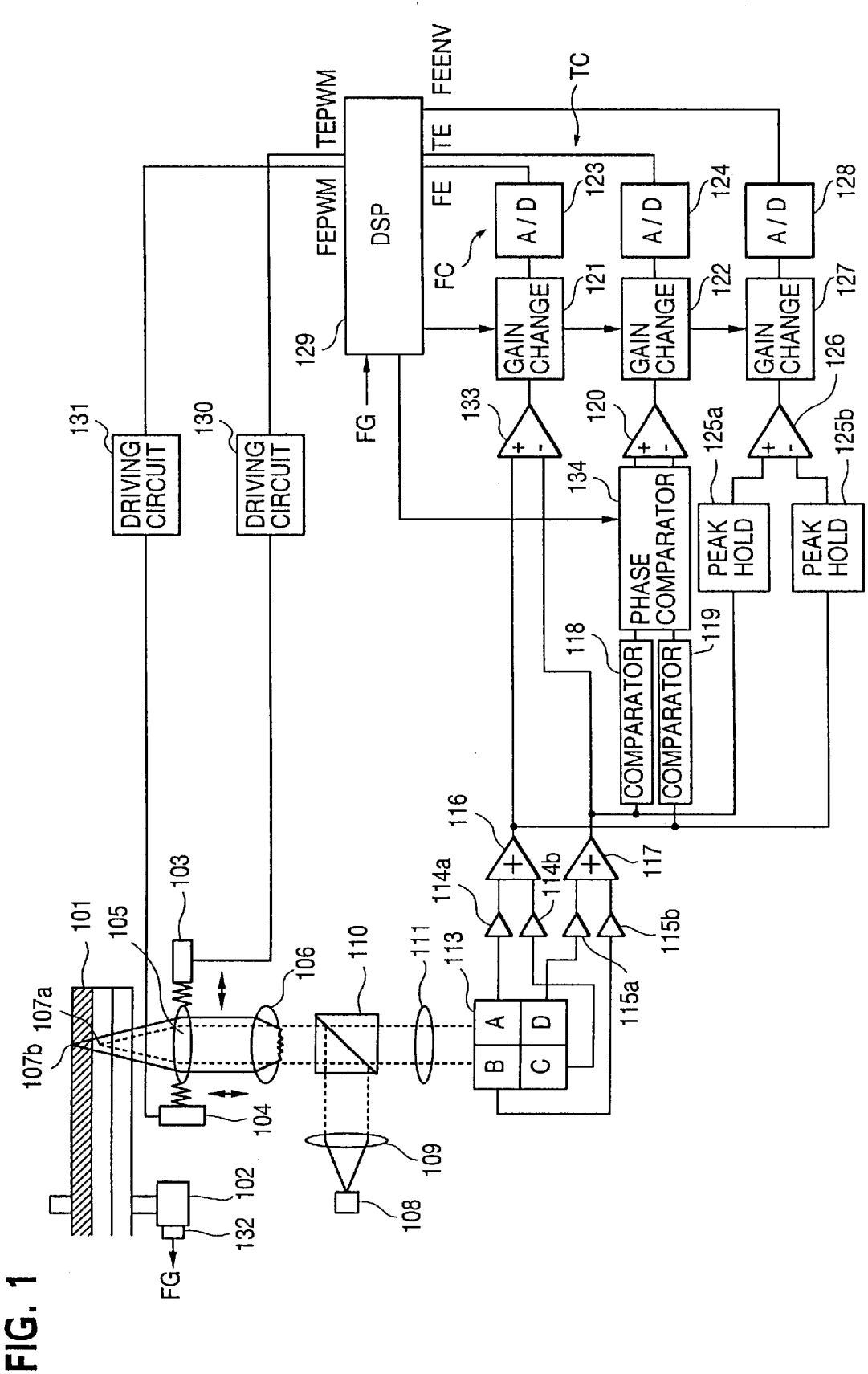
FIG. 1 is a block diagram illustrating an optical disk apparatus according to the present invention.

FIG. 1 shows an optical disk apparatus in accordance with a first embodiment of the present invention.

As shown in FIG. 1, an optical system for irradiating a disk 101 (recording medium) with light beams 107a and 107b is composed of a light source 108, such as a semiconductor laser, a coupling lens 109, a polarization beam splitter 110, a hologram element 106, a focusing lens 105, and a disk motor 102 for rotating the disk 101 at a prescribed r.p.m. A light beam emitted from the light source 108 is collimated by the coupling lens 109 and reflected by the polarization beam splitter 3 to the hologram element 106. The light beam is splitted into two beams by the beam splitter 3 and the hologram element 106. Thereafter, the two beams are focused by the focusing lens 105, forming two focuses 107a and 107b in the direction perpendicular to the surface of the disk.

The two light beams 107a and 107b irradiate the disk 101 that is rotated by the disk motor 102. These two light beams are used according to the base material thickness of the disk 101. For example, when the disk 101 is a CD having a thickness of 1.2 mm, the light beam 107b is focused on the information face. On the other hand, when the disk 101 is a high-density disk, such as a DVD having a thickness of 0.6 nmm, the light beam 107a is focused on the information face.

Figure 6A:
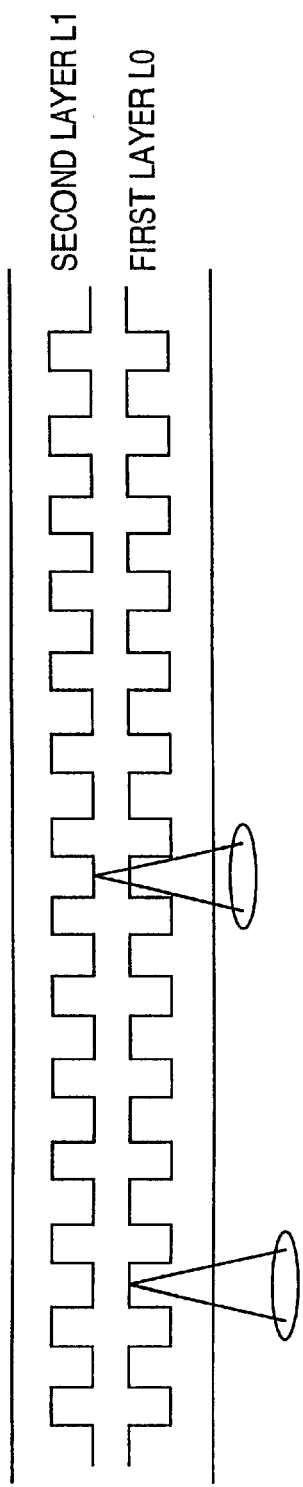
FIGS. 6(a) and 6(b) are cross-sectional views illustrating a dual-layer disk and a multiple-layer disk, respectively, employed in the present invention.
Figure 6B:
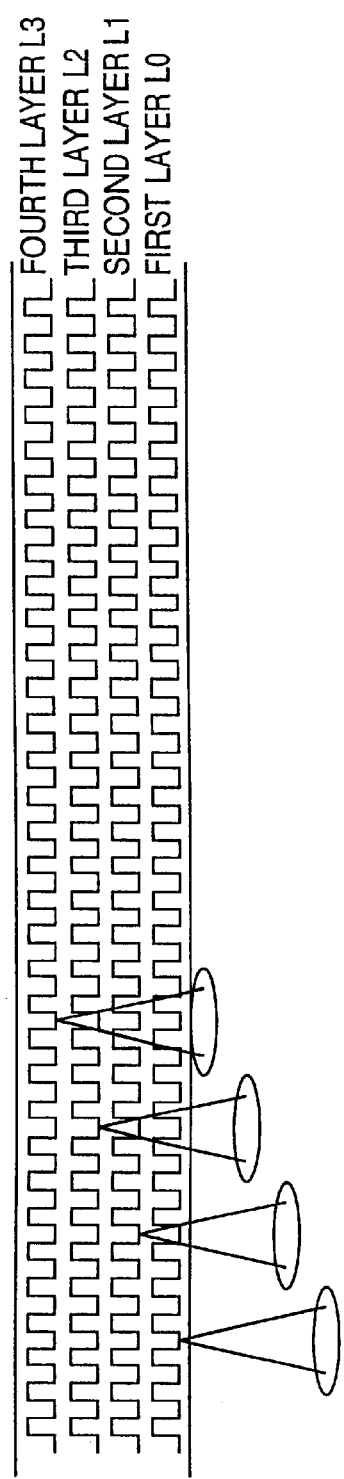

Further, the optical disk apparatus according to the present Invention is applicable to a disk having a plurality of information faces, for example, a dual-layer disk in which two films, one of which is a semi-transparent film, are bonded with a 20–60 μm adhesive film like a sandwich as shown in FIG. 6(a), or an N-layer disk in which several microns thick recording and reproducing films are laminated as shown in FIG. 6(b) (in the Figure, N=4).

This optical disk apparatus further includes a condenser lens 111 and a four-element photodetector 113, both for receiving a reflected light from the disk 101. The reflected light from the disk 101 passes through the focusing lens 105, the hologram element 106, the polarization beam splitter 110, and the condenser lens 111, and is input to the four-element photodetector 113. The light beam is converted into electric signals in the four element photodetector 113, and the electric signals are input to a focus control system FC and a tracking control system TC.

The tracking control system TC comprises the four element photodetector 113, preamplifiers 114a, 114b, 115a, and 115b, adders 116 and 117, comparators 118 and 119, a phase comparator 134, a differential amplifier 120, a gain change circuit 122, a DSP 129, an A/D converter 124, a driving circuit 130, and a tracking actuator 103. The light beam input to the four-element photodetector 113 is converted to electric signals (current) by light responsive parts A, B, C and D, of the photodetector 113, and the electric signals are converted to voltage signals and amplified by the preamplifiers 114a, 115a, 114b, and 115b, respectively. The amplified signals are input to the adders 116 and 117, wherein the signals corresponding to the light responsive parts A and C of the photodetector 113 are added up by the adder 116 and the signals corresponding to the light responsive parts B and D are added up by the adder 117. Thereafter, output signals from the adders 116 and 117 are digitized by the comparator 119 and 118, respectively, and phases of these signals are compared by the phase comparator 134. Then, high frequency components of these signals are cut off. The output signals from the phase comparator 134 are input to the differential amplifier 120. It is well known that an output from the differential amplifier 120 shows a result of comparison of phases of the light beam that includes data on the disk 101 and irradiates the photodetector 113, that is, it shows an error of the focal point of the light beam from the track on the disk 101. So, the output from the differential amplifier 120 becomes a track error signal (TE signal), according to the phase difference method, for controlling the light beam so that it scans the track correctly.

The method for detecting the TE signal is not restricted to the above-mentioned phase difference method. Other methods, such as a push-pull method and a three beam method, may be employed.

The TE signal is adjusted to a prescribed amplitude (gain) by the gain change circuit 122. Thereafter, it is converted to a digital signal by the A/D converter 124 and input to the DSP 129.

On the other hand, the focus servo system comprises the four-element photodetector 113, the preamplifiers 114a, 114b, 115a, and 115b, the adders 116 and 117, a differential amplifier 133, a gain change circuit 121, an A/D converter 123, the DSP 129, a driving circuit 131, and a focus actuator 104.

The output signals from the light responsive parts A, B, C, and D of the four-element photodetector 113 are converted to voltage signals and amplified by the preamplifiers 114a, 115b, 114b, and 115a, respectively. Then, the amplified signals are input to the adders 116 and 117, wherein the signals corresponding to the light responsive parts A and C of the photodetector 113 are added up by the adder 116 and the signals corresponding to the light responsive parts B and D are added up by the adder 117. Thereafter, output signals from the adders 116 and 117 are input to the differential amplifier 133.

It is known that an output signal from the differential amplifier 133 shows a focus error of the light beam on the information face of the disk 101. That is, the output signal from the differential amplifier 133 is a focus error signal (FE signal), according to the astigmatic method, for controlling the light beam so that the light beam is focused on a prescribed position of the information face of the disk 101. The method for detecting the FE signal is not restricted to the astigmatic method. Other methods, such as a knife edge method and an SSD (Spot Sized Detection) method, may be employed.

The gain change circuit 121 adjusts the amplitude of the FE signal to a prescribed amplitude (gain) in response to the amount of light beam corresponding to the reflectivity or the like of the disk 101. Thereafter, the FE signal is converted to a digital signal by the A/D converter 123 and input to the DSP 129.

Figure 2:
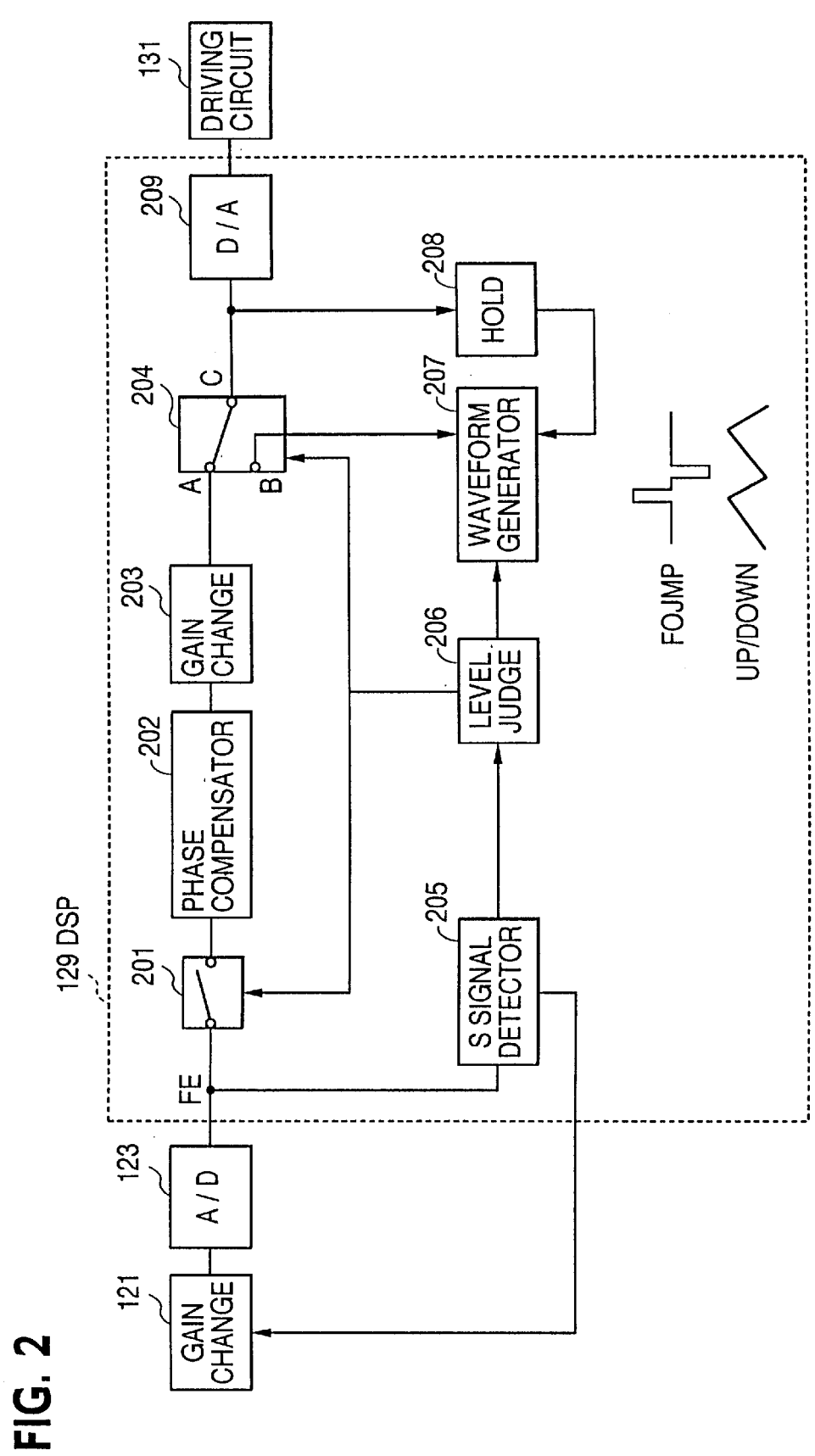

FIG. 2 is a block diagram illustrating the focus servo system and the focus lead-in system within the DSP 129.

The DSP 129 constitutes a digital control system and comprises a switch 201, a phase compensating filter 202, a gain changeable module 203, a switch 204, an S signal detecting part 205, a level judge part 206, a waveform generating part 207, and a hold part 208.

The FE signal output from the A/D converter 123 is sent through the switch 201, which opens and closes a loop of the focus servo system, to the phase compensating filter 202 comprising an adder, a multiplier, and a delay element. The phase delay of the FE signal in the focus servo system is compensated by the phase compensating filter 202. Thereafter, the FE signal is sent through the gain switch circuit 203, which sets a loop gain of the focus servo system, to the switch 204. The switch 204 opens and closes the loop of the servo system. Further, when the focus lead-in performed, the switch 204 sends an UP/DOWN signal for detecting the information face of the disk 101 by moving the focusing lens 105, through the D/A converter 209 to the driving circuit 131 for driving the focus actuator 104. The FE signal that passes through the switch 204 is converted to an analog signal by the D/A converter 209 and input to the driving circuit 131. In the driving circuit 131, the FE signal is subjected to appropriate current amplification and level change, whereby the focus actuator 104 is driven. In this way, the focus actuator 104 is driven so that the light beam is always focused on a prescribed position of the disk 101.

At the focus lead-in (when the focus servo control is led in), the waveform generator 207 outputs a chopping wave shaped UP/DOWN signal, turns on the B-C line of the switch 204, drives the focus actuator 104 through the D/A converter 209 and the driving circuit 131, and moves the focusing lens 105 toward the disk 101 and then downward away from the disk 101.

More specifically, after the A/D conversion, the FE signal branches in the DSP 129 and realizes a focus lead-in leaning operation. In this operation, the disk 101 is rotated, the semiconductor laser 108 emits light, and the waveform generator 207 outputs the UP/DOWN signal that moves the focusing lens 105 toward the disk 101 (UP) and then away from the disk 101 (DOWN). At this time, in the S signal detector 205, an amplitude of an S signal, which appears in the FE signal during the up and down movement of the focusing lens 105, is measured. When the measured amplitude is smaller than a prescribed amplitude, the gain switch circuit 122 is controlled to reduce the gain. When the measured amplitude is larger than the prescribed amplitude, the gain switch circuit is controlled to increase the gain. Therefore, it is possible to make the amplitude of the S signal constant by the output after the A/D converter 124. The FE signal including the S signal of the constant amplitude is input to the level judge part 206. In the level judge part 206, the FE signal is compared with a prescribed amplitude level (lead-in level). After the detection of the lead-in level, switch 201 is turned on and the A-C line of the switch 204 is turned on to close the focus servo loop, whereby the focus lead-in operation is achieved.

2. Focus Lead-in Method

A description is given of a focus lead-in method using the optical disk apparatus according to the present invention. For simplification, a CD is employed as a disk having a base material thickness of 1.2 mm, and a DVD-ROM (Read Only Memory Digital Video Disk) is employed as a disk having a base material thickness of 0.6 mm.

Figure 3A:
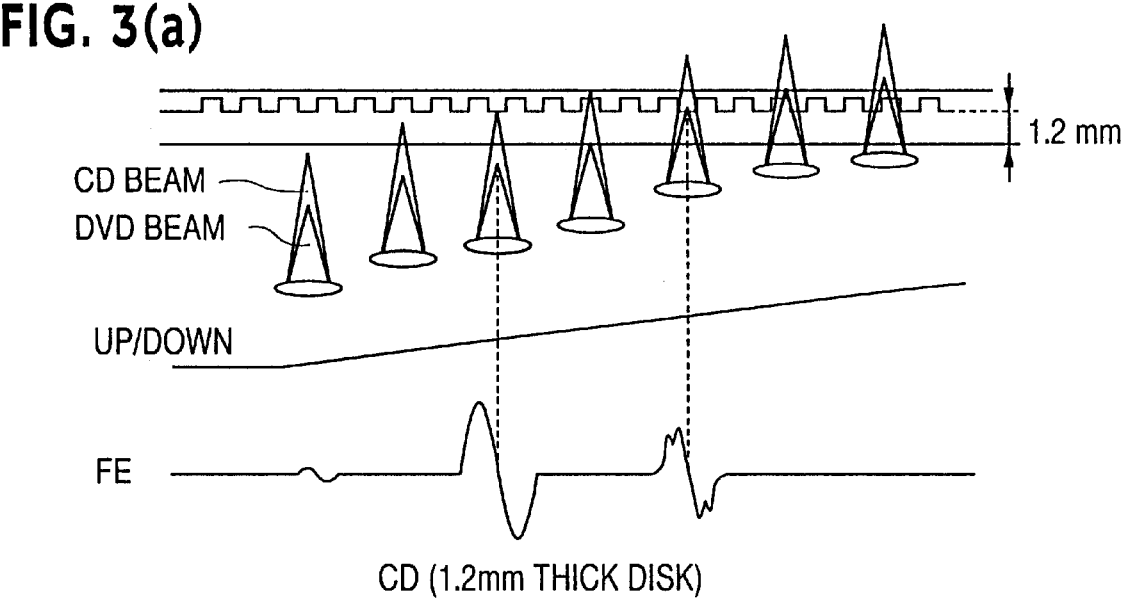
FIGS. 3(a) and 3(b) show a CD and a DVD having different base material thicknesses, and waveforms of UP/DOWN signals and FE signals.
Figure 3B:
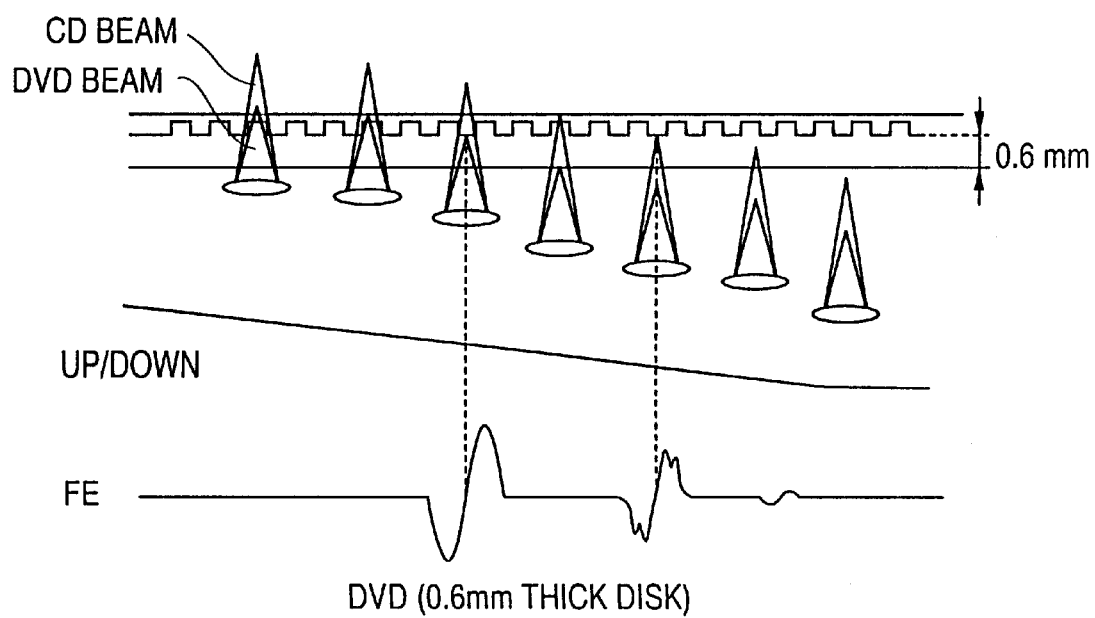

As described above, in the optical disk apparatus according to the present invention, in order to secure a compatibility between a disk having a base material thickness of 1.2 mm, such as a CD, and a disk having a base material thickness of 0.6 mm, such as a DVD, the light beam emitted from the light source 108 is divided into two beams using the hologram element 106, and the two beams are focused on the disk. Therefore, when the focusing lens 105, i.e., the two light beams, approaches the disk 101 and goes away from the disk 101, S signals are detected in the FE signal at every passage of the two light beams through the information face of the disk. That is, S signals due to the light beam for the 1.2 mm thick CD and S signals due to the light beam for the 0.6 mm thick DVD appear as shown in FIGS. 3(a) and 3(b), respectively.

By the way, the focal point of the light beam for the CD (hereinafter referred to as CD beam) is positioned above the focal point of the light beam for the DVD (hereinafter referred to as DVD beam). So, as shown in FIG. 3(a), an initial S signal that appears when the focusing lens 105 moves up toward the disk 101 from its lowermost position shows that the CD beam is focused on the information face. As shown in FIG. 3(b), an initial S signal that appears when the focusing lens 105 moves downward from the position nearest to the disk 101 shows that the DVD beam is focused on the information face.

Therefore, when the CD is loaded in the apparatus, the focusing lens 105 is moved down away from the disk with a mechanical intermediate point as a reference. When the CD beam spot is sufficiently distant from the disk, the focusing lens 105 is moved up toward the disk, and an S signal that appears for the first time is detected, whereby the CD beam can be focused on the information face of the CD. On the other hand, when the DVD is loaded in the apparatus, the focusing lens 105 is moved up toward the disk. When the focusing lens 105 is sufficiently close to the disk, i.e., when the DVD beam spot goes through the disk, the focusing lens 105 is gradually moved away from the disk, and an S signal that appears for the first time is detected, whereby the DVD beam can be focused on the information face of the DVD.

Since both the CD and the DVD have a diameter of 120 mm, it is difficult to identify whether the disk loaded in the apparatus is a CD or a DVD. Therefore, as shown in FIGS. 4(a) and 4(b), the focusing lens 105 is once moved down from the initial position 0 to the point A and then moved up toward the disk, and an initial S signal amplitude PC that appears in the FE signal at the point B or an initial signal amplitude that appears in an AS signal (total light amount signal, i.e., total of signals output from the adders 116 and 117) is detected, whereby the disk loaded in the apparatus is identified. When the disk is a DVD, after the focusing lens 105 reaches the point D nearest to the disk, the focusing lens 105 is gradually moved away from the disk, and the information face of the DVD Is detected by that an S signal $Q_D$ that appears for the first time reaches a prescribed level LVL1 (point E in FIG. 4(a)). At this point E, the focus lead-in is performed. When the disk is a CD, after the focusing lens 105 reaches the point D nearest to the disk, the focusing lens 105 is moved through the point E to the point F farthest from the disk and then moved upward from the point F, and the information face of the CD is detected by that an S signal $R_C$ that appears for the first time reaches a prescribed level LVL2 (point G in FIG. 4(b)). At this point G, the focus lead-in is performed.

In this way, a high-speed and stable focus lead-in is realized for both the DVD having a base material thickness of 0.6 mm and the CD having a base material thickness of 1.2 mm.

The procedure of the focus lead-in operation will be described more specifically using FIGS. 4(a), 4(b), and 5.

Figure 5:
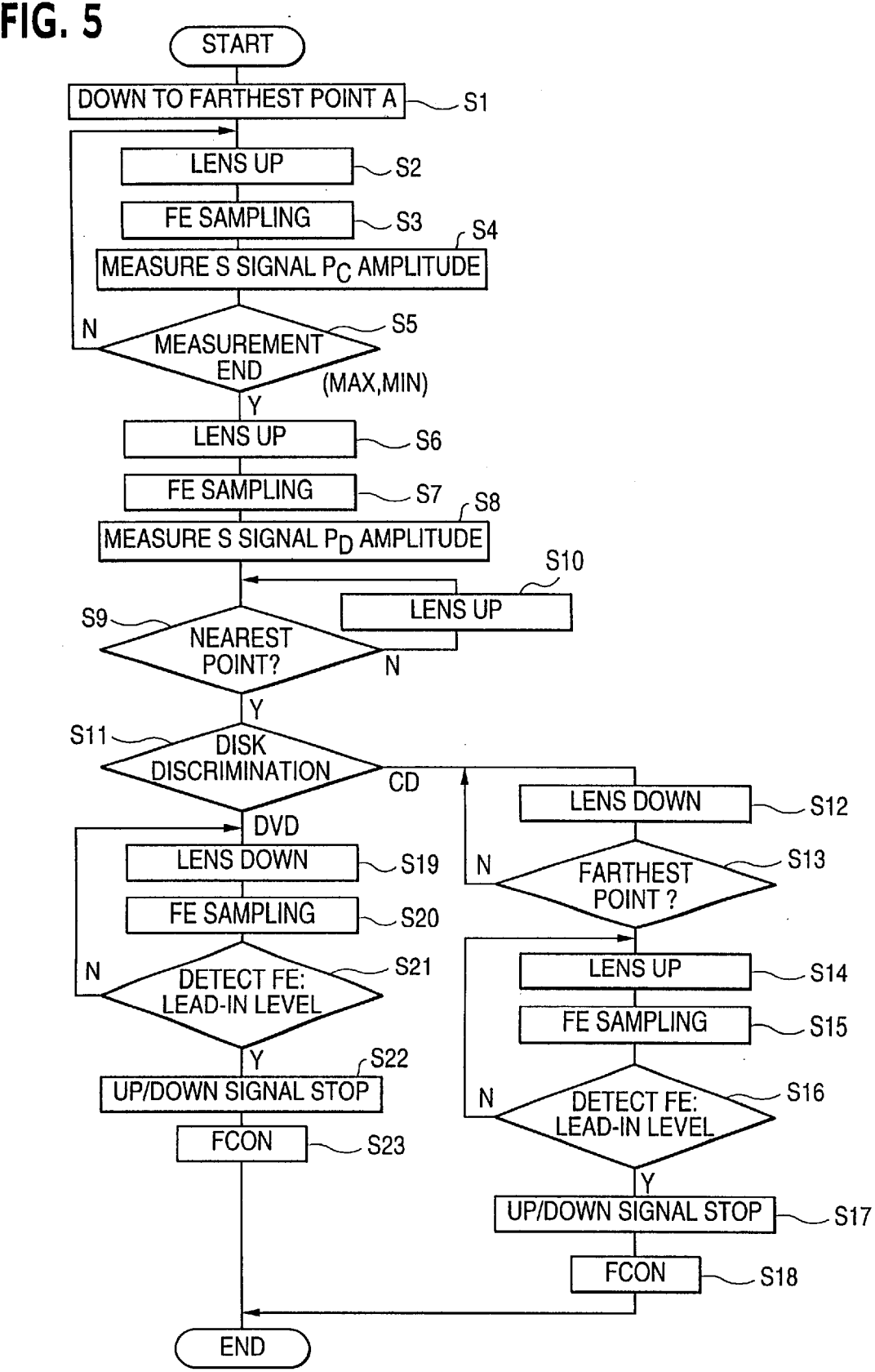
FIG. 5 is a flow chart for explaining a focus lead-in process according to the present invention.

FIG. 5 is a flow chart of the focus lead-in process.

When the disk apparatus is turned on, the motor 102 rotates. When a prescribed rotating speed is reached, the semiconductor laser 108 emits light.

Thereafter, the waveform generator 207 generates a chopping wave signal that drives the lens 105 up and down (UP/DOWN signal), and the UP/DOWN signal is sent through the switch 204 and the D/A converter 209 to the driving circuit 131. Receiving the UP/DOWN signal, the driving circuit 131 drives the focus actuator 104 so that the focusing lens 105 moves downward to the point A farthest from the disk shown in FIGS. 4(a) and 4(b) (step S1).

When the focusing lens 105 reaches the point A, the focusing lens 105 is then moved up toward the disk 101 (step S2), and an FE signal is sampled (step S3). As shown in FIG. 4(b), when the focusing lens 105 gradually moves upward, the focal point of the CD beam 107b, which is more distant from the lens than the focal point of the DVD beam 107a, reaches the information face of the disk at the point B. Since the S signal $P_C$ due to the CD beam appears in the vicinity of the point B, the amplitude of this S signal $P_C$ is measured (step S4).

The amplitude of the S signal $P_C$ is measured in the following process. That is, the FE signal is continuously sampled, a maximum value or a minimum value is obtained by comparing the sampled values of the FE signal, and an amplitude of the S signal $P_C$ is obtained from the maximum value or the minimum value.

When the measurement of the amplitude of the S signal $P_C$ is not completed, the focusing lens 105 is moved toward the disk 101 (N in step S5).

When the measurement of the amplitude of the S signal $P_C$ is completed (Y in step S5), the focusing lens 105 is moved toward the point D nearest to the disk (step S6). Meanwhile since the focal point of the DVD beam 107a below the focal point of the CD beam 107b also crosses the information face the S signal $P_D$ appears in the FE signal as shown in FIG. 4(a), and an amplitude of this S signal $P_D$ is measured (steps S7 and S8). When the focusing lens 105 reaches the point D (step S9 and S10), the amplitude of the S signal $P_C$ due to the CD beam is compared with the amplitude of the S signal PD due to the DVD beam, whereby it is identified whether the disk loaded in the apparatus is a CD or a DVD (step S11).

While the focusing lens 105 moves downward from the point D nearest to the disk 101, the focal point of the DVD beam 107a is the first to cross the information face, and an S signal corresponding to the DVD beam 107a appears in the FE signal. Next, the focal point of the CD beam 107b crosses the information face, and an S signal corresponding to the CD beam 107b appears in the FE signal.

Therefore, when the disk loaded in the apparatus is identified as a DVD, as shown in FIG. 4(a), it is detected that the S signal $Q_D$, which appears for the first time when the focusing lens moves away from the point D, reaches the lead-in level LVL1, and the focus control is performed (steps S19, S20, S21, S22, and S23).

On the other hand, when the disk loaded in the apparatus is identified as a CD, as shown in FIG. 4(b), the focusing lens 105 is moved from the point D to the point F, and S signals that appear during this movement of the lens are ignored (steps S12 and S13). Then, the focusing lens 105 is again moved upward from the point F, and it is detected that the S signal $R_C$, which appears for the first time during the upward movement of the lens, reaches the lead-in level LVL2, whereby the focus control is performed (steps S14, S15, S16, S17, and S18).

In this way, the focus lead-in is realized for the DVD and the CD. 3.

3. Focus Lead-in Method for Double-Layer Disk and Multiple-Layer Disk

FIG. 6(a) is a cross-sectional view illustrating a dual-layer disk in which 0.6 mm thick base material layers are bonded to each other, and FIG. 6(b) is a cross-sectional view illustrating a multiple-layer disk in which a plurality of thin signal films are laminated. Hereinafter, a focus lead-in method for the dual-layer disk shown in FIG. 6(a) will be described.

FIG. 7 shows waveforms of an FE signal and a focus actuator driving signal, and relative positions of the focusing lens and the dual-layer disk, when the focusing lens approaches the dual-layer disk. As shown in FIG. 7, two continuous S signals (double S signals), for example, P1 and P2, appear, on the FE signal that is obtained from the differential amplifier 133 and through the gain changeable module 121 and the AD converter 123. A leaning is performed so that the amplitudes of the S signals become constant, a prescribed level in the vicinity of the zero cross point (focal point) is detected, and the focus lead-in is performed.

Figure 8:
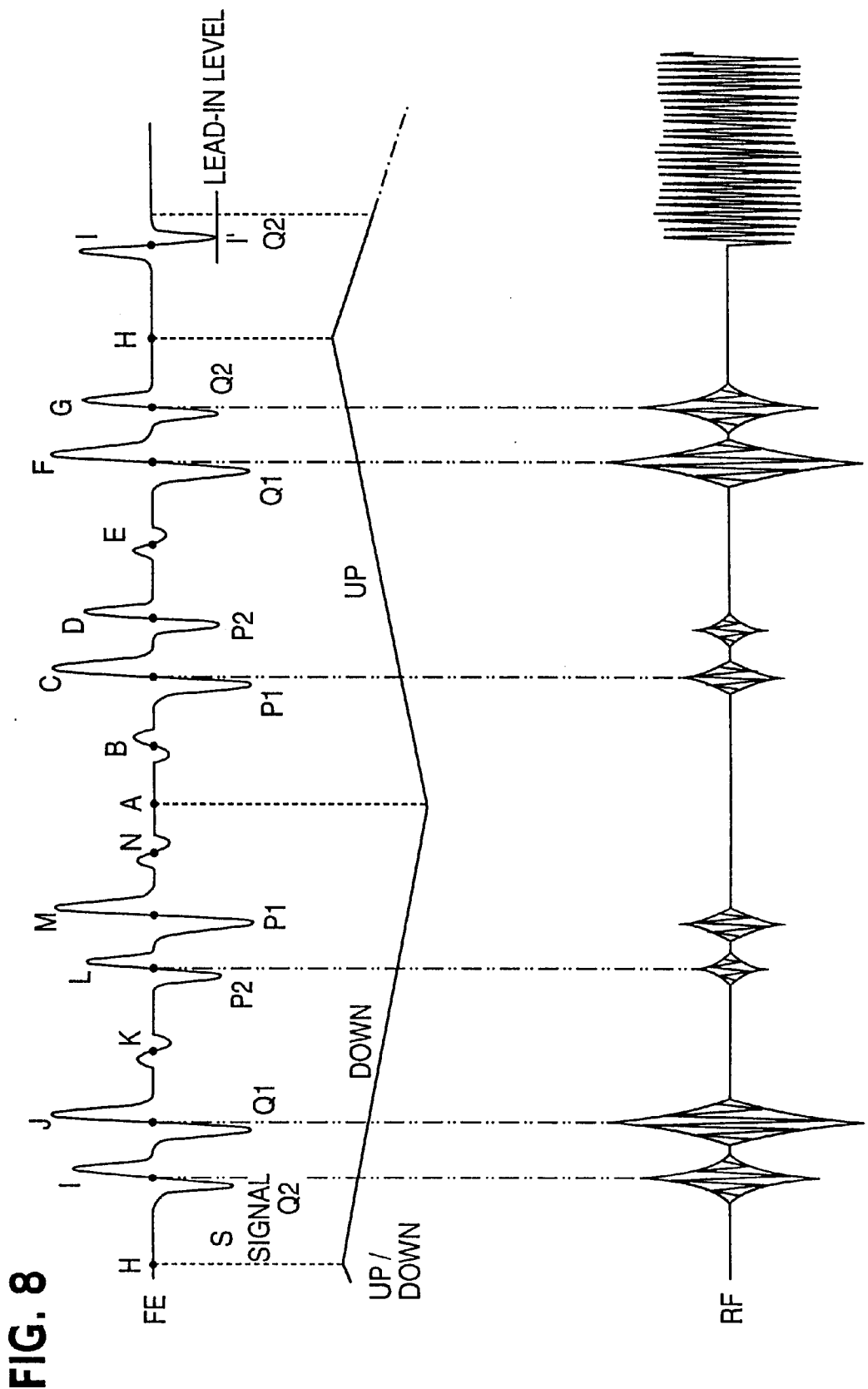
FIG. 8 shows waveforms of an FE signal, a lens driving signal, and an RF signal, for explaining a focus lead-in operation according to a second embodiment of the present invention.
Figure 9:
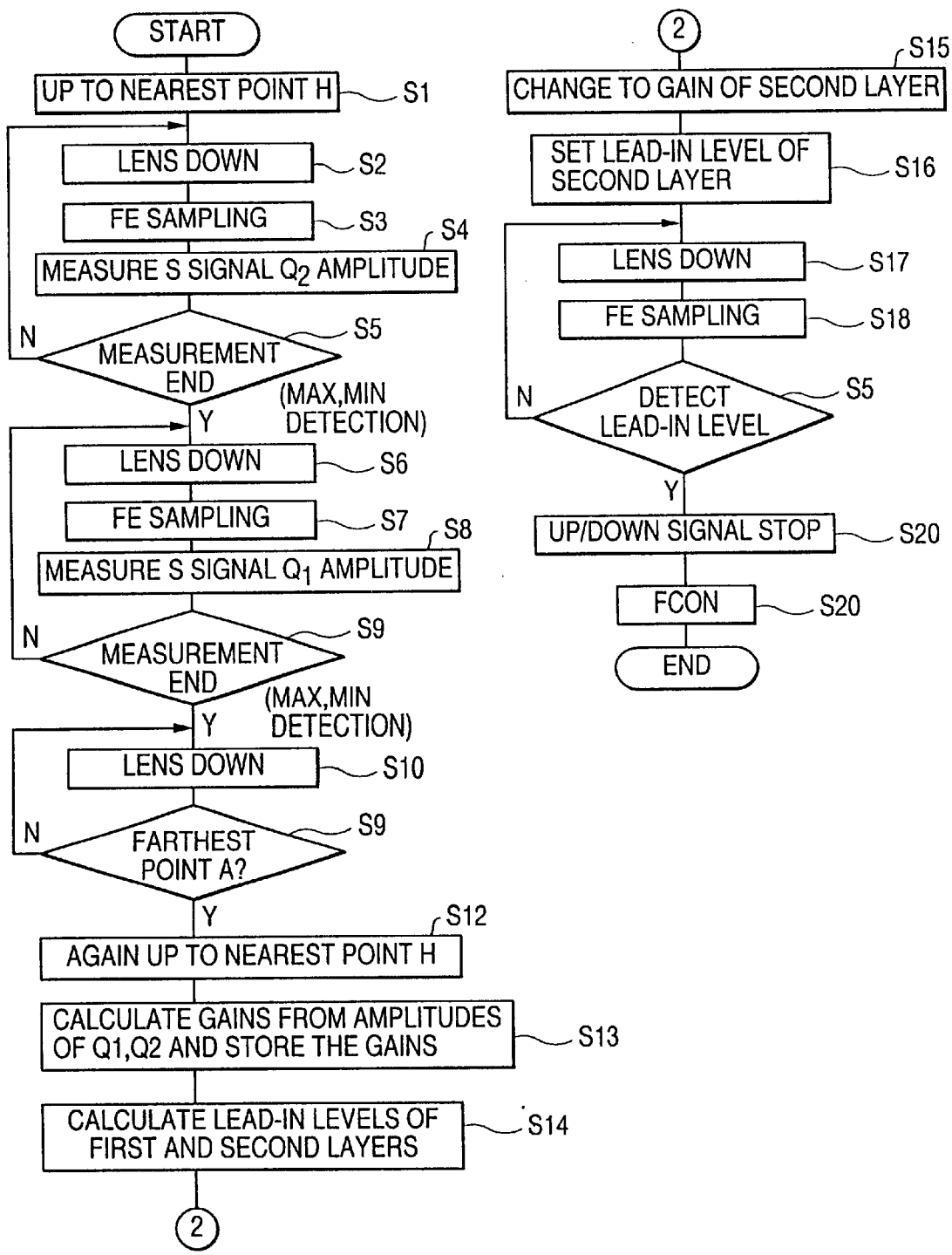
FIG. 9 Is a flowchart for explaining the focus lead-in process according to the present invention.

FIG. 8 shows waveforms of the FE signal at the practical focus lead-in operation, the RF signal corresponding to the total amount of reflected light, and the UP/DOWN signal, i.e., focus driving signal, output from the waveform generator 207. In FIG. 8, the same alphabet as in FIG. 7 designates the corresponding position. FIG. 9 is a flow chart of the focus lead-in leaning process.

In the dual-layer disk shown in FIG. 6(a), as in the single-layer disk, after the A/D conversion, the FE signal branches in the DSP 129 and realizes a focus lead-in leaning operation. In this operation, the disk 101 is rotated, the semiconductor laser 108 emits light, and the waveform generator 207 outputs the UP/DOWN signal that moves the focusing lens 105 toward the disk 101 (UP) and then away from the disk 101 (DOWN). At this time, in the S signal detector 205, an amplitude of an S signal, which appears in the FE signal during the up and down movement of the focusing lens 105, is measured. When the measured amplitude is smaller than a prescribed amplitude, the gain switch circuit 121 is controlled to reduce the gain. When the measured amplitude is larger than the prescribed amplitude, the gain switch circuit 121 is controlled to increase the gain. Therefore, it is possible to make the amplitude of the S signal constant by the output after the A/D converter 123. The FE signal including the S signal of the constant amplitude is input to the level judge part 206. In the level judge part 206, the FE signal is compared with a prescribed amplitude level (lead-in level). After the detection of the lead-in level, the switch 201 is turned on and the A-C line of the switch 204 is turned on to close the focus servo loop, whereby the focus lead-in operation is achieved.

The waveform generator 207 generates an accelerating pulse signal and a decelerating pulse signal when the light beam spot moves from the first layer to the second layer or from the second layer to the first layer. The accelerating pulse signal and the decelerating pulse signal will he described later for the first embodiment of the invention.

The relationship between the FE signal and the UP/DOWN signal output from the waveform generator 207 at the focus lead-in is as shown in FIG. 7. The focus lead-in process performed in the DSP 129 will be described using the waveform showing in FIG. 7 and the flow chart shown in FIG. 9.

When the disk apparatus is turned on, the motor 102 rotates. When a prescribed rotating speed is reached, the semiconductor laser 108 emits light, and the focus lead-in operation starts.

In FIG. 9, the waveform generator 207 generates a chopping wave signal that drives the lens 105 up and down (UP/DOWN signal), and the UP/DOWN signal is sent through the switch 204 and the D/A converter 209 to the driving circuit 131. Receiving the UP/DOWN signal, the driving circuit 131 drives the focus actuator 104 so that the focusing lens 105 moves upward to the point H nearest to the disk as shown in FIGS. 7 and 8 (step S1). At this time, the focal point of the light beam 105a is positioned above the information face L1 of the second layer of the disk.

When the focusing lens 105 reaches the point H, the focusing lens 105 is then moved downward away from the disk 101 (step S2), and an FE signal is sampled (step S3). As shown in FIG. 7, when the focusing lens 105 gradually moves downward, the focal point of the light beam 107a, which is nearer to the lens than the focal point of the beam 107b, reaches the information face L1 of the second layer of the disk at the point I. Since an S signal Q2 corresponding to the L1 face appears in the vicinity of the point I, an amplitude of this S signal Q2 is measured (step S4).

The amplitude of the S signal Q2 is measured in the following process. That is, the FE signal is continuously sampled, a maximum value or a minimum value is obtained by comparing the sampled values of the FE signal, and an amplitude of the S signal Q2 is obtained from the maximum value or the minimum value. Further, in order to prevent the precision of the sampled FE signal from being degraded by circuit noise, noise due to an address part preformated on the disk; or noise due to scratches on the disk, the sampled FE signal is passed through a digital low-pass filter that is constituted by a software processing of the DSP 129, and a maximum value or a minimum value is obtained from the FE signal that has passed through the digital filter. Thereby, the amplitude can be measured with high precision.

When the measurement of the amplitude of the S signal Q2 is completed (Y in step S5), the focusing lens 105 is moved downward (step S6), and the FE signal is sampled (step S7). Since the distance between the second layer L1 and the first layer L0 is about 40 microns, immediately after the light beam spot has passed through the point I of the second layer L1, the light beam reaches the point J of the first layer L0. Since an S signal Q1 appears in the vicinity of the point J, an amplitude of this S signal Q1 is measured as described for the S signal Q2 (step S8).

When the measurement of the amplitude of the S signal Q1 is completed (Y in step S9), the focusing lens 105 is moved downward to the point E farthest from the disk (step S10). Meanwhile, since the focal point of the light beam 107b crosses the information face, an S signal corresponding to the focal point appears in the FE signal. When the surface deflection of the disk is significant, the light beams 107a and 107b detect the information face at almost the same time and the two S signals interfere with each other and become nonlinear. However, this portion is ignored, and the focusing lens 105 is moved down to reach the point A farthest from the disk 101.

When the focusing lens 105 reaches the point A, the focusing lens 105 is again moved up from the point A toward the disk 101. During the upward movement of the lens, since the focal point of the light beam 107b crosses the information face, an S signal corresponding to the focal point appears in the FE signal. When the surface deflection of the disk is significant, the light beams 107a and 107b detect the information face at almost the same time, and the two S signals interfere with each other and become nonlinear. So, it is difficult to accurately detect the information faces L0 and L1 with the light beam 107a. Therefore, during this upward movement of the lens, the detection of S signals is not performed, and the focusing lens 105 is quickly moved to the point H nearest to the disk 101 (step S12). At this time, on the basis of the amplitude of the S signal Q2 of the second layer and the amplitude of the S signal Q1 of the first layer, an appropriate focus gain for each of the first and second layer is calculated, and a set value of the gain change circuit 122 is stored in a RAM (Random-Access Memory, not shown in the figure) in the DSP 129. Further, an amplitude of the S signal at the changed gain value is calculated, and a value equal to 10–30% of the amplitude is set as a focus lead-in level. Thus, calculated lead-in levels for the first layer L0 and the second layer L1 are also stored in the RAM in the DSP 129 (steps S13 and S14).

Thereafter, a focus gain value and a lead-in level corresponding to the second layer L1 that is detected first by the light beam 105a when the focusing lens 105 is moved downward from the point E nearest to the disk 101 are set in the gain changeable module 122 and the level judge part 207, respectively (steps S15 and S16). After the setting, the focusing lens 105 is moved downward (step S17), and the FE signal is sampled (step S18), and the sampled FE signal is compared with the set lead-in level. When the lead-in level is reached or exceeded, it is judged that the lead-in level is detected (step S19). Then, the UP/DOWN signal is stopped (step S20) to stop the downward movement of the lens 105.

Finally, the switch 201 is turned on and the A-C line of the switch 204 is turned on to close the focus servo loop (step S21), whereby the focus lead-in is completed.

After the focus lead-in on the information face L1 that is reached first by the focal point of the light beam, the light beam is moved to a prescribed information face adjacent to the information face L1, and signals are recorded in or reproduced from this information face. The method of moving the light beam between the two information faces will be described later for the first embodiment of the invention.

Further, as described above, in steps S13 and S14, the S signals corresponding to the information faces L0 and L1 are measured, the set values of the gain changeable module 122 corresponding to the amplitudes of the S signals are stored in the RAM and the lead-in levels of the information faces L0 and L1, when the changed sat values attain prescribed amplitudes, are calculated. The stored gain set values of the information faces L0 and L1 are set for a target information face when focus jumping is performed. Further, the calculated lead-in levels are set for the respective information faces. The set value of the gain changeable module may be obtained from an amplitude of a signal proportional to the amount of reflected light, for example, the AS signal or the RF signal. This processing will be described in more detail for the second and third embodiments of the invention In the focus lead-in method according to the present invention after the focusing lens 105 is once moved up to the point H nearest to the disk 101 from the mechanical interference point, the focusing lens 105 is moved down to the point A farthest from the disk 101, and the amplitude of the S signal is measured. Then, the leaning of gain or the like is executed. Thereafter, the focusing lens 105 is again moved up to the point H and then moved down from the point H, and the S signal of the information face L1 that appears first is detected, whereby the focus is led in the information face L1.

Here, the focusing lens 105 is once moved down to the point A with the mechanical intermediate point as a reference and then moved up from the point A to the point H, and the S signal that appears in the FE signal is detected, and the gain is leaned. Thereafter, the S signal of the information face L1 that appears first when the focusing lens 105 is moved down from the point H is detected, whereby the focus Is led in the information face L1. As a result, the time required for the focus lead-in is reduced.

As described above, when a two-layer disk or a multiple-layer disk is loaded in the apparatus, the focus is always led in an information face that is farthest from the focusing lens and, thereafter, the focus is moved to another information face as desired using a focus jumping means according to the first embodiment of the invention which will be described later. Therefore, a reliable focus lead-in is performed and a move to a desired information face is possible.

By employing the focus lead-in method according to the present invention, in a recording and reproducing apparatus including an optical system having two focuses (light beams) corresponding to disks of different base material thicknesses, even when dual-layer or multiple-layer disks of different base material thicknesses are loaded in the apparatus, since the detection and measurement of S signals, the gain change, and the lead-in level leaning can be performed accurately by the two light beams corresponding to the respective disks, the focus can be led in the recording and reproducing face that is detected first, with high reliability.

Embodiment 1

A focus jumping from one information face to another information face in an optical disk apparatus according to the first embodiment of the invention will be described hereinafter with reference to FIGS. 1, 2, 10–12, 18, and 23. In this first embodiment, a dual-layer disk having two information faces L0 and L1 is employed. However, the focus jumping method according to the first embodiment of the invention may be applied to other multiple layer disks having more than two information faces.

Figure 10:
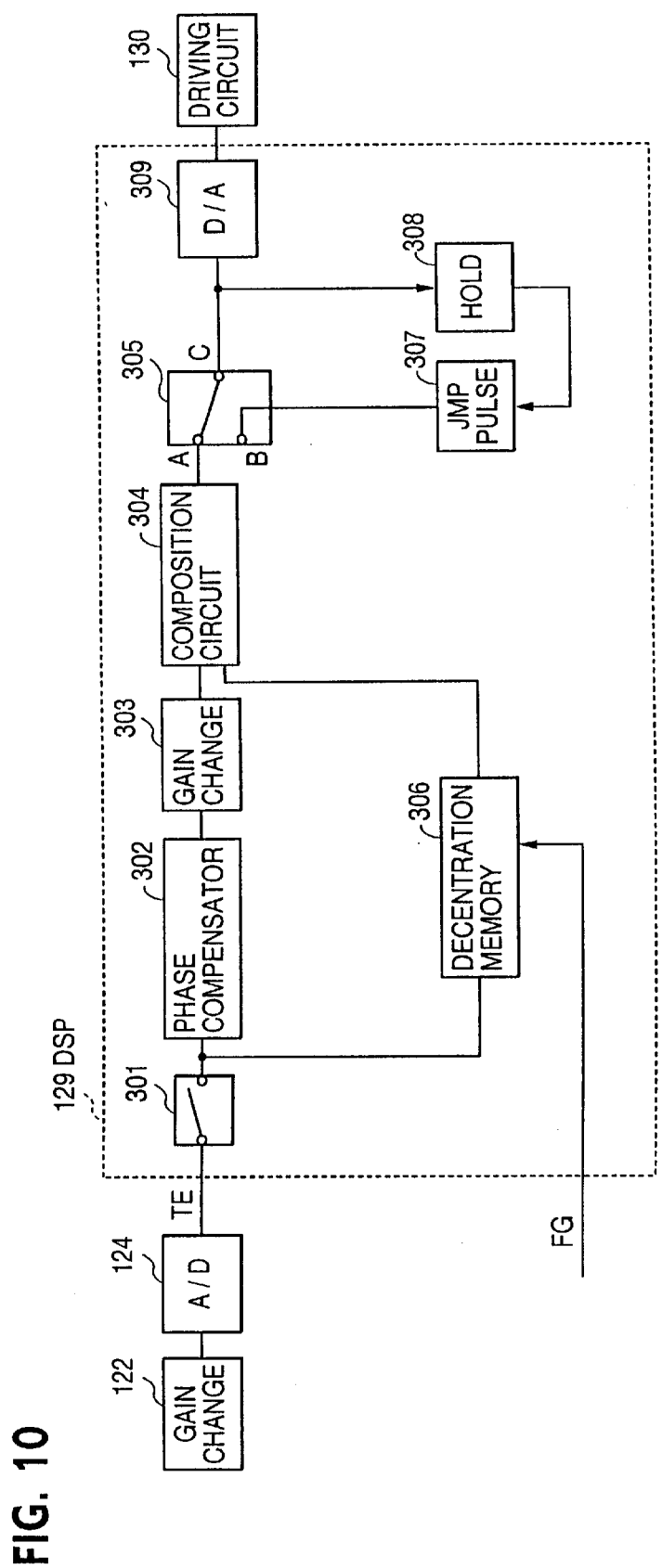
FIG. 10 is a block diagram illustrating a tracking servo system and a decentration correction part according to the present invention.
Figure 11:
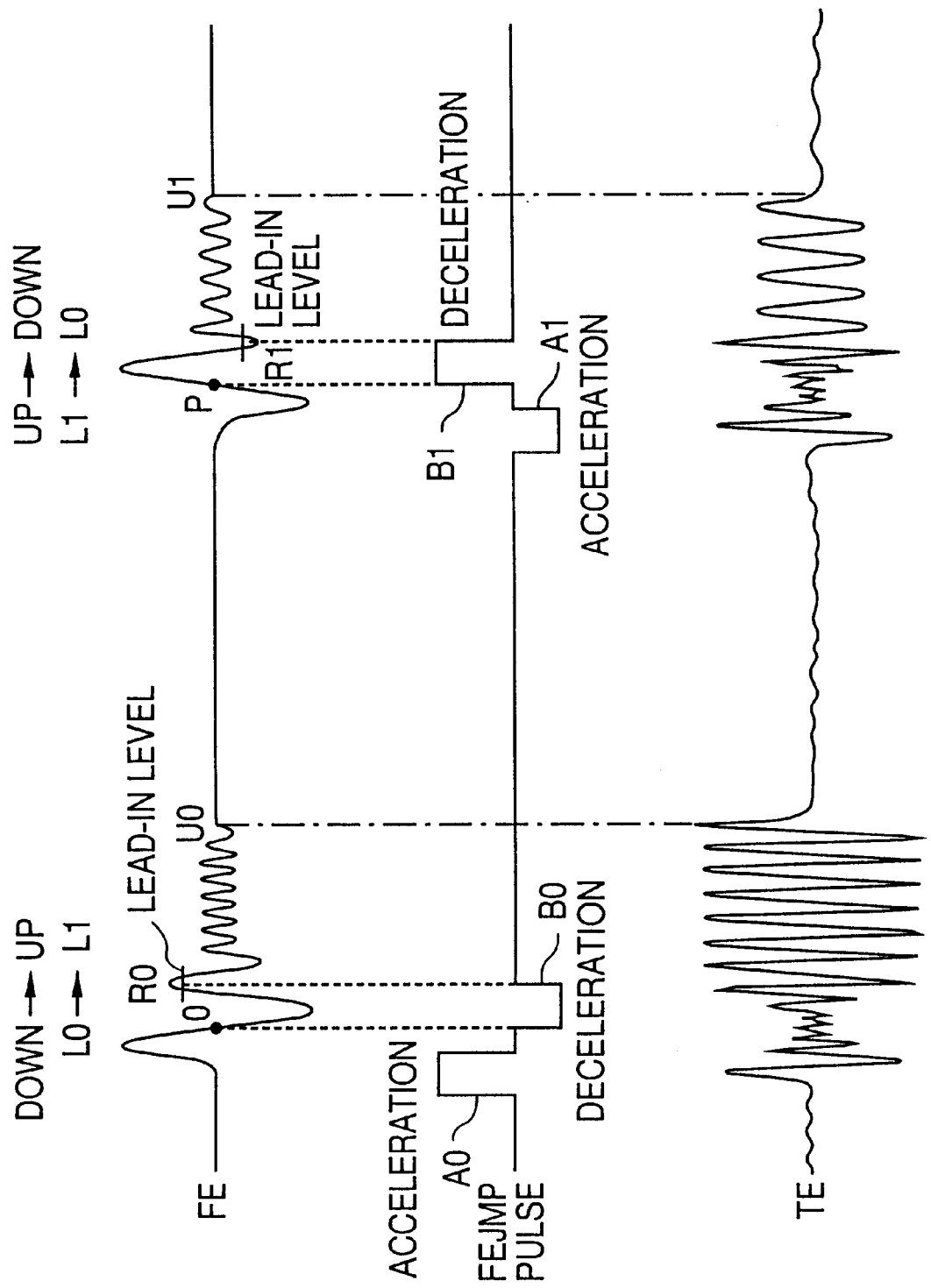
FIG. 11 shows waveforms of an FE signal, a lens driving signal, and a TE signal when a focus jumping is performed, according to a first embodiment of the present invention.

FIG. 10 is a block diagram illustrating the tracking servo system in the DSP 129 shown in FIG. 1. FIG. 11 shows waveforms of an FE signal, a positive and negative pulse signal FEJMP generated in the waveform generator and applied to the focus servo system, and a TE signal, when focus jumping is performed from L0 to L1, and from L1 to L0.

Figure 18:
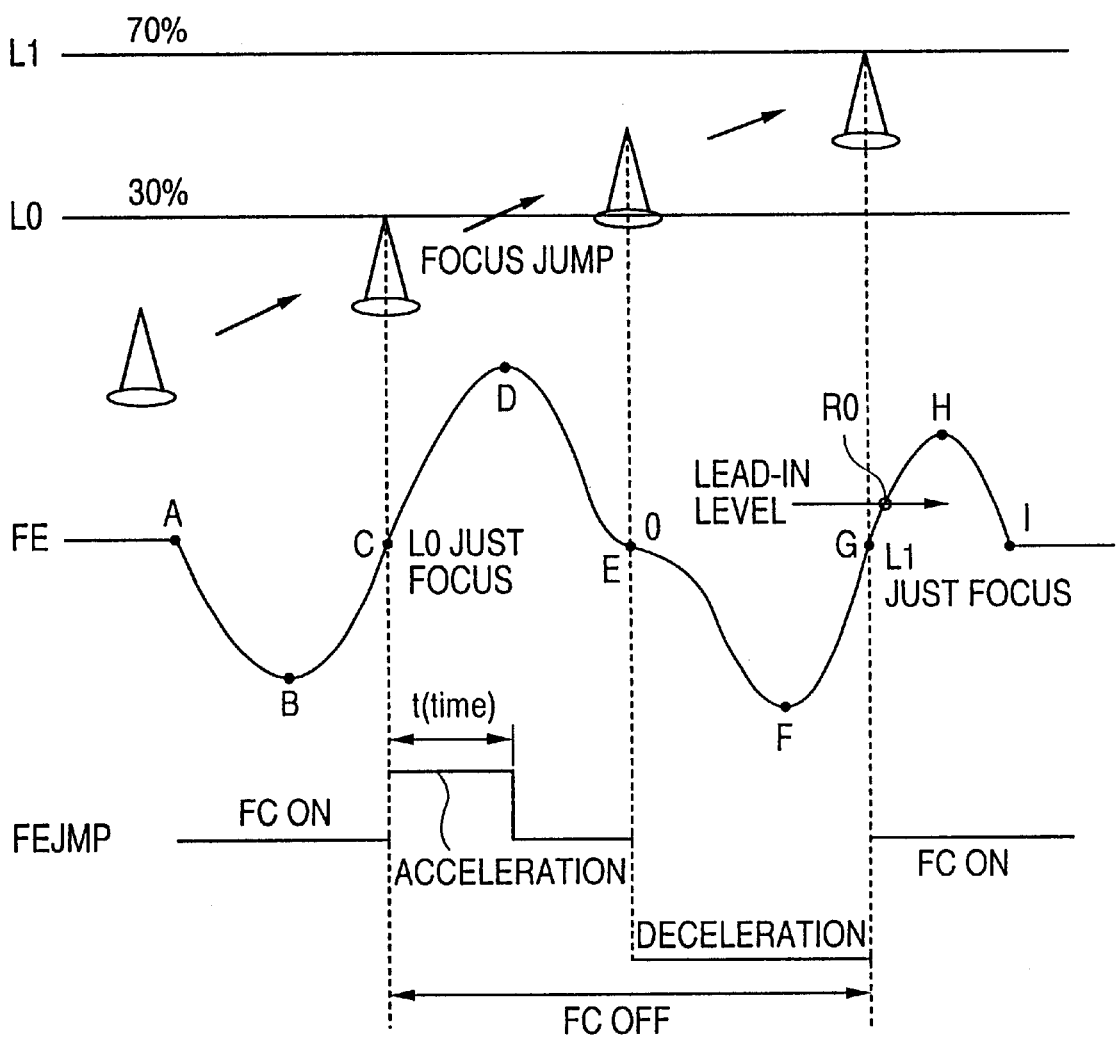
FIG. 18 is a diagram for explaining a focus jumping according to the first embodiment of the present invention.
Figure 19:
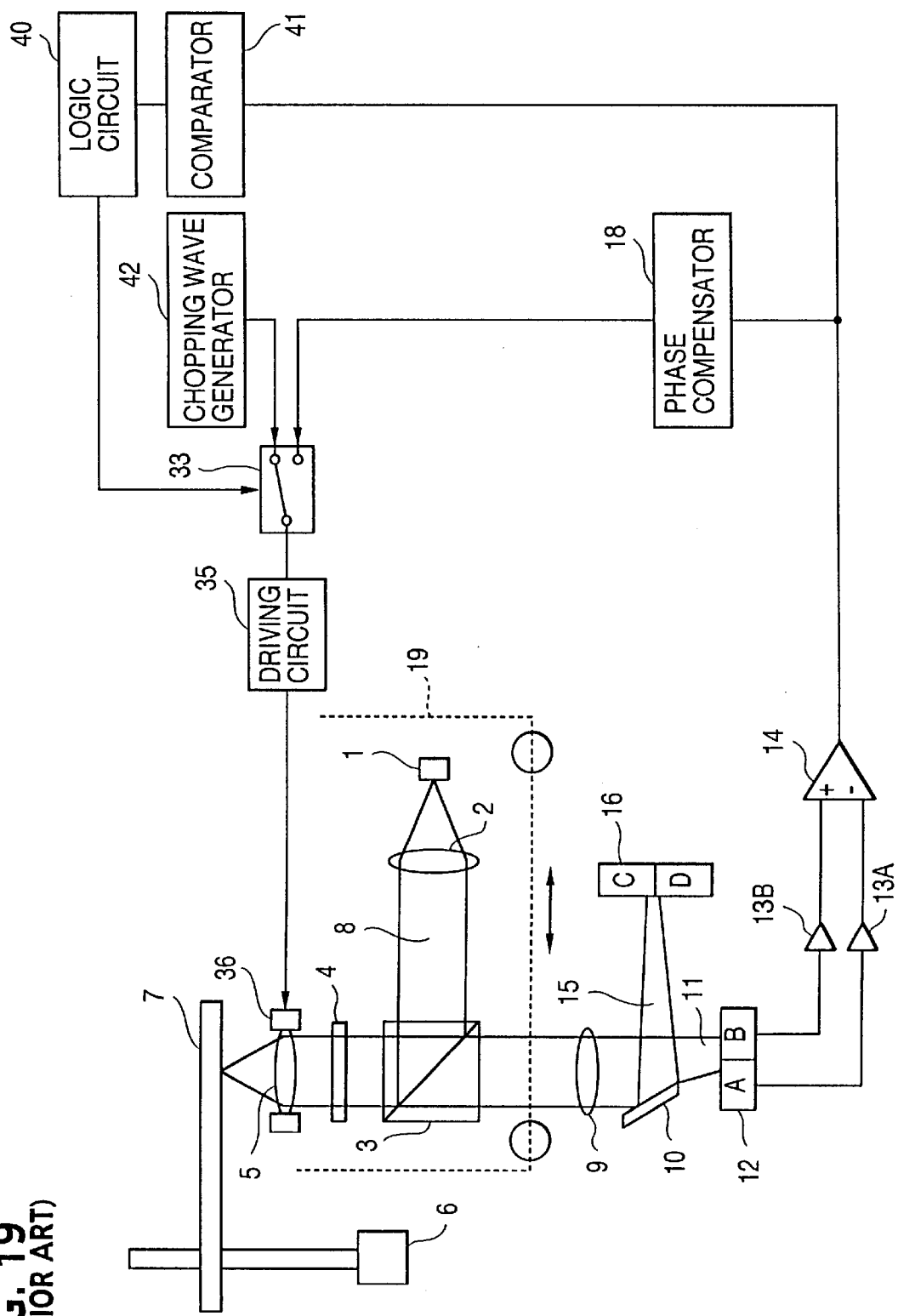
FIG. 19 is a block diagram illustrating a focus servo circuit according to the prior art.
Figure 21:
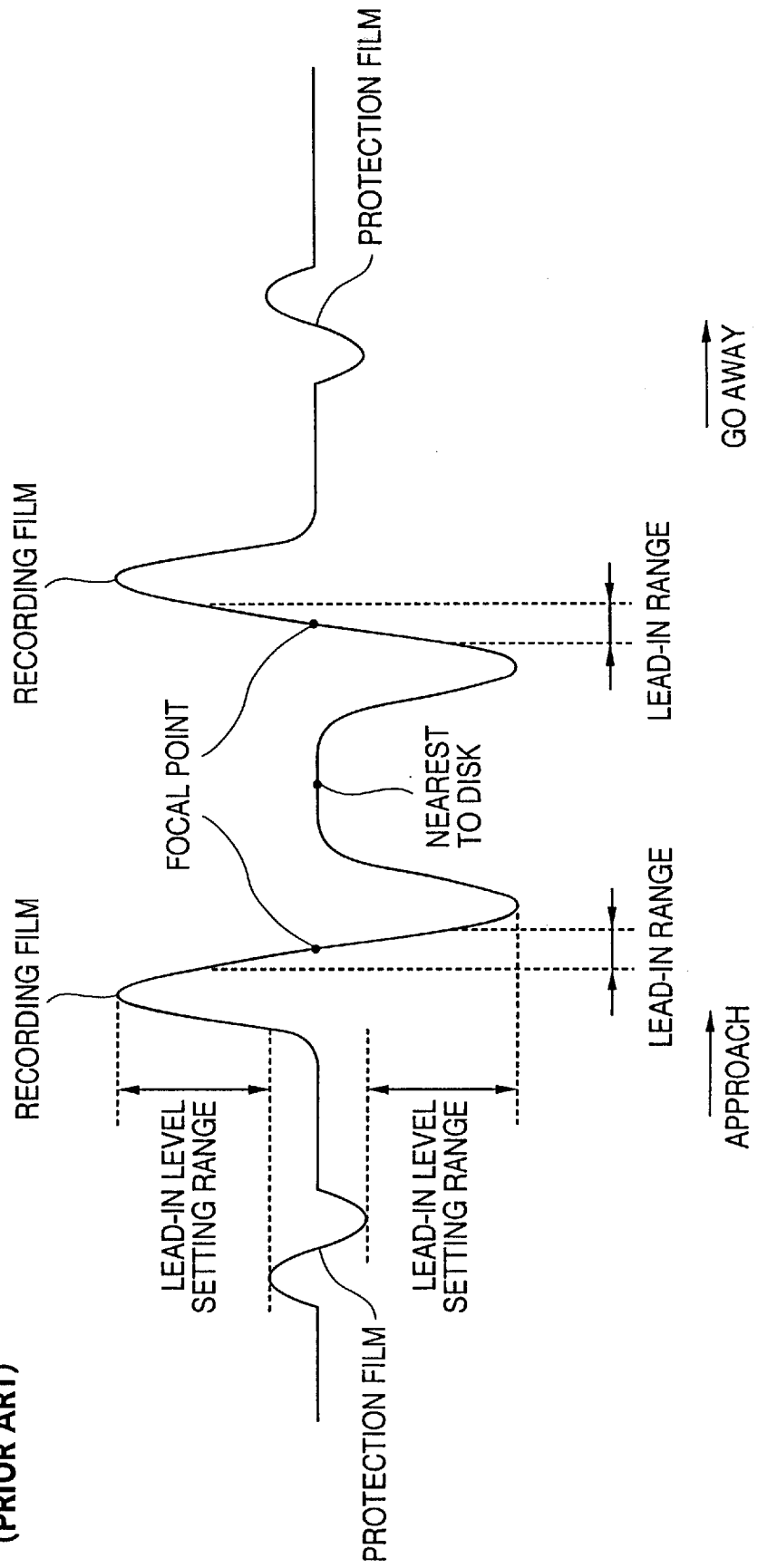
FIG. 21 shows a waveform for explaining the focus lead-in operation according to the prior art.
Figure 23A:
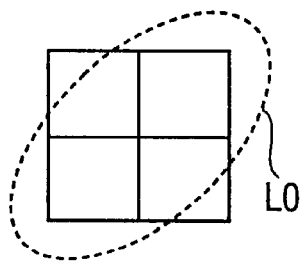
FIGS. 23(a)–23(i) are schematic diagrams illustrating light detecting spots when the FE signal is positioned at points A.–I in FIG. 18.
Figure 23E:
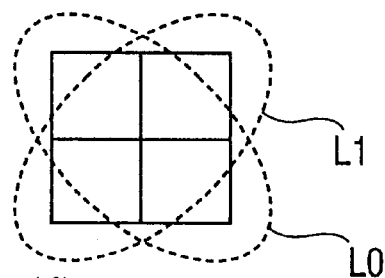
Figure 23B:
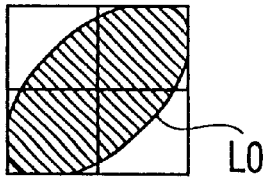
Figure 23F:
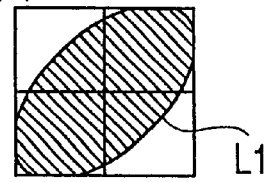
Figure 23C:
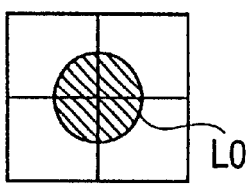
Figure 23G:
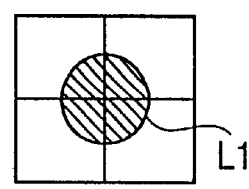
Figure 23D:
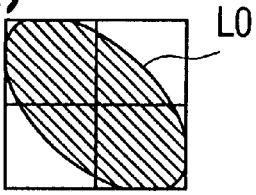
Figure 23H:
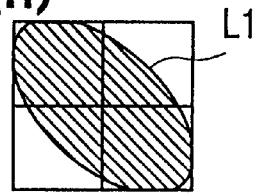
Figure 23I:
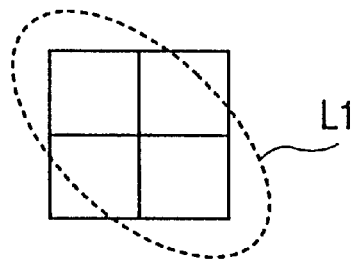

FIG. 18 shows the relative positions of the disk and the focusing lens (light beam) and the relationship between the FE signal and the focus jumping pulse signal FEJMP, when the focus jumping from L0 to L1 is performed. FIGS. 23(a), 23(b), 23(c), 23(d), 23(e), 23(f), 23(g), 23(h), 23(I) show spots detected by the photodetector when the FE signal is positioned at points A, B, C, D, E, F, G, H, and I in FIG. 18, respectively.

Initially, the fundamental operation according to this first embodiment of the invention will be described.

As shown in FIG. 18, when the focusing lens gradually moves toward the dual-layer disk, the focal point of the light beam passes through the information faces L0 and L1, and two periodic sine wave shaped signals, i.e., S signals, appear in the FE signal.

It is desired that the amount of reflected light from the information face L0 is approximately equal to that from the information face L1 to make the performance of the information face L0 approximately equal to that of the information face L1. For this purpose, the reflectivities of the information faces L0 and L1 should be about 30% and about 70% respectively. Since the S signal appears within a range of 7–10 $\mu$m from the top and the bottom of each information face, the distance between adjacent information faces should be sufficiently larger than this range so that the S signal generated by reflected light from an information face is not adversely affected by reflected light from another information face. In this first embodiment, the distance between the information faces L0 and L1 is about 40 $\mu$m.

When the focal point of the light beam approaches the information face L0, since the reflected light from the information face L0 increases, the amplitude of the FE signal increases with the negative polarity from the approximate 0 level (point A). The amplitude attains a peak at point B and, thereafter, it gradually decreases toward the 0 level. When the 0 level is reached (point C), the focal point of the light beam is position on the information face L0. When the focal point of the light beam goes away from the information face L0, the amplitude of the FE signal increases with, the positive polarity, attains a peak at point C, and then decreases to the 0 level.

Further, when the focal point of the light beam passes through the information face L0 and approaches the information face L1, since the reflected light from the information face L1 increases, the amplitude of the FE signal increases with the negative polarity from the approximate 0 level (point E). The amplitude attains a peak at point F and, thereafter, it gradually decreases toward the 0 level. When the 0 level is reached (point G), the focal point of the light beam is positioned on the information face L1. When the focal point of the light beam goes away from the information face L1, the amplitude of the FE signal increases with the positive polarity, attains a peak at point H, and then decreases to the 0 level. By the passage of the focal point of the light beam through the information faces L0 and L1, two periodic S signals appear as shown in FIG. 18.

When focus jumping is performed from L0 to L1, the tracking servo system is turned off, and an accelerating pulse signal and a decelerating pulse signal as shown in FIG. 18 are applied to the focus servo system while holding the focus control. For example, when the focus control is performed following the information face L0 (point C), the focus control is held, and an accelerating signal having a pre-scribed amplitude of a positive polarity is applied during the period t. By the accelerating signal, the light beam moves from the information face L0 toward the information face L1. Even though the accelerating signal becomes zero before the light beam reaches the information face L1, the light beam moves toward the information face L1 by inertia. At this time, in the FE signal, two S signals appear on the positive side of L0, i.e., between points D and E, and on the negative side of L1, i.e., between points E and F, and the light beam reaches the information face L1.

In order to sufficiently reduce the moving speed of the light beam when it reaches the information face L1 so that the focus lead-in is stably performed on the information face L1, a decelerating signal having a prescribed amplitude of a negative polarity, opposite the positive polarity of the accelerating signal, is applied during a period of time from point E where the S signal becomes approximately zero, that is, an intermediate point between the information faces L0 and L1, to point G where the light beam reaches L1 or point R0 where the light beam goes a little over the information face L1, whereby the moving speed of the light beam is reduced. Since the amplitude of the S signal in the. FE signal varies in the vicinity of point E due to surface deflection of the disk or the like, a lead-in level of the focus control is set at a point where the light beam goes a little over the information face L1, and the decelerating signal is made zero at the moment when this lead-in level is detected, whereby the focus control is quickly performed. Thereby, the light beam follows the information face L1 (point G), and the focus jumping is completed. Therefore, as shown in FIG. 11, when the accelerating signal and the decelerating signal are applied while appropriately changing the polarity, a stable focus jumping from L0 to L1 or from L1 to L0 is realized.

Figure 12:
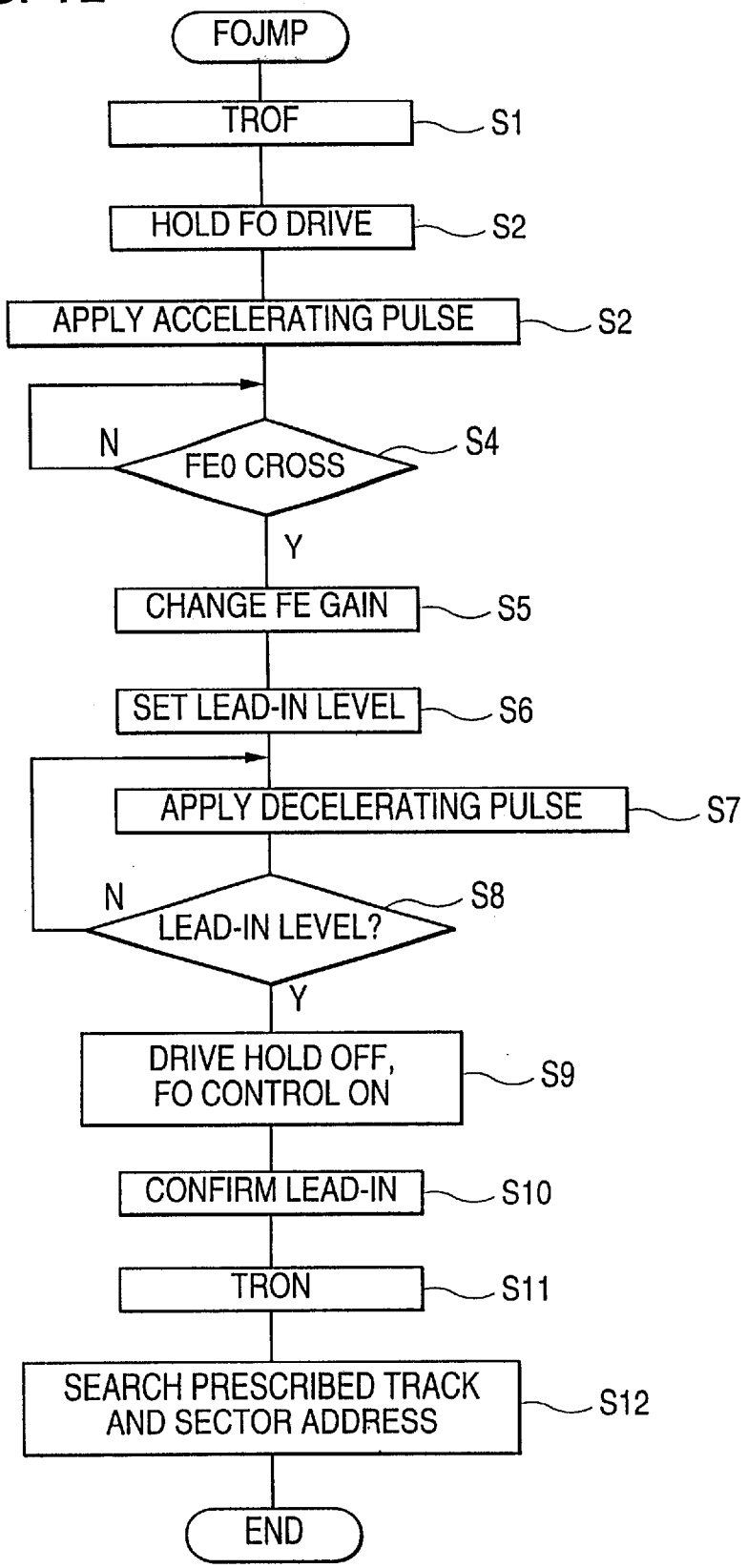
FIG. 12 is a flow chart for explaining the focus jumping process according to the first embodiment of the invention.

FIG. 12 is a flow chart illustrating the focus jumping process realized by the DSP 122. Hereinafter, the focus jumping process will be described using FIGS. 11 and 12.

When a focal point of a light beam is moved from the first layer L0 to the second layer L1 or from the second layer L1 to the first layer L0, as in the above-mentioned focus control process, a pulse signal FOJMP is produced in the waveform generator 207 and applied to the servo system by a software processing within the DSP 122, whereby the focal point of a light beam is moved from an information face to another information face, i.e., focus jumping, is realized.

For example, when the focus jumping from L0 to L1 is performed, initially, the switch 301 shown in FIG. 10 is turned off to turn off the tracking servo system (step 1). Then, the B-C line of the switch 204 shown in FIG. 2 is turned on to hold a focus driving signal by the hold part 208 (step S2).

Next, an accelerating pulse A0 of a jumping pulse (FEJMP pulse) is produced in the waveform generator 207 shown in FIG. 2, and the accelerating pulse A0 is applied through the switch 204, the DA converter 209, and the driving circuit 131 to the focus actuator 104 (step S3). The pulse width and the peak value of the accelerating pulse A0 are set according to the sensitivity of the focus actuator 104 and the surface deflection of the disk 101. When a prescribed pulse is applied to the focus servo system, the focusing lens 105 moves upward, i.e., toward the information face L1. With the upward movement of the lens 105, an S signal appears as shown in FIG. 11 (left side in the figure).

When it is detected that the S signal reaches the reference level 0, i.e., when the zero cross level of the FE signal (or an amplitude level in the vicinity of the zero cross level) is detected (step S4), the gain set value of the gain change circuit 122 is changed to a gain set value of the information face L1 (step S5), and the focus lead-in level is set to a focus lead-in level of the information face L1 by the level judge part 206 (step S6), whereby the S signal and the lead-in level of the information face L1 are accurately detected.

Further, a decelerating pulse B0 produced in the waveform generator 207 is applied (step S7). By the decelerating pulse B0, a brake is applied to the focusing lens 105 that is moving toward the information face L1. So, when the FE signal reaches the lead-in level R0 of the information face L1 (Y In step S5), the moving speed of the focusing lens 105 is almost the minimum, i.e., 0. At this time, the output of the decelerating pulse B0 is stopped, and the A-C line of the switch 204 is immediately turned on to turn on the focus servo system (step S9), whereby, in the vicinity of the lead-in level point R0, the focus is stably led in. Thereafter, during the period of time from R0 to U0, it is confirmed that the focus is normally led in, by the TE signal (or RF signal) exceeding a prescribed value (step SbI). Finally, the switch 301 shown in FIG. 10 is turned on at point U0 in FIG. 11 to turn on the tracking servo system (step S11), and the prescribed track and sector address are sought (step S12).

Although the accelerating pulse is applied for the constant period of time t and the decelerating pulse is applied for the period of time during which the focusing lens 105 moves from the intermediate point between L0 and L1 to L1, these periods may be set as follows. That is, a maximum value or a minimum value of the amplitude of the S signal is stored in the RAM (not shown), and a level corresponding to a prescribed rate of the maximum value or the minimum value (preferably, 60–80%) is obtained as a comparator level. Then, the sampled FE signal is compared with the comparator level. The maximum value of the S signal is detected by that the FE signal becomes larger than the comparator level and, thereafter, smaller than the comparator level. Likewise, the minimum value of the S signal is detected by that the FE signal becomes smaller than the comparator level and, thereafter, larger than the comparator level. When the maximum value is detected in this way, the accelerating pulse is stopped and the decelerating pulse is output. When the minimum value is detected, the decelerating pulse is stopped and the accelerating pulse is output. In this case, the timing of acceleration and the timing of deceleration can be desirably changed by the comparator level. Especially, when the timing is appropriately quickened within a range of the performance of the focus actuator 104, unwanted positional deviation due to surface deflection of the disk is significantly reduced, so that the focus jumping can be performed at a higher speed.

As described above, according to the first embodiment of the present invention, using the focus jumping means, in the focus control holding state, the accelerating signal and the decelerating signal, having opposite polarities, are applied to the focusing lens driving means, whereby the light beam is moved between two information faces. Further, the light beam's reaching a target information face or going a little over the information face is detected by the amplitude level of the FE signal, i.e., by an output from the light beam focusing condition detecting means, whereby the focus control is performed. Therefore, in a multiple-layer disk, the focus jumping from one layer to another layer can be performed at a high speed, with high reliability.

Embodiment 2

An optical disk apparatus according to a second embodiment of the present invention can perform the above-mentioned focus jumping stably against variations in the disk.

As described above, in a dual-layer disk having first and second layers (information faces) L0 and L1, it is desired to design these layers L0 and L1 so that the amount of reflected light from the first layer L0 is approximately equal to that from the second layer L1 by controlling the reflectivities of these layers L0 and L1. However, because of variations in the material of the disk or variations in the intermediate layer between the first and second layers L0 and L1, the amount of reflected light from the first layer L0 (the second layer L1) varies from a desired value. This variation appears as a variation in the FE signal, the AS signal, or the RF signal.

If the amplitude of the FE signal varies, the gain of the focus servo system varies when the focus moves to a target information face, resulting in unstable focus lead-in. When the variation is significant, the lead-in level for detecting that the focus has passed through the target information face is detected incorrectly or is not detected, resulting in unstable focus jumping.

In order to solve these problems, as shown in FIG. 8, amplitudes of two S signals, which appear in the FE signal corresponding to the information faces L0 and L1 of the dual-layer disk, are measured, and the gain of the FE signal in the gain changeable module 121 shown in FIG. 2 is changed on the basis of the measured values so that prescribed amplitudes are attained at the information faces L1 and L0. Further, the measured amplitudes or the gain set values of the gain changeable module 121 on the basis of the measured amplitudes are stored in the RAM within the DSP 129 shown in FIG. 2. When the focus jumping is performed, the gain of the FE signal is changed to the set value on the basis of the amplitude of the S signal of each information face (step S5 in FIG. 12). Further, the focus lead-in level is set in the level judge part 206, corresponding to the S amplitude of the FE signal after the gain change (step S6).

When the thickness of the intermediate layer of the dual-layer disk is very thick and varies, the amount of reflected light from the information face L1 significantly decreases as compared with the information face L0. Therefore, even though the S signal of the information face L0 has a prescribed amplitude, the amplitude of the S signal of the information face L1 becomes smaller than the prescribed amplitude. In this case, the S amplitudes of the information faces L0 and L1 are measured and stored at the time of focus lead-in. When the focus jumping is performed from the information face L0 to the information face L1, the set gain of the gain change circuit 121 is increased so that the stored S amplitude of the information face L1 becomes a prescribed amplitude.

In this second embodiment of the invention, the amplitudes of the S signals corresponding to the respective information faces or set values of the gain change circuit 121 on the basis of these amplitudes are stored in the RAM in the DSP 129 and the stored values are set when the focus jumping is performed. Therefore, even when the amount of reflected light from each information face of the dual-layer disk (or a multiple-layer disk) varies and the amplitude of the S signal in the FE signal corresponding to each information face varies or even when the amplitude of the S signal varies between different disks, apparatuses, or heads, the focus lead-in can be performed stably against these variations.

Furthermore, the lens moving speed for the focus lead-in. at the starting of the apparatus, is different from the lens moving speed for the focus jumping. Usually, the lens moving speed is higher at the focus jumping than at the focus lead-in. Therefore, considering this difference in the lens moving speed, the FE gain of the gain change circuit 121 is changed on the basis of the S amplitude of the FE signal that is calculated and stored when the light beam passes through each information face at the starting and, after the change, the lead-in level at the focus jumping is set to a level different from the focus lead-in level at the starting, for the S signal having an amplitude approximating the prescribed amplitude, whereby more stable focus lead-in is realized.

As described above, the optical disk apparatus according to this second embodiment is equipped with a storage means for storing focus condition detecting signals which are obtained when the focal point of the light beam is passed through the first and second information faces of the disk by driving the focusing lens so that the light beam goes away from or close to the recording medium. When the focus jumping is performed by the focus jumping means, a gain of the focus servo means is changed according to the values stored in the focus condition detecting signal storage means. Further, a focus control lead-in level for the focus jumping is set according to an output signal from the focus control means, a gain of which is changed. Therefore, the focus jumping can be performed stably against variations in the amount of reflected light from information faces of a dual-layer disk or a multiple layer disk, or variations in the amplitude of the S signal between different disks, apparatuses, or heads.

Further, since the lead-in level at the focus jumping is calculated on the basis of the S amplitude of the FE signal that is stored at the starting of the apparatus, considering the lens speed for the focus lead-in at the starting of the apparatus and the lens speed for the focus jumping, and the lead-in level is set individually. Therefore, more stable focus lead-in is realized.

Embodiment 3

In this third embodiment of the invention, a structure for operating the focus jumping stably against variations in the disk or the like and the focus jumping operation will be described As described above, the variation in the amount of reflected light from the information faces L0 and L1 appears as a variation in the amplitude of the FE signal, the AS signal, or the RF signal. Therefore, the amplitude of the AS signal, the RF signal, or the envelope detection signal of the RF signal is proportional to the amplitude of the FE signal. Therefore, the amplitude of the FE signal can be easily supposed from the amplitude of the AS signal, the RF signal, or the envelope detection signal.

Therefore, in this third embodiment of the invention, when the focus is led in the dual-layer disk, amplitudes of two S signals, which appear in the AS signal (refer to FIG. 4) or the RF signal (not shown) simultaneously with the S signals in the FE signal and respectively corresponding to the first and second information faces L0 and L1, are measured, and the gain of the FE signal in the gain changeable module 121 shown in FIG. 2 is changed on the basis of the measured values so that prescribed amplitudes are attained at the information faces L1 and L0. Further, an amplitude of the FS signal supposed from the measured amplitude of the AS signal, the RF signal, or the envelope detection signal, or a set value of the gain changeable module 121 on the basis of the amplitude is stored in the RAM in the DSP 129. When the focus jumping is performed, the gain of the FE signal is changed to a set value on the basis of the stored amplitude of the S signal of each information face (step 55 in FIG. 12). Further, the focus control lead-in level is set corresponding to the S amplitude of the FE signal after the gain change (step S6).

Since the focus lead-in level is set corresponding to the S amplitude of the FE signal after the gain change, as in the second embodiment of the invention, the focus jumping can be stably performed.

In this third embodiment of the invention, the AS signal, the RF signal, or the RF envelope signal, which are proportional to the S signal, is measured, and the measured value or a set value of the gain changeable module 121 on the basis of the measured value is stored in the RAM in the DSP 129 and, when the focus jumping is performed, the stored value is set. Therefore, even when the amount of reflected light from each information face of a dual-layer disk or a multiple-layer disk varies and the amplitude of the S signal in the PE signal corresponding to each information face varies, or even when the amplitude of the S signal varies between different disks, apparatuses, or heads, the focus lead-in can be performed stably against these variations.

Further, considering both the lens speed for the focus lead-in at the starting of the apparatus and the lens speed for the focus jumping, the lead-in level at the focus lead-in is realized.

Furthermore, when a signal obtained by dividing the FE signal by the total of outputs from the adders 116 and 117 shown in FIG. 1, i.e., total light amount signal AS, or a signal obtained by changing the set gain of the gain change circuit 121 according to the amplitude of the total light amount signal AS, is used in place of the FE signal to be sampled at the focus jumping, even when the reflectivity of the disk significantly varies between the information faces L1 and the information face L0 or between the inner circumference, the center, and the outer circumference, the lead-in level of the target information face can be accurately detected.

When the focus moves from the information face L1 to the information face L0, the FE signal and the FEJMP pulse become as shown in FIG. 11 (right side in the figure). Also in this case, the focus jumping can be realized by process steps similar to those described above.

In the foregoing description, the focus jumping is performed while holding the control signal input to the D/A converter 209 shown in FIG. 2, i.e., the FE driving signal. However, when surface deflection of the disk is considerable, the FE signal input to the switch 201 shown in FIG. 2 is passed through a high frequency cut-off filter to eliminate noise component, and this signal is held during the focus jumping and then sent through the D/A converter 209 to the driving circuit 131. In this case, unstable factors caused by positional error due to the surface deflection are absorbed.

As described above, the optical disk apparatus according to this third embodiment is equipped with a focusing condition detecting signal storage means for storing a signal detecting the focusing condition of the light beam, which signal is obtained when the light beam passes through first and second information faces when the focusing lens is driven so that the light beam approaches the disk or goes away from the disk. When the focus jumping is performed, the gain of the FE signal that changes the S amplitude is set to a value on the basis of an amplitude of the FE signal supposed from the AS signal, the RF signal, or the envelope detection signal which are stored in the storage means, and the lead-in level of the focus control is set according to the S amplitude of the FE signal after the gain change. Therefore, even when the amount of reflected light from each information face of the dual-layer disk (multiple-layer disk) varies and the S amplitude of the information face varies, or when the S amplitude varies between different disks, apparatuses, or heads the focus jumping can be performed stably against these variations.

Further, considering both the lens speed for the focus lead-in at the starting of the apparatus and the lens speed for the focus jumping, the gain is changed on the basis of the amplitude which is measured and stored when the light beam spot passes through each information face at the starting of the apparatus and the amplitude of the AS signal, the RF signal, or the RF envelope signal, and then the focus lead-in level at the focus jumping after the gain change is calculated, and the lead-in level is set individually. Therefore, more stable focus lead-in is realized.

Furthermore, the amplitude of the signal for detecting the focus condition of the light beam irradiating the information face is divided by the amplitude of the signal obtained by detecting the reflected light amount from the information face, and the focus jumping from the first information face to the second information face is conducted by moving the light beam according to the result of the division. Therefore, even when the reflectivity of the disk significantly varies between the inner circumference, the center, and the outer circumference of the disk, the lead-in level of the target information face can be accurately detected, resulting in an accurate focus jumping.

Embodiment 4

In order to secure a high stability of the focus jumping, the peak values of the accelerating pulse and the decelerating pulse, when the focus jumping is performed, must be set in due consideration of the sensitivities of the focus actuator 104, surface deflection of the disk 101, vibration from the outside, and the like.

When the optical disk apparatus is a horizontal type optical disk apparatus in which a disk is set horizontally, the acceleration of the focusing lens 105 driven by the focus actuator 104 is +1 G (G: gravitational acceleration) when the accelerating direction is upward. When the accelerating direction is downward, the acceleration of the lens 105 driven by the focus actuator 104 is −1 G therefore, the moving speed of the focusing lens 105 is lower in the upward direction than in the downward direction.

In this fourth embodiment of the invention, in order to achieve a stable focus jumping by canceling this difference, the peak value of the accelerating pulse A0 when the light beam spot (focusing lens 105) moves upward (L0→L1), is made larger than the peak value of the accelerating pulse A1 when the light beam spot moves downward (L1→L0).

In place of the peak value of the accelerating pulse, the time interval of the accelerating pulse may be changed. In this case, the time interval of the accelerating pulse A0, when the light beam spot moves upward (L0→L1), is made longer than the time interval of the accelerating pulse A1 when the light beam spot moves downward (L1→L0).

Alternatively the product of the peak value multiplied by the time interval may be controlled. In this case, the product of the accelerating pulse A0, when the light beam spot moves upward L0→L1) is made larger than the product of the accelerating pulse A1 when the light beam spot moves downward (L1→L0).

In any case, when the difference in the accelerations of the focusing lens 105 between the upward movement and the downward movement is set to about 2 G, a stability of the focus jumping can be secured in any moving directions.

As described above, according to the fourth embodiment of the invention, the focus jumping means includes an accelerating means for generating an accelerating signal that moves the focal point of the light beam from an information face to another information face of the disk and a decelerating means for decelerating the moving speed of the focal point of the light beam. When the disk is set horizontally, the peak value of the accelerating signal, the time interval of the accelerating signal, or the product of the peak value and the time interval when the focal point moves upward is made larger than that when the focal point moves downward. Therefore, a stability of the focus jumping can be secured in any case.

Embodiment 5

Although the peak value of the accelerating pulse is controlled to cancel the difference in the moving speed of the light beam spot between the upward movement and the downward movement in the fourth embodiment of the invention, the peak value of the decelerating pulse may be controlled.

That is, in this fifth embodiment of the invention, the peak value of the decelerating pulse B0, when the light beam spot moves upward (L0→L1), is made smaller than the peak value of the decelerating pulse B1 when the light beam spot moves downward (L1→L0). In place of the peak value of the decelerating pulse, the time interval of the decelerating pulse may be changed. In this case, the time interval of the decelerating pulse B0, when the light beam spot moves upward (L0→L1), is made shorter than the time interval of the decelerating pulse B1 when the light beam spot moves downward (L1→L0).

Alternatively, the product of the peak value multiplied by the time interval may be controlled. In this case, the product of the decelerating pulse B0, when the light beam spot moves upward (L0→L1), is made smaller than the product of the decelerating pulse B1 when the light beam spot moves downward (L1→L0).

In any case, when the difference in the accelerations of the light beam spot between the upward movement and the downward movement is set to about 2 G, a stability of the focus jumping can be secured.

As described above, according to the fifth embodiment of the invention, the focus jumping means includes an accelerating means for generating an accelerating signal that moves the focal point of the light beam from an information face to another information face of the disk and a decelerating means for decelerating the moving speed of the focal point of the light beam. When the disk is set horizontally, the peak value of the decelerating signal, the time interval of the decelerating signal, or the product of the peak value and the time interval, when the focal point moves upward, is made larger than that when the focal point moves downward. Therefore, a stability of the focus jumping can be secured in any case.

Embodiment 6

An optical disk apparatus according to a sixth embodiment of the present Invention is a horizontal and vertical type optical disk apparatus having both a mechanism for setting a disk vertically and a mechanism for setting a disk horizontally. In the apparatus, a DC component of the driving current of the focus actuator 104 after the turning on of the focus control, i.e., a DC value at the Input node of the D/A converter 209, is detected and, according to the magnitude of the detected value, whether the disk is set horizontally or vertically is identified. According to the result, the accelerating pulse and the decelerating pulse are set at the, optimum values. Therefore, even when the surface deflection of the disk is considerable or the sensitivity of the focus actuator has no margin, stable focus jumping is realized.

When it is identified that the disk is horizontally set, the accelerating pulse or the decelerating pulse is controlled as described for the fourth or fifth embodiment of the invention.

On the other hand, when it is identified that the disk is vertically set, it is assumed that the moving speed of the accelerating pulse and the moving speed of the decelerating pulse, when the light beam spot moves from L0 to L1, be equal to the moving speed of the accelerating pulse and the moving speed of the decelerating pulse when the light beam spot moves from L1 to L0, respectively. As described above, when the disk is horizontally set, the focusing lens 105 is influenced by a gravitational acceleration of +1 G when the light beam spot moves from L0 to L1, and it is influenced by a gravitational acceleration of −1 G when the light beam spot moves from L1 to L0. Therefore, the downward moving speed (L1→L0) in case of the horizontal setting is higher than the moving speed in case of the vertical setting, and the upward moving speed (L0→L1) in case of the horizontal setting is lower than the moving speed in case of the vertical setting.

In this sixth embodiment of the invention, in order to achieve a stable focus jumping by canceling this difference, when the light beam spot moves from the bottom to the top of the disk (L0→L1), peak value or the time interval of the accelerating pulse A0V in the vertical setting or the accelerating pulse A0H in the horizontal setting is changed.

More specifically, the product of the peak value and the time interval of the accelerating pulse A0H in the horizontal setting, when the light beam spot (focusing lens) moves upward (L0→L1), is set at a value larger than the product of the peak value and the time interval of the accelerating pulse A0V in the vertical setting when the light beam spot moves (the product is the same for L0→L1 and L1→L0).

Alternatively, the time interval of the accelerating pulse is fixed for both the horizontal setting and the vertical setting, and only the peak value of the accelerating pulse may be changed. More specifically, the peak value of the accelerating pulse A0H in the horizontal setting, when the light beam spot moves upward (L0→L1), is set at a value larger than the peak value of the accelerating pulse A0V In the vertical setting when the light beam spot moves (the peak wave is the same for L0→L1 and L1→L0). Or, the peak value of the accelerating pulse is fixed for both the horizontal setting and the vertical setting, and only the time interval of the accelerating pulse may be changed. That is, the time interval of the accelerating pulse A0H in the horizontal setting when the light beam spot moves upward (L0→L1), is set at a value larger than the time interval of the accelerating pulse A0V in the vertical setting when the light beam spot moves.

In place of the accelerating pulse, the decelerating pulse may be changed. That is, the product of the peak value and the time interval of the decelerating pulse B0H in the horizontal setting, when the light beam spot moves upward (L0→L1), is set at a value smaller than the product of the peak value and the time interval of the decelerating pulse B0V in the vertical setting when the light beam spot moves (the product is the same for L0→L1 and L1→L0).

Alternatively, the time interval of the decelerating pulse is fixed for both the horizontal setting and the vertical setting, and only the peak value of the decelerating pulse may be changed. That is, the peak value of the decelerating pulse B0H in the horizontal setting, when the light beam spot moves upward, (L0→L1), is set at a value smaller than the peak value of the decelerating pulse B0V In the vertical setting when the light beam spot moves (the peak wave is the same for L0→L1 and L1→L0). Or, the peak value of the decelerating pulse is fixed for both the horizontal setting and the vertical setting, and only the time interval of the decelerating pulse may be changed. That is, the time interval of the decelerating pulse B0H in the horizontal setting, when the light beam spot moves upward (L0→L1), is set at a value smaller then the time interval of the decelerating pulse B0V in the vertical setting when the light beam spot moves.

Embodiment 7

When the light beam spot (focusing lens) moves downward (L1→L0) in the horizontal setting, since the focusing lens is influenced by a gravitational acceleration of −1 G with respect to the L1 to L0 movement in the vertical setting, the downward moving speed of the light beam spot in the horizontal setting is higher than the moving speed of the light beam from L1 to L0 in the vertical setting.

In this seventh embodiment of the invention, in order to achieve a stable focus jumping by canceling this difference, when the light beam spot moves from the top to the bottom of the disk (L1→L0), the peak value or the time interval of the accelerating pulse A0V in the vertical setting or the accelerating pulse A0H in the horizontal setting is changed.

More specifically, the product of the peak value and the time interval of the accelerating pulse A0H in the horizontal setting, when the light beam spot (focusing lens) moves downward (L1→L0), is set at a value smaller than the product of the peak value and the time interval of the accelerating pulse A0V in the vertical setting when the light beam spot moves (the product is the same for L0→L1 and L1→L0).

Alternatively, the time interval of the accelerating pulse is fixed for both the horizontal setting and the vertical setting, and only the peak value of the accelerating pulse may be changed. More specifically, the peak value of the accelerating pulse A0H in the horizontal setting, when the light beam spot moves downward (L1→L0), is set at a value larger than the peak value of the accelerating pulse A0V in the vertical setting when the light beam spot moves (the peak wave is the same for L0→L1 and L1→L0). Or, the peak value of the accelerating pulse is fixed for both the horizontal setting and the vertical setting, and only the time interval of the accelerating pulse may be changed. That is, the time interval of the accelerating pulse A0H in the horizontal setting, when the light beam spot moves downward (L1→L0), is set at a value larger than the time interval of the accelerating pulse A0V in the vertical setting when the light beam spot moves.

In place of the accelerating pulse, the decelerating pulse may be changed. That is, the product of the peak value and the time interval of the decelerating pulse B0H in the horizontal setting, when the light beam spot moves downward (L1→L0), is set at a value smaller than the product of the peak value and the time interval of the decelerating pulse B0V in the vertical setting when the light beam spot moves (the product is the same for L0→L1 and L1→L0).

Alternatively, the time interval of the decelerating pulse is fixed for both the horizontal setting and the vertical setting, and only the peak value of the decelerating pulse may be changed. That is, the peak value of the decelerating pulse B0H in the horizontal setting, when the light beam spot moves downward (L1→L0), is set at a value smaller than the peak value of the decelerating pulse B0V in the vertical setting when the light beam spot moves (the peak wave S the same for L0→L1 and L1→L0). Or, the peak value of the decelerating pulse is fixed for both the horizontal setting and the vertical setting, and only the time interval of the decelerating pulse may be changed. That is, the time interval of the decelerating pulse B0H in the horizontal setting, when the light beam spot moves downward (L1→L0), is set at a value smaller than the time interval of the decelerating pulse B0V in the vertical setting when the light beam spot moves.

In the focus lead-in method mentioned above, at the starting or restarting of the apparatus, the focus lead-in is performed first on the second layer L1 of the dual-layer disk, that is, the information face farthest from the source of the light beam (focusing lens). So, when this layer is regarded as an initial reference, the first focus jumping direction at the starting of the apparatus is decided. More specifically, the direction in which the focus is led in first and moved by the first focus jumping is always the direction toward the first L0 layer of the dual-layer disk, i.e., toward the source of the laser beam. However, when the information face where the focus of the light beam is led in first is not a correctly detected face or when the focus of the light beam, which is led in a target information face, is undesirably jumped to another information face by accident, such as a shock from the outside, since there is no more information face in the prescribed focus jumping direction in the dual-layer disk as described above, the focus control ends in a failure. In this case, however, the focus of the light beam can be returned to the information face by restarting the apparatus. In case of a multiple-layer disk, the focus of the light beam can be moved in both directions by the focus jumping through it depends on the position of the information face where the focus is led in. After the focus jumping, tracking is led in, and address information on the track is read. Or, the focus of the light beam is moved to a prescribed information track, and layer information on the track is read, whereby it is confirmed that the present position is incorrect. Therefore, by performing the restarting of the apparatus or the correction jumping with the address information, the focus of the light beam can be returned to a prescribed information face.

Furthermore, the number of the information face, which is now subjected to the focus control, may be stored in the state where the address has been read. In this case, even when the focus control fails or the focus of the light beam is led in another information face due to vibration or shock, the focus can be returned to the information face which has been under reproducing or recording.

Embodiment 8

A description is given of an optical disk apparatus according to an eighth embodiment of the invention.

Figure 13:
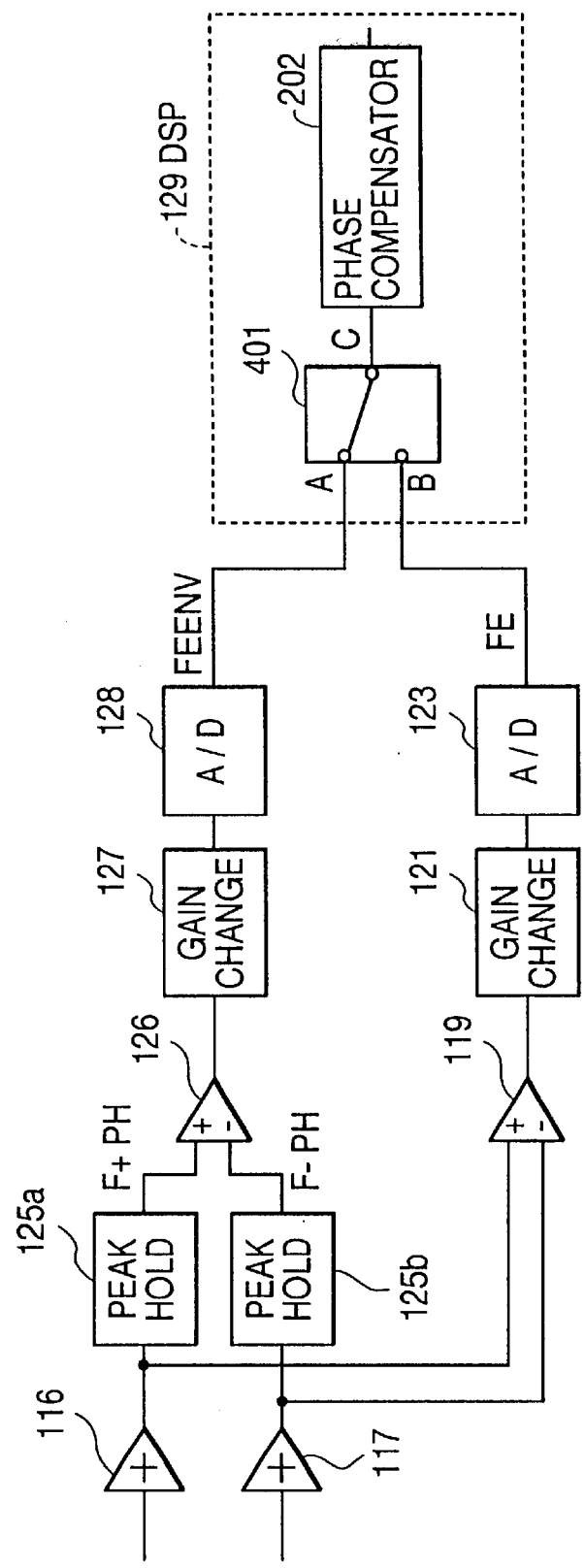
FIG. 13 is a block diagram illustrating a focus control peak hold section and a control section thereof according to an eighth embodiment of the present invention.
Figure 14:
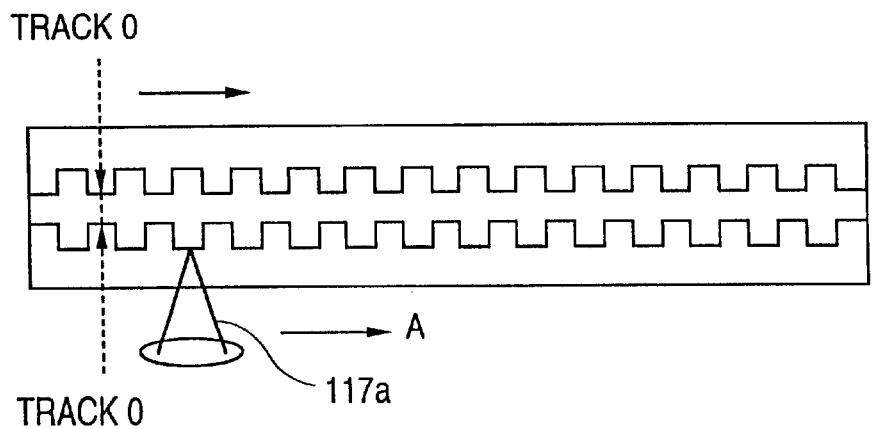
FIG. 14 is a schematic diagram for explaining a seeking for a dual-layer disk according to the eighth embodiment of the present invention.
Figure 15:
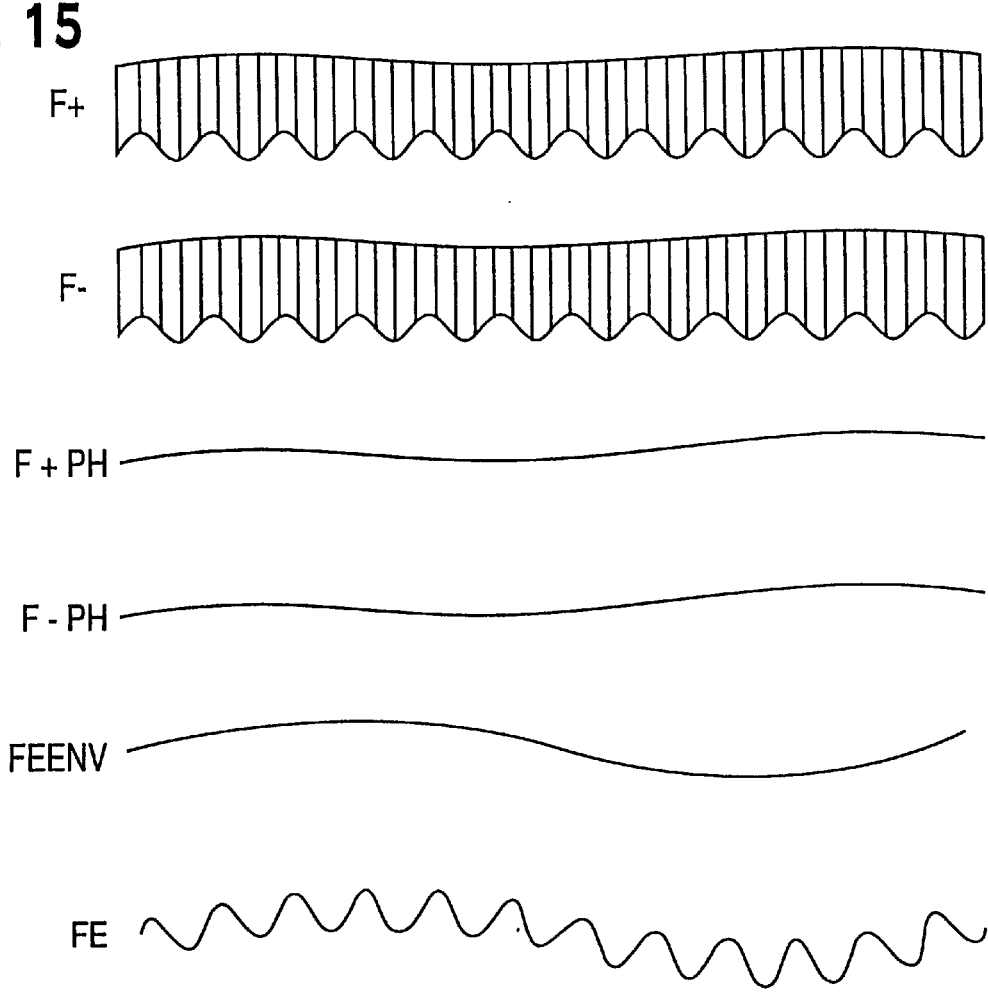
FIG. 15 Illustrates waveforms of F+ and F− during seeking, F+PH and F−PH produced by peak hold of F+ and F−, FE as a difference of F+ and F−, and FEENV as a difference of F+PH and F−PH, according to the eighth embodiment of the invention.
Figure 16:
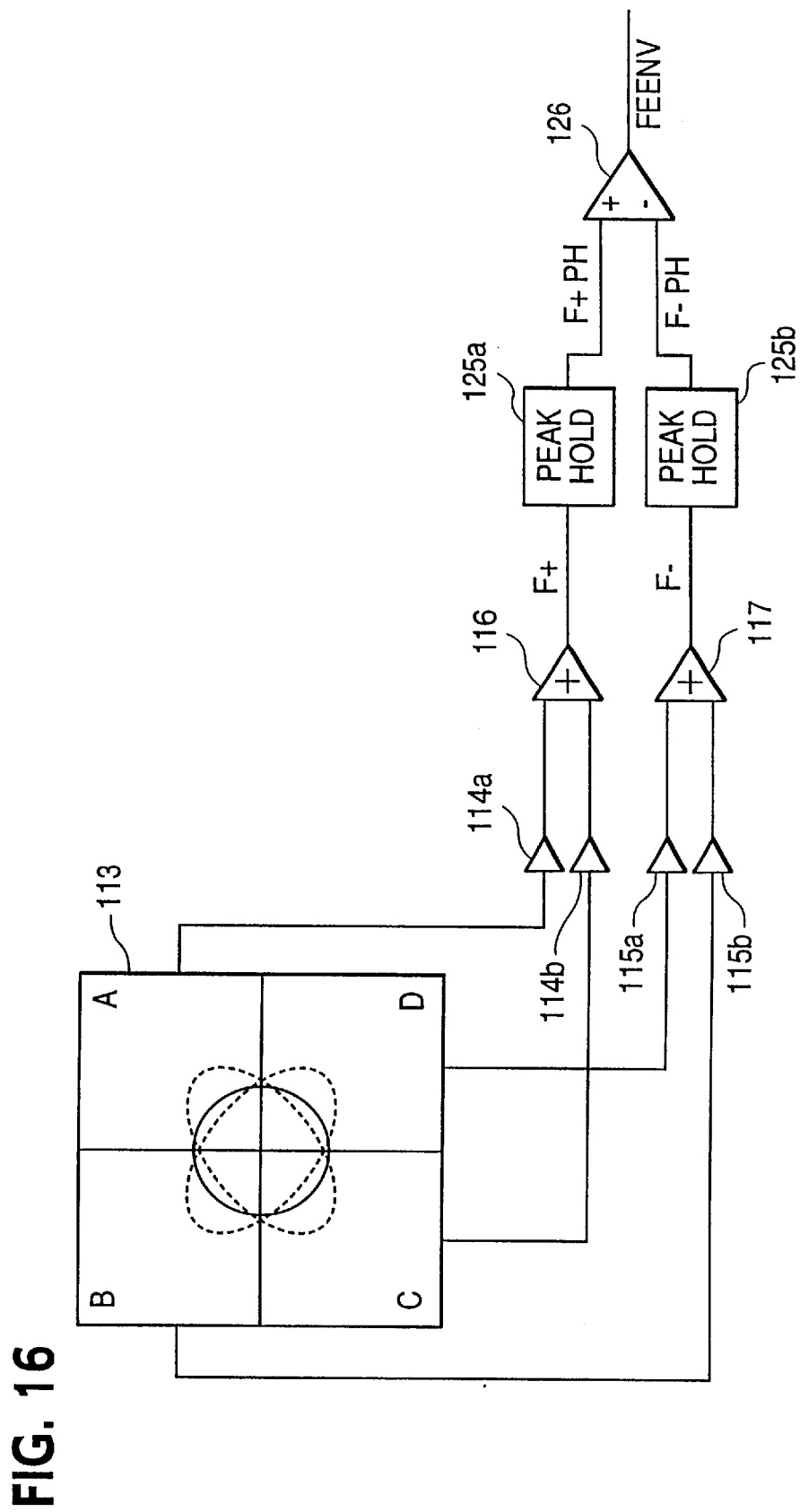
FIG. 16 is a block diagram illustrating an FE detection circuit using the astigmatic method, according to the eighth embodiment of the invention.
Figure 17:
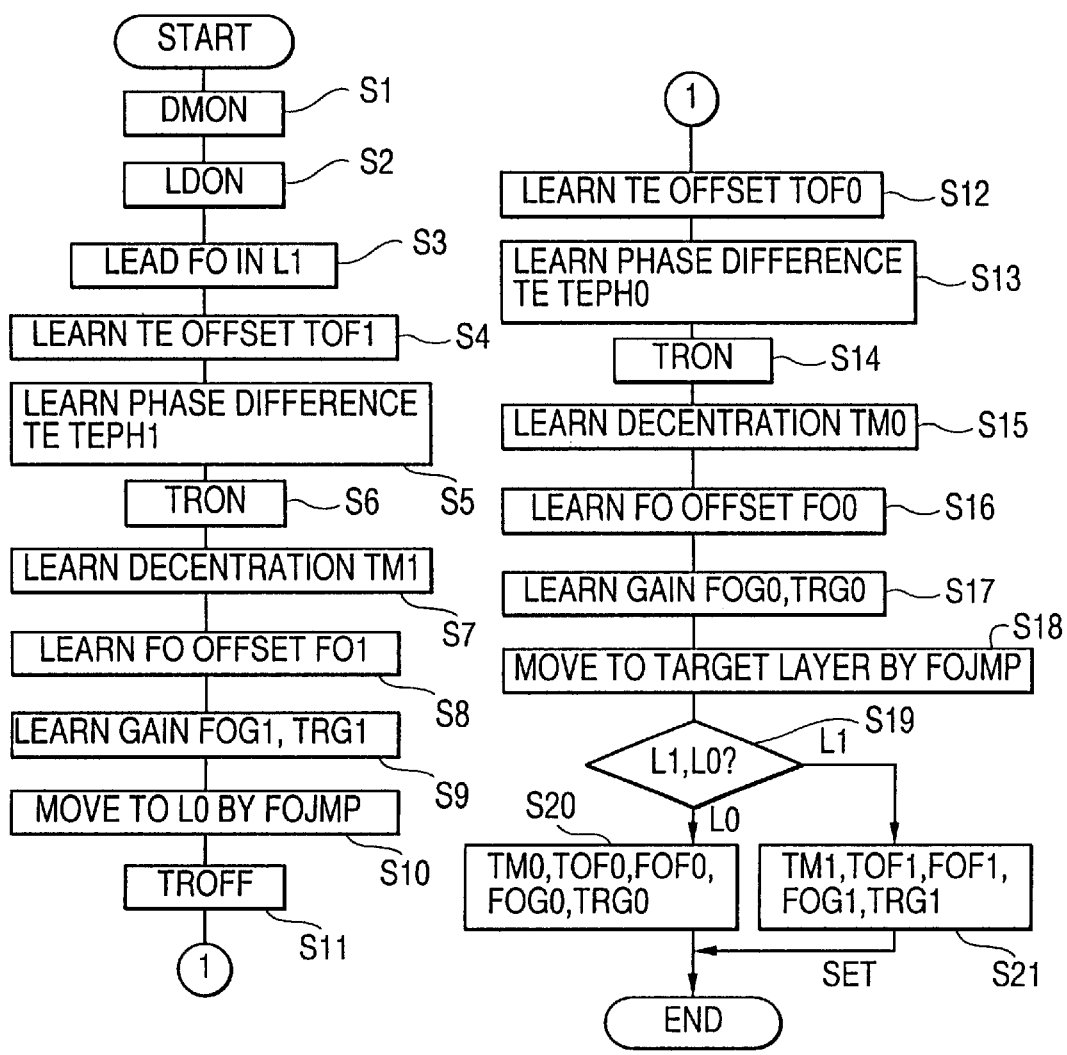
FIG. 17 is a flow chart for explaining a procedure when a dual-layer disk is loaded in and the apparatus is driven according to the present invention.

The optical disk apparatus according to this eighth embodiment cancels defocus during seeking and realizes stable seeking. FIG. 13 is a block diagram illustrating a part of the optical disk apparatus for the peak hold processing of the FE signal and the focus control in the DSP 122. FIG. 14 is a cross-sectional view illustrating the positional relationship between the focusing lens 105, the light beam 107a, and the disk 101 for explaining the seeking process. FIG. 15 illustrate waveforms of F+ and F− signals before and after peak hold, respectively, and waveforms of an FEENV signal and an FE signal which are difference signals of the F+ and F− signals and an FE signal, when seeking is executed in the arrow direction A. FIG. 16 is a block diagram illustrating the FE detecting part using the astigmatic method.

Because of the errors in adjustment of optical elements, such as the photodetector 113, track cross modulation signal levels of the F+ and F− signals vary. Therefore, as shown in FIG. 15, the FE signal, which is a difference signal of the F+ and F− signals, is adversely affected by the track cross, resulting in defocusing. Therefore, since a disturbance caused by the track cross is mixed during seeking, defocusing occurs, whereby the amplitude of the Te signal is reduced or the S/N ratio is degraded. As a result, counting of the TE signal for detecting the position of the light beam in the track direction becomes impossible. Further, when the defocus increases, focus skipping occurs, so that the focus cannot move to a target track.

As shown in FIG. 1, the F+ and F− signals, which are obtained from the photodetector 113 through the preamplifiers 114 and 115, are subjected to peak hold by the peak hold circuits 125a and 125b, that is, upper side peaks (peaks on the mirror side of the disk 101) of these signals are held, whereby signals F+PH and F−PH, which are not adversely affected by the track cross during seeking, are generated as shown in FIG. 15. The FEENV signal is obtained by measuring a difference between these signals F+PH and F−PH.

This FEENV signal is put in the gain changeable module 127, wherein an optimum gain (amplitude) is set for the FEENV signal. Then, the FEENV signal is sent through the A/D converter 128 to the DSP 129. Since ordinary focus control, focus lead-in, and focus jumping need sufficient response, the B-C line of the switch 401 in the DSP 129 is turned on, and a process similar to the process described for the prior art apparatus is performed. During seeking, since influences by the track cross that appear in the FE signal only in the seeking must be eliminated, the A-C line of the switch 401 is turned on. In this way, the FE signal, produced by the focus control when an ordinary tracking control is ON, is changed to the FE signal that is input under the focus control during the seeking, whereby undesired defocus caused by the track cross is reduced and undesired count error or focus skipping during the seeking are avoided. As a result, a stable seeking performance is secured.

Although in this eighth embodiment the astigmatic method is employed for detecting the FE signal, other detection methods may be employed. However, since there is a tendency for the track cross to increase the influence, the effect of the FE detection using the astigmatic method is significant.

As described above, according to the eighth embodiment of the invention, when a desired track is sought by a seeking means, the focusing condition detection means is constructed so that peak levels of output signals from two light responsive parts of the light detecting means are detected and the focusing condition of the light beam irradiating the information face is detected from a difference of the peak level detected signals. Further, the FE signal, produced by the focus control when an ordinary tracking control is ON, is changed to the FE signal that is input under the focus control during the seeking, whereby undesired defocus caused by the track cross is reduced and undesired count error or focus skipping during the seeking are avoided. As a result, a stable seeking performance is secured.

Embodiment 9

Figure 25A:
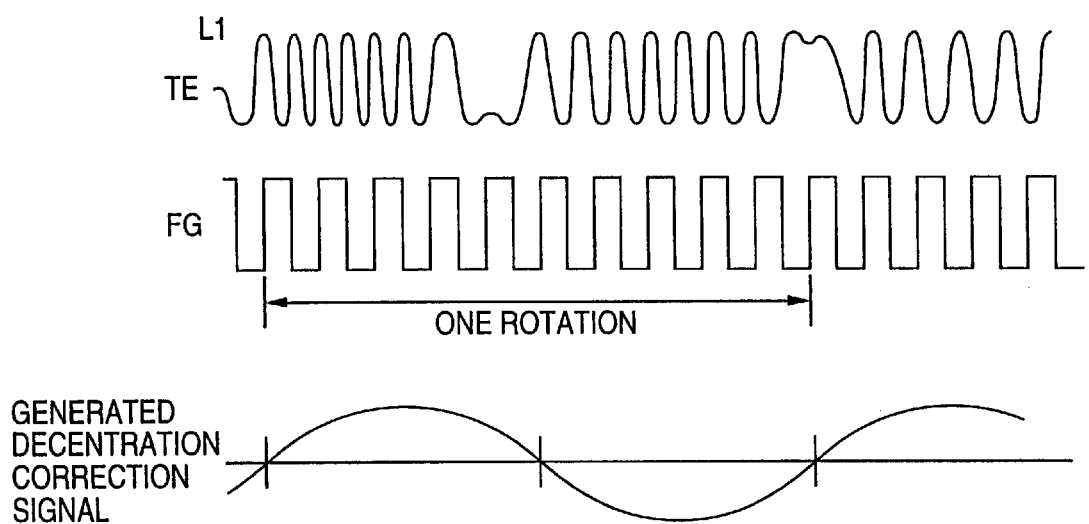
FIGS. 25(a) and 25(b) show waveforms of TE signals, FG signals of the disk motor, and decentration correction signals produced in the DSP, when decentration learning of the disk is performed, according to a ninth embodiment of the invention.
Figure 25B:
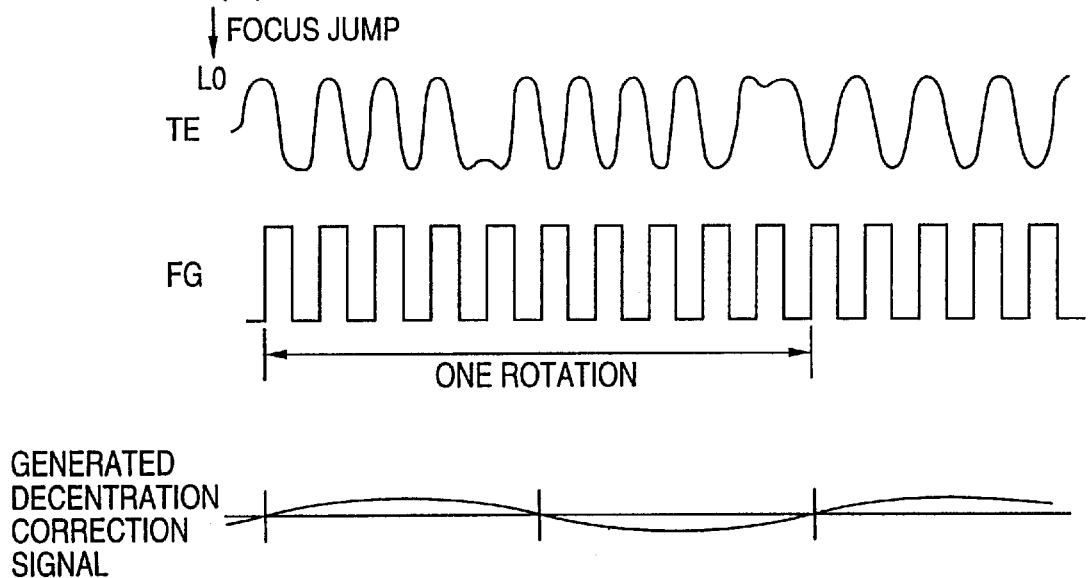

A description is given of a decentration learning for a multiple-layer disk in an optical disk apparatus according to a ninth embodiment of the invention, using FIGS. 10, 25 (*a*), and 25(*b*). In this embodiment, a dual-layer disk is employed.

FIGS. 25(*a*) and 25(*b*) show TE signals when a decentration of the disk is learned and FG signals of the disk motor, and a decentration correction signal produced in the DSP 129.

When the optical disk apparatus is turned on and the dual-layer disk is loaded In the apparatus, the disk motor 102 is rotated at a prescribed speed (DMON). Next, the semiconductor laser 108 is oscillated (LDON), and the focus of the light beam 107*a* emitted from the laser 108 is led in the second layer L1 of the dual-layer disk. In the state where the focus is led in the second layer L1, a sine wave shaped track cross signal appears on the TE signal due to a decentration.

The FG signal of the disk motor is a pulse signal having a prescribed pulse number for one rotation according to the rotation of the motor. In the figure, the pulse number is ten. Therefore, in order to count the pulse number of the TE signal for one rotation of the motor (FG10 pulse), the DSP 129 produces a one rotation 1 pulse that is obtained by dividing the FGIO pulse, and detects the 0 cross of the TE signal during the 1 pulse and counts the frequency of the 0 cross, whereby a decentration of the disk is measured.

After the measurement of the decentration. Df1 at the information face L1 is completed, the DSP 129 stores the information of the decentration Df1 at the information face L1 in the decentration memory 306. Thereafter, the focus of the light beam is moved to the information face L0 by the focus jumping mentioned above.

On the information face L0, as described above, the tracking control is turned off and the focus control is turned on. Then, from the sine wave shaped track cross signal shown in FIG. 25(*b*), the DSP 129 detects the pulse number of the TE signal during one rotation of the motor (FG10 pulse) by, for example, counting the frequency of the 0 cross, whereby the decentration of the disk is measured. After the measurement of the decentration on the information face L0, the DSP 129 stores the information of the decentration at the information face L0 in the decentration memory 309.

After the storage of the decentrations of the information faces L1 and L0 in the decentration memory 309, the DSP 129 generates a sine wave shaped correction signal that is synchronized with the FG signal of the motor and with the FG divided one rotation signal, referring the decentration of the information face on which the light beam is now controlled. Then, the DSP 129 input this correction signal through the composition circuit 304 to the tracking servo system, whereby the decentration followability is increased. Therefore, in either case where the focus of the light beam moves from L0 to L1 or from L1 to L0 in the dual-layer disk, when the focus jumping is performed to a target information face, a tracking servo system having a good response to the decentration can be constructed by changing the stored decentration information used when the correction signal is generated.

By the way, a variety of methods for measuring and correcting the decentration have been proposed, and this ninth embodiment of the invention is not restricted by the method mentioned above.

As described above, according to the ninth embodiment of the invention, decentration signals corresponding to decentrations of tracks on the first information face and the second information face stored and, when the focus jumping is conducted to a target information face, the decentration signal corresponding to the target information face is added to an output of a tracking servo system. Therefore, when the focus jumping is conducted two information faces of the dual-layer disk, by changing the stored decentration information for generating correction signals for the focus jumping, according to the target information face, the decentration followability of each information face is improved, whereby a tracking servo system having a good response to the decentration can be constructed.

Embodiment 10

Figure 26:
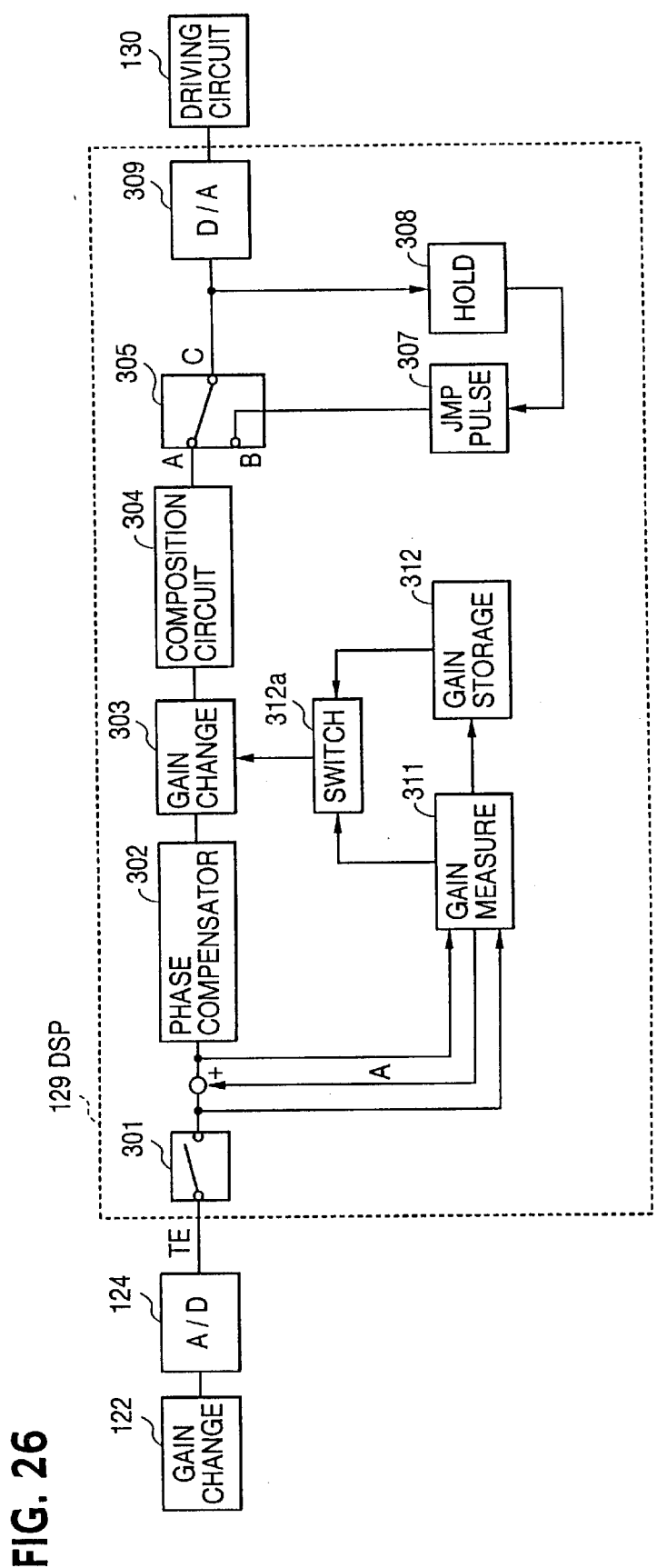
FIG. 26 is a block diagram for explaining a tracking control gain learning for a disk having two or more information faces, according to a tenth embodiment of the present invention.

A description is given of a tracking control gain learning for a multiple-layer disk in an optical disk apparatus according to a tenth embodiment of the invention, using FIG. 26. In this tenth embodiment a dual-layer disk is employed.

FIG. 26 is a block diagram illustrating the inner structure of the DSP 129 for explaining a tracking servo system and a gain learning section according to the tenth embodiment of the present invention.

When the optical disk apparatus is turned on and the dual layer disk is loaded in the apparatus, the disk motor 102 is rotated at a prescribed speed (DMON). Next, the semiconductor laser 108 is oscillated (LDON), and the focus of the light beam 107*a* emitted from the laser 108 is led in the second layer L1 of the dual-layer disk. Thereafter, the tracking servo system is turned on, and the tracking control gain learning is started.

The gain measuring part 311 in the DSP 129 applies a disturbance A of a frequency in the vicinity of the gain crossover frequency to the tracking servo system, and receives a tracking error signal TE (signal at the input node of the phase compensator) and a signal that has made around of the tracking servo loop (output signal from the switch 301) after the application of the disturbance A. Then, the gain measuring part 311 calculates an open-loop again G from the two signals, calculates a correction value to a desired tracking gain from the calculated present gain, and sends a signal corresponding to the correction value through the switch 312*a* to the gain changeable module 303, whereby the present tracking gain is changed to the desired tracking gain.

In case of the dual-layer disk, a correction value to a desired tracking gain is calculated from the present gain measured for the information face L1, and a switch value corresponding to the correction value is applied through the switch 312a to the gain changeable module 303 and, simultaneously, the switch value is stored in the gain storage part 312.

When the measurement of the gain at the information face L1 and the storage of the switch value are completed, the focus of the light beam is moved to the information face L0 by the above-mentioned focus jumping.

In a similar process as mentioned above, a correction value to a desired tracking gain is calculated from the present gain measured for the information face L0, and a switch value corresponding to the correction value is input to the gain changeable module 312, whereby the present gain is changed to the desired gain. Simultaneously, the switch value is stored in the gain storage part 312.

After the correction values of the tracking control gains are calculated for the information faces L1 and L0, the gain storage part 312 stores the changed values of the gain changeable module 303, which are the correction values of the tracking control gains for the information faces L0 and L1. Then, the DSP 129 sends a gain switch value stored in the gain storage part 312 and corresponding to the information face on which the light beam is now controlled to the gain changeable module 312 through the switch 312a, so that an optimum tracking gain is set for the information face. Therefore, in either case where the focus of the light beam moves from L0 to L1 or from L1 to L0 in the dual-layer disk, when the focus jumping is performed, according to the target information face, the tracking gain is learned and the tracking gain is changed to an optimum value for the information face, whereby a stable tracking servo system can be constructed for either information face.

In this tenth embodiment of the invention, the loop gain is obtained by applying a disturbance and detecting the loop transfer signal of the disturbance. However, the method of measuring the gain is not restricted thereto.

As described above, according to the tenth embodiment of the present invention, In the dual-layer disk, when the focus of light beam moves from one information face to the other information face, the tracking gain is learned at the previous focus jumping, and the tracking gain at the present focus jumping is changed to an optimum value for the target information face. Therefore, a stable tracking servo system can be constructed for either information face.

Embodiment 11

Figure 27:
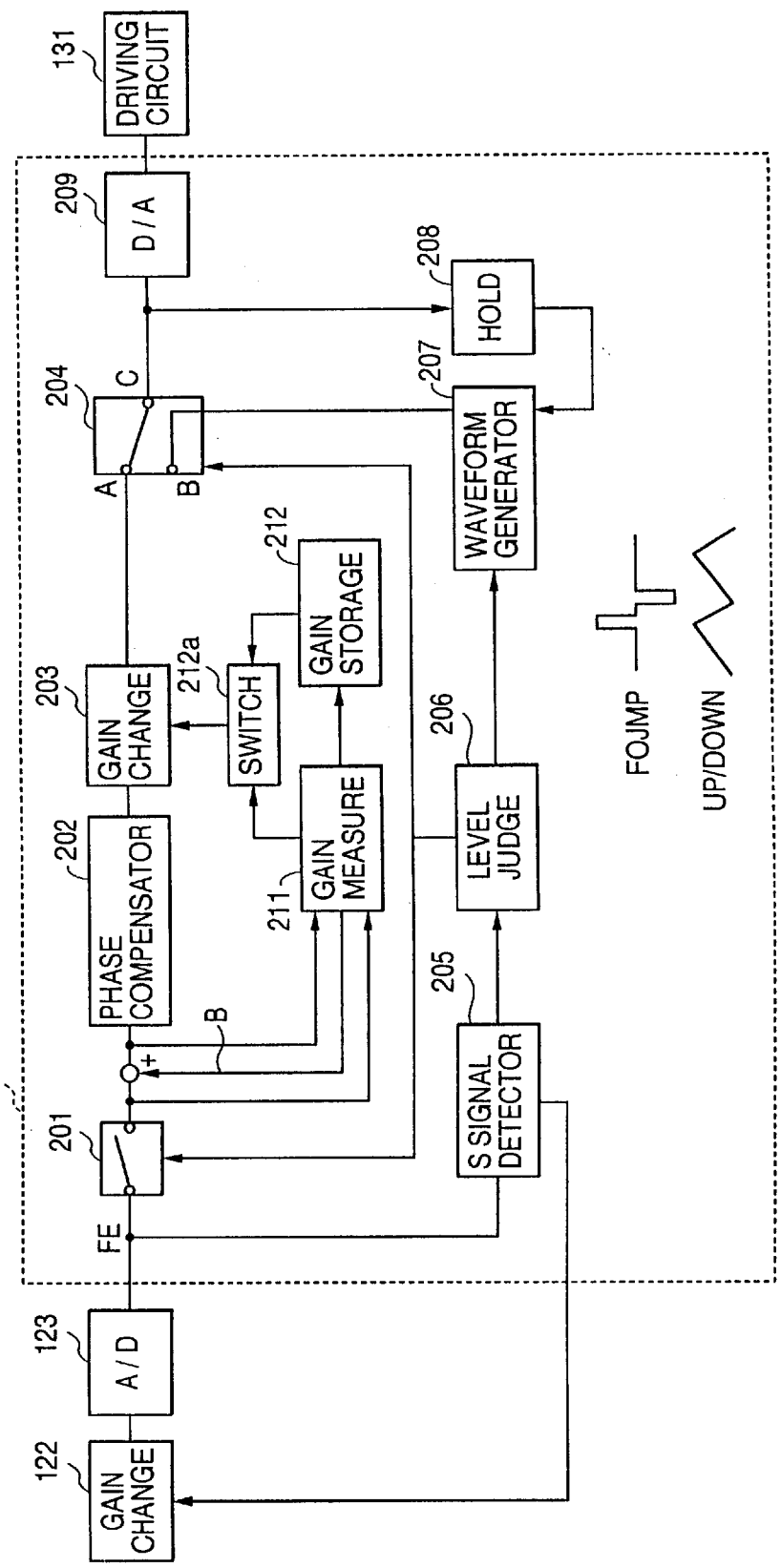
FIG. 27 is a block diagram for explaining a focus control gain learning for a disk having two or more information faces, according to an eleventh embodiment of the present invention.

A description is given of a focus control gain learning for multiple-layer disk in an optical disk apparatus according to an eleventh embodiment of the invention, using FIG. 27. In this embodiment, a dual-layer disk is employed.

FIG. 27 is a block diagram illustrating the inner structure of the DSP 129 for explaining a focus servo system and a gain learning section according to the eleventh embodiment of the present invention.

When the optical disk apparatus is turned on and the dual-layer disk is loaded in the apparatus, the disk motor 102 is rotated at a prescribed speed (DMON). Next, that semiconductor laser 108 is oscillated LDON), and the focus of the light beam 107a emitted from the laser 108 is led in the second layer L1 of the dual-layer disk. Thereafter, the focus servo system is turned on, and the focus control gain learning is started.

The gain measuring part 211 in the DSP 129 applies a disturbance B of a frequency in the vicinity of the gain crossover frequency to the focus servo system, and receives a focus error signal FE (signal at the input node of the phase compensator 202) and a signal that has made a round of the focus servo loop (output signal from the switch 201) after the application of the disturbance B. Then, the gain measuring part 211 calculates an open-loop gain from the two signals, calculates a correction value to a desired focus gain from the calculated present gain, and sends a signal corresponding to the correction value through the switch 21 2a to the gain changeable module 203, whereby the present focus gain is changed to the desired focus gain.

In the case of the dual-layer disk, a correction value to a desired focus gain is calculated from the present gain measured for the information face L1, and a switch value corresponding to the correction value is applied through the switch 212a to the gain changeable module 203 and, simultaneously, the switch value is stored in the gain storage part 212.

When the measurement of the gain at the information face L1 and the storage of the switch value are completed, the focus of the light beam is moved to the information face L0 by the above mentioned focus jumping.

In a similar process as mentioned above, an correction value to a desired focus gain is calculated from the present again measured for the information face L0, and a switch value corresponding to the correction value is input to the gain changeable module 202 through the switch 212a, whereby the present gain is changed to the desired gain. Simultaneously, the switch value is stored in the gain storage part 212.

After the correction values of the focus control gains are once calculated for the information faces L1 and L0, the gain storage part 212 stores the changed values of the gain changeable module 203, which are the correction values of the focus control gains for the information faces L0 and L1. Then, the DSP 129 sends the gain switch value stored in the gain storage part 212 and corresponding to the information face on which the light beam is now controlled to the gain changeable module 212 through the switch 212a, so that an optimum focus gain is set for the information face. Therefore, in either case where the focus of the light beam moves from L0 to L1 or from L1 to L0 in the dual-layer disk, when the focus jumping is performed, according to the target information face, the focus gain is learned and the focus gain is changed to an optimum value for the information face, whereby a stable focus servo system can be constructed for either information face.

In this eleventh embodiment of the invention, the loop gain is obtained by applying a disturbance and detecting the loop transfer signal of the disturbance. However, the method of measuring the gain is not restricted thereto.

As described above, according to the eleventh embodiment of the present invention, in the dual-layer disk, when the focus of light beam moves from one information face to the other information face, the focus gain is learned at the previous focus jumping, and the focus gain at the present focus jumping is changed to an optimum value for the target information face. Therefore, a stable focus servo system can be constructed for either information face.

Embodiment 12

Figure 28:
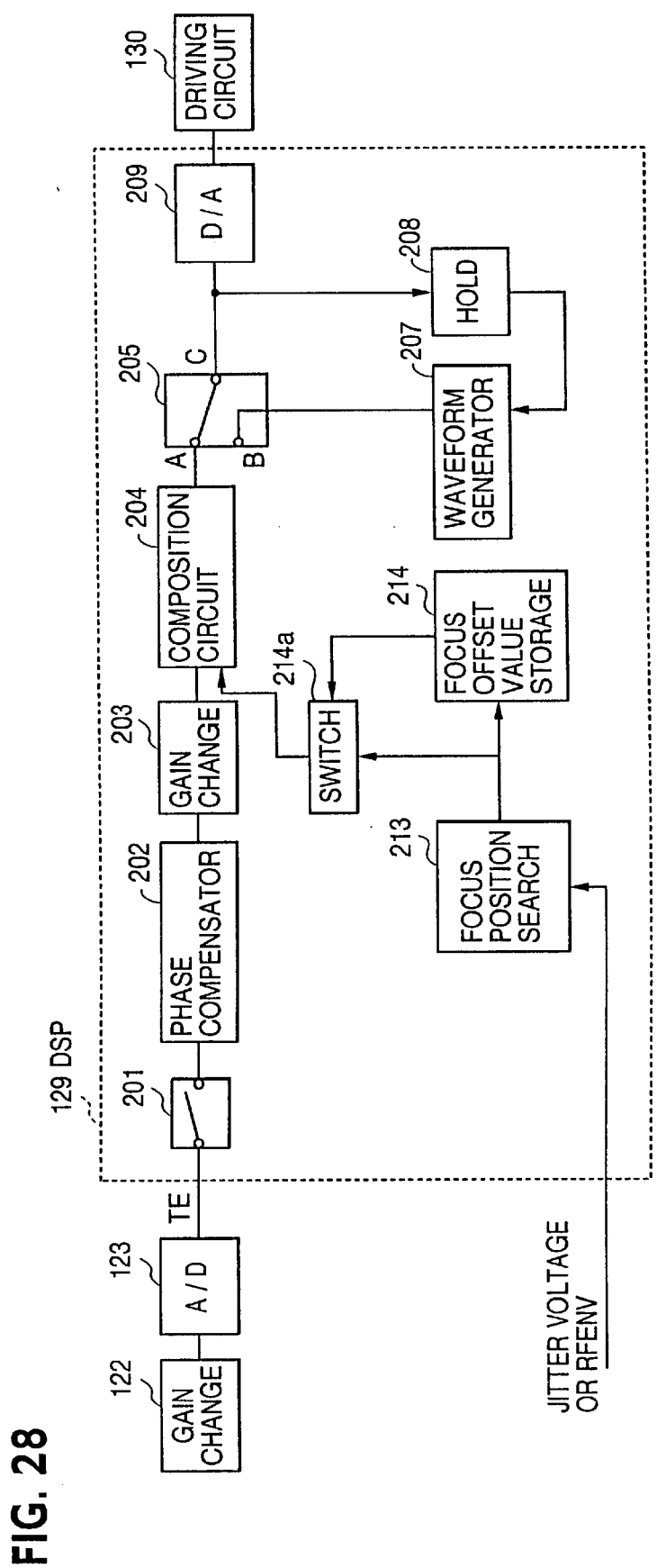
FIG. 28 is a block diagram for explaining a focus control offset learning for a disk having two or more information faces, according to a twelfth embodiment of the present invention.

A description is given of a focus control offset learning for a multiple-layer disk in an optical disk apparatus according to a twelfth embodiment of the present invention, using FIG. 28. In this embodiment, a dual-layer disk is employed.

FIG. 28 is a block diagram illustrating the inner structure of the DSP 129 for explaining a focus servo system and an offset learning section according to the twelfth embodiment of the present invention.

When the optical disk apparatus is turned on and the dual-layer disk is loaded in the apparatus, the disk motor 102 is rotated at a prescribed speed (DMON). Next, the semiconductor laser 108 is oscillated (LDON), and the focus of the light beam 107a emitted from the laser 108 is led in the second layer L1 of the dual-layer disk. Thereafter, the focus servo system is turned on, and the focus control offset learning is started.

An RFENV signal, which is obtained by envelope detection of the RF signal, is input to the DSP 129. The DSP 129 measures the amplitude of the RFENV signal by the focus position seeking part 213 and applies a signal so that the amplitude attains a maximum value through the switch 214a to the composition circuit 204, whereby the focus offset is corrected.

In case of the dual-layer disk, on the information face L1, the RFENV signal is measured while shifting the focus position by applying a signal to the composition circuit 204, and a focus position at which the RFENV signal attains a maximum value is sought by the focus position seeking part 213, whereby the offset correction value is obtained. Then, the obtained focus offset correction value is input to the composition circuit 204 through the switch 214a to correct the focus offset and, simultaneously, the focus offset correction value is stored in the focus offset storage part 214.

When the seeking of the focus offset for the information face L1 and the storage of the offset correction value are completed, the focus of the light beam is moved to the information face L0 by the above-mentioned focus jumping.

In a similar process as mentioned above, a focus offset correction value is calculated from a focus position sought for the information face L0, and this focus offset correction reaction value is input to the composition circuit 204 through the switch 214a to correct the focus position and, simultaneously, the focus offset correction value is stored in the focus offset storage part 214.

After the focus offset correction values are once sought for the information faces L1 and L0, the focus offset storage part 214 stores the focus control offset correction values for the information faces L0 and L1. When the focus control is performed, the DSP 129 reads the offset correction value corresponding to the information face on which the light beam is now controlled from the storage part 214, and sends the offset correction value through the switch 214a to the composition circuit 204 so that an appropriate offset correction for the information face is performed, whereby the light beam is focused on a correct position of the information face.

Therefore, in either case where the focus of the light beam moves from L0 to L1 or from L1 to L0 in the dual-layer disk, when the focus jumping is performed, according to the target information face, the focus offset is learned, and the locus offset value is changed to an optimum value for the information face. Therefore, for either information face, a stable focus control performance can be secured and the margin of the reproduced signal can be increased.

In this twelfth embodiment of the invention, the focus offset for each of the information faces L0 and L1 is learned and corrected at a position where the RFENV signal attains a maximum value. However, an intermediate point between two points where the amplitudes of the RFENV signal are the same may be sought because the focus position where the RFENV signal attains a maximum value is supposed to be the intermediate point between the two points.

Furthermore as a signal for detecting the focus offset, in place of the RFENV signal, the TE signal, the jitter signal of the reproduced signal, the C/N of the reproduced signal, the number of data errors, or the error rate may be employed. That is, this twelfth embodiment of the invention is not restricted by the offset detection method with the RFENV signal.

As described above, according to the twelfth embodiment of the invention, when focus jumping is performed in the dual-layer disk, a focus control offset correction value corresponding to a desired target position of the focus control means on each of the first information face and the second information face of the disk is stored in the focus position storage means and, when focus jumping is performed this time, the target position of the focus control means is changed to an optimum value for the target information face. Therefore, a stable focus servo system can be constructed for either information face.

Embodiment 13

Figure 29:
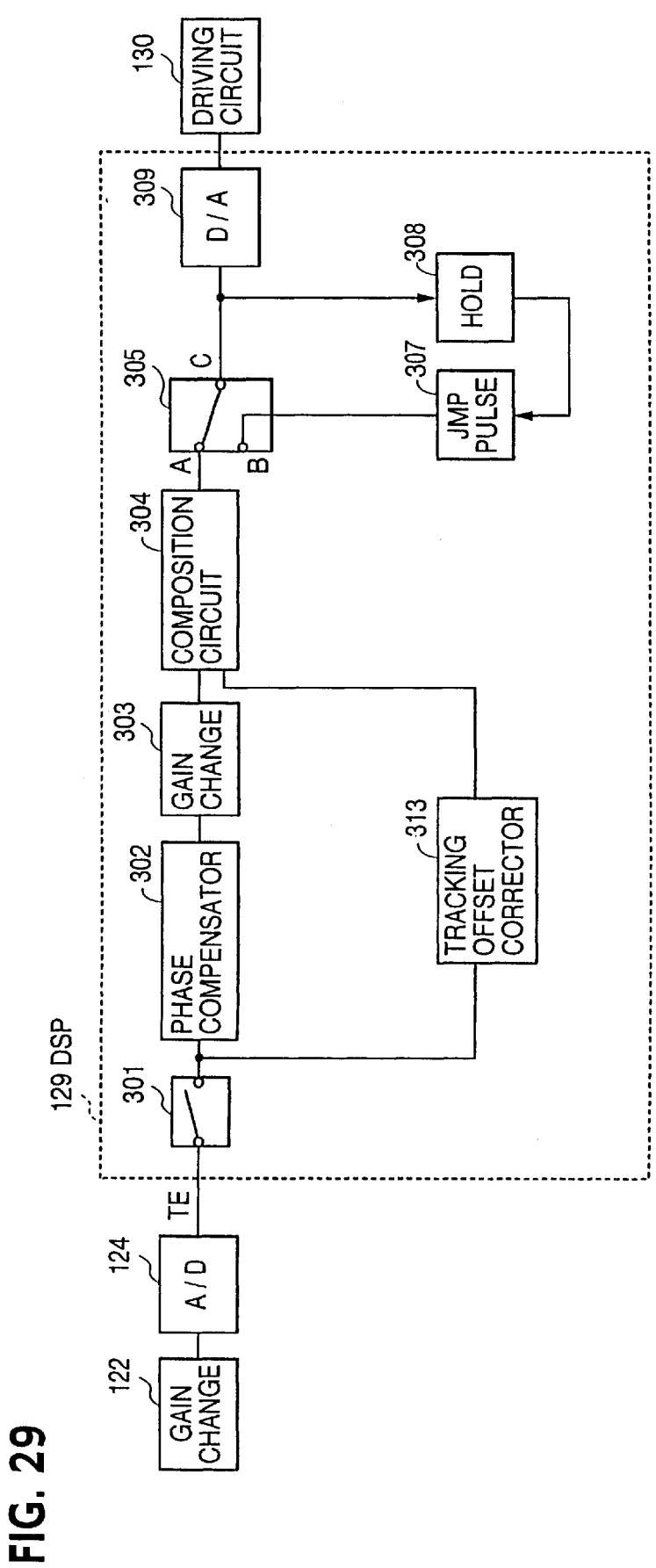
FIG. 29 is a block diagram for explaining a tracking control offset learning for a disk having two or more information faces, according to a thirteenth embodiment of the present invention.

A description is given of a tracking control offset learning for a multiple-layer disk in an optical disk apparatus according to a thirteenth embodiment of the present invention, using FIG. 29. In this embodiment, a dual-layer disk is employed.

FIG. 29 is a block diagram illustrating the inner structure of the DSP 129 for explaining a tracking servo system and an offset learning section according to the thirteenth embodiment of the present invention.

When the optical disk apparatus is turned on and the dual-layer disk is loaded in the apparatus, the disk motor 102 is rotated at a prescribed speed (DMON). Next, the semiconductor laser 108 is oscillated (LDON), and the focus of the light beam 107a emitted from the laser 108 is led in the second layer L1 of the dual-layer disk: Thereafter, the tracking control offset learning is started. In the state where the focus is led in, a sine wave shaped track cross signal as shown in FIG. 25(*a*) appears on the TE signal due to a decentration.

A tracking offset corrector 313 samples the sine wave shaped TE signal, detects a maximum value and a minimum value, and calculates a tracking offset from a difference between these values. Alternatively, the tracking offset may be obtained by an integration of the sampled TE value. The tracking offset corrector 313 calculates a correction value to be applied to the composition circuit 304 from the calculated offset. The tracking offset corrector 313 stores the value in the RAM within the tracking offset corrector 313 and corrects the tracking offset input to the composition circuit 304.

When the measurement of the tracking offset and the storage of the correction value for the information face L1 are completed, the focus of the light beam is moved is the information face L0 by the above-mentioned focus jumping.

On the information face L0, as described above, the tracking control is turned off and the focus control is turned on. Then, the tracking offset is measured by detecting a maximum value and a minimum value of the sine wave shaped tracking cross signal shown in FIG. 25(*a*) or by integrating the track cross signal. After the offset measurement for the information face L0 is completed, an offset correction value for the information face L0 is stored in another RAM in the tracking offset corrector 3 13.

After the storage of the tracking offset correction values of the information faces L1 and L0 in the RAMs, the tracking offset corrector 313 in the DSP 129 selects the offset correction value of the information face on which the light beam is now controlled. This offset correction value is input to the composition circuit 304, whereby the tracking offset is corrected.

Therefore, in either case where the focus of the light beam moves from L0 to L1 or from L1 to L0 in the dual-layer disk, when the focus jumping is performed to a target information face, a focus offset correction value corresponding to the target information face is set, whereby the offset of the tracking servo system can be always eliminated, resulting in a stable tracking servo system.

By the way, a variety of methods have been proposed for the measurement and correction of the offset, and this thirteenth embodiment of the invention is not restricted by the method mentioned above.

As described above according to the thirteenth embodiment of the present invention, when focus jumping is performed in the dual-layer disk, a tracking offset correction value corresponding to a desired target position of the tracking control means on each of the first information face and the second information face of the disk is stored in the tracking position storage means and, when focus jumping is performed this time, the target position of the tracking control means is changed to an optimum value for the target information face. Therefore, a stable tracking servo system can be constructed for either information face.

Embodiment 14

Figure 24:
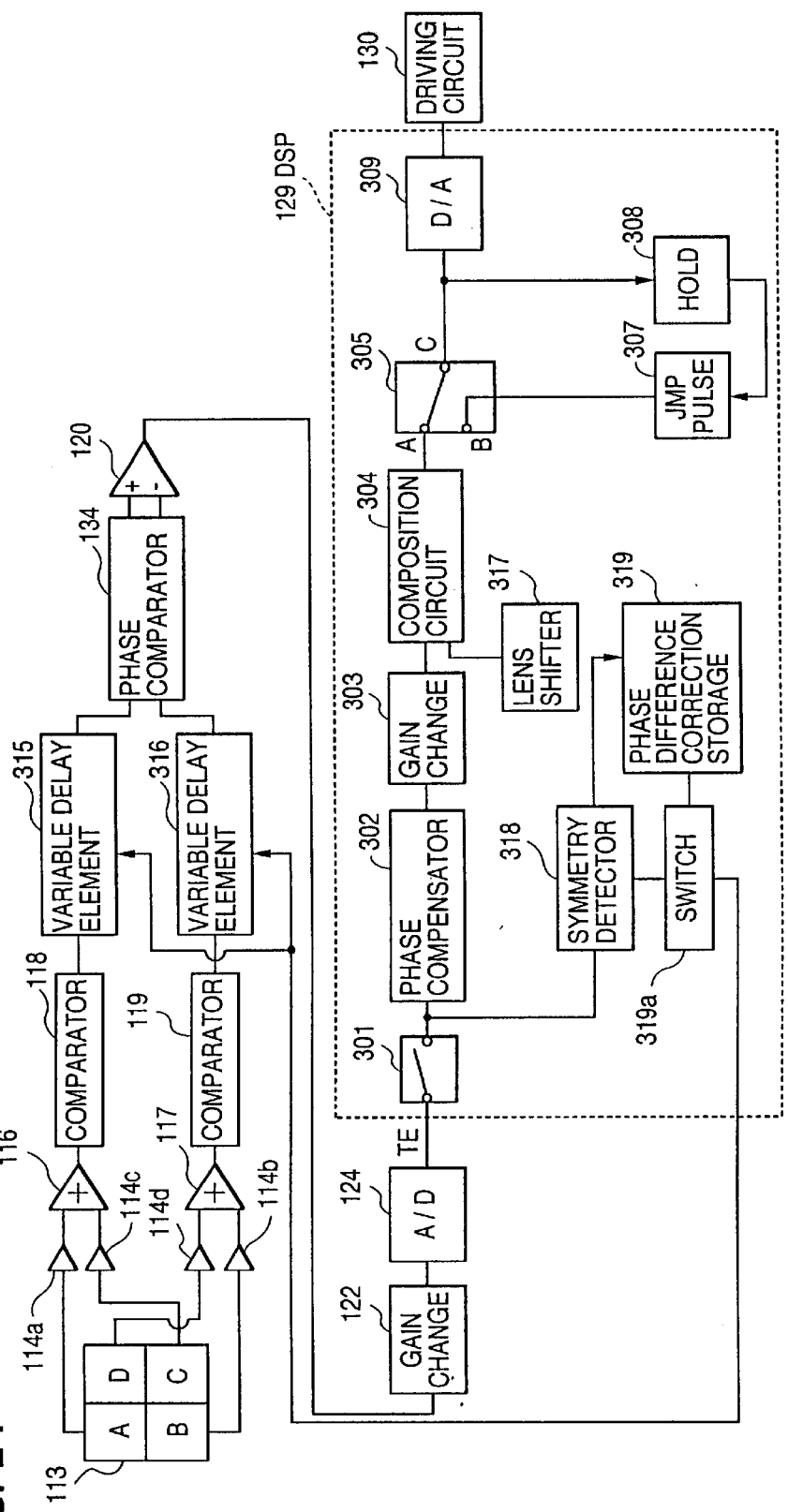
FIG. 24 is a block diagram for explaining a tracking control offset learning for a disk having two or more information faces according to a fourteenth embodiment of the present invention.

A description is given of a tracking control offset learning for a multiple-layer disk in an optical disk apparatus according to a fourteenth embodiment of the present invention, using FIG. 24. In this embodiment, a dual-layer disk is employed.

FIG. 24 is a block diagram illustrating the inner structure of the DSP 129 for explaining a phase difference tracking servo system and a section for correcting an offset due to the phase difference (hereinafter referred to as a phase difference offset) according to the fourteenth embodiment of the present invention.

When the optical disk apparatus is turned on and the dual-layer disk is loaded in the apparatus, the disk motor 102 is rotated at a prescribed speed (DMON). Next, the semiconductor laser 108 is oscillated (LDON), and the focus of the light beam 107a emitted from the laser 108 is led in the second layer L1 of the dual-layer disk. In the state where the focus is led in, a send wave shaped track cross signal as shown in FIG. 25(a) appears on the TE signal due to a decentration.

In the DSP 129, the lens shifter 310 applies a signal to the composition circuit 304 and gives an offset to the tracking actuator 103 by compulsorily flowing current in the actuator 103, whereby the focusing lens 105 is shifted by about +300 μm. In the state where the lens 105 is shifted, the symmetry detector 318 samples the sine wave shaped TE signal, detects a maximum value and a minimum value of the TE signal, and calculates a symmetry Voff+ tracking on the positive side of the lens shift. Alternatively, this symmetry may be obtained by integrating the sampled TE value.

Next, the polarity of the output signal from the lens shifter 317 is changed so that the lens 105 is sifted by about −300 μm. In this state, the symmetry detector 318 samples the sine wave shaped TE signal, detects a maximum value and a minimum value of the TE signal, and calculates a symmetry Voff− of tracking on the negative side of the lens shift. Alternatively, this symmetry may be obtained by integrating the sampled TE value.

Then, the variable delay elements 315 and 316 vary the delay (or lead) Pd1 so that the difference of the positive and negative lens-shift offsets attains a minimum value.

When the setting of the delay of the variable delay elements.315 and 316, which delay is a correction value of the phase difference offset of the phase difference tracking on the information face L1, and the storage of the set value in the phase difference correction value storage part 319 are completed, the focus of the light beam is moved to the information face L0 by the above-mentioned focus jumping.

On the information face L0, the tracking control is turned off and the focus control is turned on, an optimum delay Pd0 for correcting the phase difference offset is, obtained.

When the delays (or leads) Pd1 and Pd0 of the variable delay elements 315 and 316 for the information faces L1 and L0, respectively, are obtained, output values for setting the delays are input to the phase difference correction value storage part 319.

After the phase difference correction value storage part 319 once stores the set values Pd1 and Pd0 for correcting the phase difference offset of the phase difference tracking, the DSP 129 selects a delay corresponding to the information face on which the light beam is no controlled, and sends this delay through the switch 319a to the variable delay circuits 315 and 316.

Therefore, in either case where the focus of the light beam moves from L0 to L1 or from L1 to L0 in the dual-layer disk, when the focus jumping is performed to a target information face, the delay (Pd1 or Pd0) of the variable delay Circuits 315 and 316 corresponding to the target Information face is set, the offset of the tracking servo system when the lens 105 is shifed can be always eliminated, resulting in a stable tracking servo system.

By the way, a variety of methods have been proposed for the measurement and correction of the offset, and this fourteenth embodiment of the invention is not restricted by the method mentioned above.

As described above, according to the fourteenth embodiment of the present invention, a phase difference track error signal corresponding to the positional relationship between the focal point of the light beam and the track on each information face is produced on the basis of the phase relationship of signals output from respective light responsive parts of the light detecting means which receives reflected light from the recording medium. The tracking control means controls the tracking by driving the light beam moving means according to an output signal from the phase difference track error detecting means. Delays or leads of signals output from the respective light responsive parts of the light detecting means, which delays or leads provide desired values for output signals from the phase difference track error detecting means on the first information face and the second information face of the recording medium, are stored while performing focus jumping and seeking by the focus jumping means. When focus jumping and seeking are actually performed for a target information face, the delays or leads of the signals from the respective light responsive parts of the light detecting means are changed to the phase offset signal that is read out from the phase offset storage means and corresponds to the target information face. Therefore, in the dual-layer disk, when focus jumping is performed between the two information faces, since the focus offset correction value corresponding to the target information face is set, the offset in the tracking servo system can be always eliminated, whereby a stable tracking servo system can be constructed.

What is claimed is:

1. An optical disk apparatus comprising:
a focusing means for focusing a light beam on a recording medium having first and second information faces;
a moving means for moving a focal point of the light beam focused by said focusing means in a direction substantially perpendicular to the information faces of the recording medium;
a light detecting means for detecting a reflected light of the focused light beam from the recording medium;
a focus control means for detecting a focus condition of the light beam irradiating the information faces on the basis of an output signal from said light detecting means, driving said moving means on the basis of the detection signal, and controlling the light beam so that the focus condition of the light beam becomes a prescribed focus condition;

a focus jumping means for jumping the focal point of the light beam to a target information face which is one of the first information face and the second information face by driving said moving means; and a storage means for storing signals obtained when the focal point of the light beam is passed through the first and second information faces by driving said moving means so that the light beam goes away from or close to the recording medium;

wherein, when a focus jumping is performed by said focus jumping means, a gain of said focus control means is changed according to the values stored in said storage means.

2. An apparatus as claimed in claim 1, wherein said storage means stores signals corresponding to an amount of reflected light which is detected by said light detecting means when the focal point of the light beam is passed through the first and second information faces by driving said moving means so that the light beam goes away from or close to the recording medium.

3. An apparatus as claimed in claim 2, wherein, when the focus jumping is performed by said focus jumping means, a focus control lead-in level is set according to the values stored in said storage means.

4. An apparatus as claimed in claim 2, wherein a focus control lead-in level for the focus jumping is set according to the value stored in said storage means, a gain of which is changed according to the values stored in said storage means.

5. An apparatus as claimed in claim 1, wherein said storage means stores focus condition detecting signals obtained when the focal point of the light beam is passed through the first and second information faces by driving said moving means so that the light beam goes away from or close to the recording medium, wherein said focus condition detecting signal comprises at least one of a gain, an offset, and a level, and wherein, when the focus jumping is performed by said focus jumping means, at least one of a gain, an offset, and a level of said focus control means is changed according to the values stored in said storage means.

6. An apparatus as claimed in claim 5, wherein, when the focus jumping is performed by said focus jumping means, a focus control lead-in level is set according to the values stored in said storage means.

7. An apparatus as claimed in claim 5, wherein a focus control lead-in level for the focus jumping is set according to the value stored in said storage means, a gain of which is changed according to the values stored in said storage means.

8. An optical disk apparatus for reproducing information recorded on a recording medium having two information faces, by irradiating the recording medium with a focused light beam, said apparatus comprising:

a moving means for moving a focal point of the light beam irradiating the recording medium so that the focal point crosses a track on the recording medium;

a tracking control means for detecting a positional error between the focal point of the light beam and the track on the recording medium, driving said moving means according to the track error signal, and controlling the light beam so that the focal point is positioned on the track;

a focus jumping means for jumping the focal point of the light beam to a target information face, which is one of the first information face and the second information face, and seeking the target information face;

a storage means for storing tracking condition signals for the first information face and the second information face;

an arithmetic means for performing an arithmetic operation on the tracking condition signals stored in said storage means with an output signal from said tracking control means, and a system control means for controlling the system so that a tracking condition signal which is read out of said storage means and corresponds to the target information face is used to adjust the output signal from the tracking control means, when the jumping and seeking are performed by said focus jumping means.

9. An apparatus as claimed in claim 8, wherein the tracking condition signals stored in said storage means are decentration signals which corresponding to decentrations of tracks on the first information face and the second information face, said arithmetic means is an adding means for adding the decentration signals stored in said storage means to the output signal from said tracking control means, and said system control means controls the system so that a decentration signal which is read out of said storage means and corresponds to the target information face is added to the output signal from said tracking control means, when the jumping and seeking are performed by said focus jumping means.

10. An apparatus as claimed in claim 8, wherein the tracking condition signals stored in said storage means are desired loop gains of said tracking control means for the first information face and the second information face, said arithmetic means is a multiplication means for multiplying the track gain signals stored in said storage means by an output signal from said tracking control means, and said system control means controls the system so that a tracking gain signal which is read out of said storage means and corresponds to the target information face is multiplied by the output signal from the tracking control means, when the jumping and seeking are performed by said focus jumping means.

11. An optical disk apparatus as claimed in claim 1, wherein said signals stored in said storage means are desired loop gains of said focus control means for the first information face and the second information face, and said optical disk apparatus further comprising;

a multiplication means for multiplying the focus gain signals stored in said storage means by an output signal from said focus control means; and a system control means for controlling the system so that a focus gain signal which is read out of said storage means and corresponds to the target information face is multiplied by the output signal from said focus control means.

12. An optical disk apparatus as claimed in claim 1, wherein said signals stored in said storage means are servo offsets corresponding to desired target positions of said focus control means on the first information face and the second information face, and said optical disk apparatus further comprises:

a system control means for controlling the system so that the target position of said focus control means is changed to a focus position signal that is read out of said storage means and corresponds to the target information face.

13. An optical disk apparatus as claimed in claim 8, wherein said signals stored in said storage means are servo offsets corresponding to desired target positions of said tracking control means on the first information face and the second information face, and said optical disk apparatus further comprises:

a system control means for controlling the system so that the target position of said tracking control means is changed to a tracking position signal that is read out of said storage means and corresponds to the target information face.

14. An optical disk apparatus as claimed in claim 8, further comprising:

a light detecting means for detecting a reflected light from the recording medium at a plurality of light responsive parts;

a phase difference track error detecting means for generating a phase difference track error signal corresponding to the positional relationship between the focal point of the light beam and the track on each information face, on the basis of the phase relationship of signals output from the respective light responsive parts of said light detecting mean; and wherein said tracking control means drives said moving means according to an output signal from said phase difference track error detecting means, and controls the light beam on the information face so that the focal point of the light beam seeks the track correctly;

wherein said storage means stores delays or leads of signals output from the respective light responsive parts of said light detecting means, the delays or leads providing desired values for output signals from said phase difference track error detecting means on the first information face and the second information face; and wherein said system control means controls the system so that the delays or leads of the signals from the respective light responsive parts of said light detecting means are changed to a phase offset signal that is read out from said storage means and corresponds to the target information face when the jumping and seeking are performed by said focus jumping means.

15. An optical disk apparatus as claimed in claim 8, wherein said storage means stores a parameter of a focus control and a tracking control corresponding to the first and second information face, and the parameter of the focus control and tracking control is changed when a jumping is performed by said focus jumping means.

* * * * *